(12) United States Patent
Wang

(10) Patent No.: US 11,752,850 B2
(45) Date of Patent: Sep. 12, 2023

(54) QUICK-CHANGE UNIVERSAL POWER BATTERY FOR NEW ENERGY VEHICLES

(71) Applicant: Ninghao Wang, Zhejiang (CN)

(72) Inventor: Ninghao Wang, Zhejiang (CN)

( * ) Notice: Subject to any disclaimer, the term of this patent is extended or adjusted under 35 U.S.C. 154(b) by 272 days.

(21) Appl. No.: 17/373,630

(22) Filed: Jul. 12, 2021

(65) Prior Publication Data
US 2021/0351466 A1 Nov. 11, 2021

Related U.S. Application Data

(63) Continuation of application No. PCT/CN2020/070615, filed on Jan. 7, 2020.

(30) Foreign Application Priority Data

Jan. 11, 2019 (CN) .......................... 201910025487.1

(51) Int. Cl.
| | |
|---|---|
| *B60K 1/02* | (2006.01) |
| *H01M 10/613* | (2014.01) |
| *H01M 10/625* | (2014.01) |
| *H01M 50/267* | (2021.01) |
| *H01M 50/24* | (2021.01) |

(Continued)

(52) U.S. Cl.
CPC ................ *B60K 1/02* (2013.01); *B60L 50/64* (2019.02); *H01M 10/613* (2015.04); *H01M 10/625* (2015.04); *H01M 50/209* (2021.01); *H01M 50/24* (2021.01); *H01M 50/249* (2021.01); *H01M 50/267* (2021.01)

(58) Field of Classification Search
CPC ............. H01M 10/613; H01M 10/625; H01M 50/208; H01M 50/267; H01M 50/249; H01M 50/209; B60L 50/64; B60L 50/66; B60L 2210/40

See application file for complete search history.

(56) References Cited

U.S. PATENT DOCUMENTS

| | | | | |
|---|---|---|---|---|
| 4,102,273 A | * | 7/1978 | Merkle ................... | B60L 53/80 |
| | | | | 104/50 |
| 5,014,811 A | * | 5/1991 | Valencic .................. | B60K 1/04 |
| | | | | 180/68.5 |

(Continued)

FOREIGN PATENT DOCUMENTS

| | | |
|---|---|---|
| CN | 201584469 U | 9/2010 |
| CN | 201966413 U | 9/2011 |

(Continued)

*Primary Examiner* — Jason D Shanske
*Assistant Examiner* — James J Triggs

(57) ABSTRACT

Disclosed herein is a quick-change universal power battery for a new energy vehicle. A battery body is provided with a quick-change connection port, a recessed structure, an independent liquid temperature-control loop and a multi-connection port structure. The battery body is provided with a recessed area, and the quick-change connection port is arranged in the recessed area. A power battery system is composed of no more than eight main models of quick-change universal power batteries to achieve battery selection and replacement of most new energy vehicles, and the power battery system is combined with charging to facilitate an electrical-energy supplement of the new energy vehicle. A vehicle and a replacement station are also disclosed.

36 Claims, 46 Drawing Sheets

(51) Int. Cl.
*H01M 50/249* (2021.01)
*B60L 50/64* (2019.01)
*H01M 50/209* (2021.01)

(56) References Cited

U.S. PATENT DOCUMENTS

| | | | | |
|---|---|---|---|---|
| 5,301,763 A * | 4/1994 | Peay | ............... | E21B 10/46 |
| | | | | 175/398 |
| 5,612,606 A * | 3/1997 | Guimarin | ............ | H01M 50/262 |
| | | | | 414/281 |
| 5,711,648 A * | 1/1998 | Hammerslag | ........... | B60L 50/66 |
| | | | | 180/68.5 |
| 5,998,963 A * | 12/1999 | Aarseth | ................... | B60L 50/64 |
| | | | | 320/109 |
| 2008/0006459 A1 * | 1/2008 | Niebuhr | ................ | B66F 9/0754 |
| | | | | 180/68.5 |
| 2011/0068309 A1 * | 3/2011 | Haslberger | ........... | B60L 50/66 |
| | | | | 254/2 R |
| 2013/0104361 A1 * | 5/2013 | Corfitsen | ................ | B60L 53/80 |
| | | | | 29/402.08 |
| 2014/0060944 A1 * | 3/2014 | Fillion | ................ | H01M 10/663 |
| | | | | 429/82 |
| 2014/0250653 A1 * | 9/2014 | Droste | ................ | H01M 10/44 |
| | | | | 29/729 |
| 2015/0207068 A1 * | 7/2015 | Cho | .................... | H10N 70/068 |
| | | | | 257/4 |
| 2015/0375623 A1 * | 12/2015 | Galamb | .................. | B60L 50/64 |
| | | | | 180/68.5 |
| 2016/0200186 A1 * | 7/2016 | Hawighorst | ............ | B60L 53/80 |
| | | | | 180/68.5 |
| 2017/0005371 A1 * | 1/2017 | Chidester | .............. | H01M 50/20 |
| 2017/0297541 A1 | 10/2017 | Droste | | |
| 2018/0041053 A1 * | 2/2018 | Capizzo | .................. | A63H 30/04 |
| 2020/0164760 A1 * | 5/2020 | Sohmshetty | ............ | B60L 53/80 |
| 2020/0384841 A1 * | 12/2020 | Hirsch | ................ | H01M 50/204 |
| 2022/0097554 A1 * | 3/2022 | Hickey | ................... | B60L 53/35 |

FOREIGN PATENT DOCUMENTS

| | | |
|---|---|---|
| CN | 202080145 U | 12/2011 |
| CN | 202333380 U | 7/2012 |
| CN | 203623352 U | 6/2014 |
| CN | 204760453 U | 11/2015 |
| CN | 205282730 U | 6/2016 |
| CN | 105742554 A | 7/2016 |
| CN | 108598302 A | 9/2018 |
| CN | 208352373 U | 1/2019 |
| CN | 109808516 A | 5/2019 |
| CN | 109808517 A | 5/2019 |

* cited by examiner

QUICK-CHANGE UNIVERSAL POWER BATTERY FOR NEW ENERGY VEHICLES

CROSS-REFERENCE TO RELATED APPLICATIONS

This application is a continuation of International Patent Application No. PCT/CN2020/070615, filed on Jan. 7, 2020, which claims the benefit of priority from Chinese Patent Application No. 201910025487.1, filed on Jan. 11, 2019. The content of the aforementioned applications, including any intervening amendments thereto, is incorporated herein by reference in its entirety.

TECHNICAL FIELD

This application relates to power batteries for new energy vehicles, and more particularly to a quick-change universal power battery for new energy vehicles.

BACKGROUND

Fossil fuel-based vehicles have been used for a long time, and greatly facilitate the transportation. However, with the continuous increase of the fossil fuel-based vehicles, the air pollution brought by the exhaust emission and the shortage of fossil fuel sources become more and more serious.

Fortunately, the development of various new energy vehicles effectively mitigates the above problems. Currently, most of the new energy vehicles are electrically driven by an onboard energy source or external charging. Though some of the onboard energy sources are still fossil fuels, the consumption of fossil fuels and the exhaust emission are reduced due to the use of new power devices. In addition, green energy has also been used as the onboard energy source. The new energy vehicles with the onboard alternative energy source can still be equipped with external charging, while pure electric vehicles rely entirely on the external charging. The growing proportion of green power generation reduces the consumption of non-renewable resources and improves the environment.

The electrically-powered new energy vehicles often employ various power batteries to store and output electric energy. Apart from the power generation of other onboard energy source, the energy source of the power battery is supplemented mainly by charging or replacement with a new power battery (battery replacement).

The external charging has a lot of advantages, for example, the charging facilities can be conveniently configured. However, it also struggles with slow charging process, and it is often required to wait for the public charging pile. In order to shorten the charging time, the fast charging has been developed, in which a high-power charging pile is used, but the charging speed is still significantly slower than the refueling speed of fuel vehicles. Moreover, it has high requirements for the configuration of power grid, and may cause the peak-and-valley imbalance of the power system. Therefore, the number of the fast-charging piles is limited. The users of new energy vehicles often have "range anxiety" due to the inconvenient charging. Unfortunately, the fast charging also causes obvious damage to the common power batteries.

The charging convenience of new energy vehicles requires fast-charging power batteries and popularization (wide distribution and sufficient quantity) of high-power charging piles. However, the simultaneous fast charging of multiple vehicles will require excessive power and increase the peak-and-valley imbalance of the power system, hindering the popularization of the high-power charging piles. In addition, charging stations need to be equipped with low-cost and long-service-life large-capacity energy storage equipment (to be developed). It is difficult to meet the above requirements at the same time.

If the batteries can be quickly replaced, the battery replacement will be a promising way to realize the fast charging. The replaced batteries can be charged in an overall arrangement, reducing the requirement of the number of switching stations. In addition, the replaced batteries can be charged during low power-consumption periods since there is a long synchronization period between the power-consumption trough and the trough of car use, achieving the energy storage in the power-consumption trough.

A combination of the charging and the battery replacement will basically realize a convenient external electric energy supplement of the new energy vehicles. The charging can be configured for many occasions, and the battery replacement can quickly support electric energy.

Widely distributed replacement stations are needed to achieve the fast battery replacement of the new energy vehicles. In addition, each replacement station has to be equipped with various quick-change power batteries to meet the requirements of different types of new energy vehicles. However, too many types of the quick-change power batteries will lead to excessive resource consumption since they need to be equipped with different backup batteries, replacing tools and charging apparatus, resulting in high costs for implementation. Therefore, a universal quick-change power battery that can be used in the most vehicles is needed to popularize the battery replacement. Universal battery replacement is also conducive to the unified management of power batteries, and more reasonable identification, testing, maintenance and recycling.

So far, the replaceable power batteries have been arranged in some new energy vehicles, in which the power battery is connected to the vehicle through a fast port. The connection between the power battery and the new energy vehicle is simple and convenient for disassembly and assembly, so as to quickly replace the power battery. However, the replaceable power batteries are not widely used due to the lack of generality. At present, the quick-change power battery is usually connected to the new energy vehicle in two ways. One is to integrate the quick-change power batteries as a whole, that is, a battery pack. The battery pack is designed for a specific vehicle, and can be used in one model or the subsequent models (such as the same platform model) with a common design. Therefore, the battery replacement through the battery pack is implemented in the vehicles of the same models or similar models. The other is to separately arrange a plurality of power batteries or battery packs in to a vehicle, so as to form a total battery in the vehicle. The battery replacement is realized through changing each power battery or battery pack using the same power battery or battery pack. In this way, the power battery can be used in the vehicles of different models, and the battery replacement can be implemented in different vehicles. However, both connection methods have undesirable applicability due to one or more of the following reasons. (a) There is no universal structure to meet the reasonable layout of various vehicles. (b) The power battery only meets the needs of a part of the new energy vehicles due to its characteristics. For example, due to the weak temperature-control ability, the power battery is mainly used for vehicles with low speeds. (c) The layout space of the quick-change power batteries in the new energy vehicles, such that the total storage capacity of the batteries is small, failing to meet the requirements of various vehicles for the distance per charge. At present, there are no quick-change power batteries or groups of quick-change power batteries meeting the needs of various vehicles to popularize the battery replacement. A wide distribution of replacement stations is not practical and economical, whereas a small number of replacement stations will not meet the battery replacement requirements of corresponding vehicles. Therefore, the current battery replacement is only suitable for the centralized replacement station, and is mainly used in the new energy vehicles, such as taxis, online-hailing cars and buses, which are driven in a limited area.

SUMMARY

An objective of the present disclosure is to provide a quick-change universal power battery having many the applicable occasions and a system composed of a small number of the quick-change universal power batteries to meet the requirements of new energy vehicles with various models, so as to popularize the battery replacement. Appropriate individual changes are allowed for the quick-change universal power batteries of the same model. If the quick-change universal power batteries arranged in the same part of a vehicle in different periods have differences in arrangement parameters, the vehicle and a power battery management system will communicate and transmit relevant information to achieve reasonable use of the quick-change universal power batteries. When a plurality of power battery packs are arranged on the vehicle as need, a multi-pack power supply and a single-pack supply are switched to meet a power supply need while complying with a charging-and-replacement plan in a trip. The new energy vehicles referred to in this disclosure include all vehicles equipped with power batteries. The quick-change universal power battery and the system are also applicable to other vehicles that can be arranged with the quick-change universal power battery.

The technical solutions of the present disclosure are described as follows.

In a first aspect, the present disclosure provides a power battery for a new energy vehicle, comprising:
a battery body;
wherein the battery body is provided with a quick-change connection port for quick disassembly and assembly; the quick-change connection port comprises a main electrical connection port; the battery body is connected to the new energy vehicle in use; the battery body is further provided with one or more of a recessed structure, an independent liquid temperature-control loop and a multi-connection port structure; the recessed structure comprises a recessed area; the recessed area is arranged on the battery body; the quick-change connection port is arranged in the recessed area; when the battery body is configured to be laterally arranged on the new energy vehicle, the recessed area is arranged at a side of the battery body; when the battery body is configured to be downward arranged on the new energy vehicle, the recessed area is arranged on a lower end of the battery body; when the battery body is configured to be upward arranged on the new energy vehicle, the recessed area is arranged on an upper end of the battery body; the independent liquid temperature-control loop comprises a direct cooling loop, a liquid cooling loop or a combination thereof; the direct cooling loop, the liquid cooling loop or the combination thereof is arranged on the battery body; the multi-connection port structure comprises the quick-change connection port on the battery body; and at least two side surfaces of the battery body are provided with the quick-change connection port.

The battery body is provided with the recessed area. A connecting part in a battery compartment (or other parts used to connect and accommodate the battery body) of the new energy vehicle is a protrusion. The protrusion is configured to enter the corresponding recess area of the battery body during an arrangement of the battery body. No additional space behind the battery compartment is required, that is, the space behind the battery compartment is little occupied, preventing that the battery compartment cannot be arranged in the new energy vehicle due to the occupation space of the connecting part or the battery compartment is limited to a specific position. Therefore, the layout of the battery compartment is flexible, and has strong versatility, greatly expanding the applicable occasion of the battery body.

The power battery is provided with a plurality of quick-change connection ports, such that the power battery is able to be arranged at various connection positions or to be arranged in various directions, increasing the applicable occasion and versatility of the power battery. The various connection positions help the new energy vehicle to avoid an inappropriate port position. The power battery can be arranged in different direction under different conditions, fully utilizing the arrangement space of the new energy vehicle while reducing the variety of the power battery. The plurality of quick-change connection ports increase the applicable occasion and versatility of the power battery.

The power battery is provided with a liquid temperature-control loop. The liquid temperature-control loop is configured to transfer heat through a liquid medium such as a refrigerant and a cooling liquid. The temperature-control loop comprises a direct cooling loop, a liquid cooling loop or a combination thereof. A surface of the power battery is provided with an external heat exchanger, such as a condenser, an evaporator and a radiator, which usually arranged on a traditional vehicle, such that the liquid temperature-control loop is independent of a temperature-control system of the new energy vehicle. All components of the liquid temperature-control loop are arranged on the battery body, such that the liquid temperature-control loop on the power battery completely independent, so as to meet different requirements for temperature-control ability in different usage conditions of various new energy vehicles. The power battery does not require the new energy vehicle to have an ability to form a combined liquid temperature-control system with the power battery as the existing quick-change power battery does. The liquid temperature-control loop is no need to be disconnected and reconnected during a battery replacement. The battery body is no need to be provided with a connecting port for a liquid temperature-control loop connected to the new energy vehicle. In addition, it is not necessary for all new energy vehicles using the power battery to use the same refrigerant or the same cooling liquid, reducing the constraints to the development of power battery temperature-control technology. Therefore, various vehicles can solve the problem of battery temperature-control through using the power battery. The applicable occasion and versatility of the power battery are increased.

The battery body is further provided with one or more of a recessed structure, an independent liquid temperature-control loop and a multi-connection port structure. The applicable occasion and versatility of the power battery are increased.

System voltage of different new energy vehicles is different, and thus power batteries with different rated voltages are required. Whereas the power battery is configured to output different voltages through an internal change, such that one power batter is able to provide different voltages to select, increasing the versatility of the power battery.

In some embodiments, the battery body is configured to output different voltages through an internal change.

In some embodiments, a plurality of equivalent battery packs are provided in the battery body; the internal change is realized by changing the number of equivalent battery packs connected in series to allow the battery body to output different voltages; a voltage output from the battery body increases as the number of equivalent battery packs connected in series increases, and decreases as the number of equivalent battery packs connected in series decreases; each of the plurality of equivalent battery packs is composed of a single battery cell suitable for parallel connection or a plurality of battery cells connected in series or parallel; and the plurality of battery cells are suitable for parallel connection and have the same electric performance.

In some embodiments, the power battery is a miniaturized power battery; an area of a maximum surface area of the battery body or a maximum projected area is less than 0.06 $m^2$; a thickness of the battery body is less than 140 mm; and a weight of the battery body is less than 10 kg. The miniaturized power battery is mainly suitable for the situation where there is a small amount of battery replacement at a time, and the layout and combination of the miniaturized power battery are flexible. The miniaturized power battery is also suitable for manual battery replacement and easy to arrange the replacement station.

In a second aspect, the present disclosure provides communication protocol between the power battery and the new energy vehicle. The communication protocol adapts to changes of different individuals of the power battery. For the differences between different individuals of the same main model power battery, the new energy vehicle and a power battery management system communicate and transmit relevant information, so as to provide a reasonable charging of different individuals of the power battery and a reasonable power supply according to a load capacity information of different individuals of the power battery, realizing the adaptability of the new energy vehicle to different individuals of the power battery. The communication protocol can also be applied to a communication between other power batteries and vehicles.

In some embodiments, the battery body adopts the communication protocol between a power battery management system and the new energy vehicle; the communication protocol is configured to transmit a category and a type of a battery cell in the power battery and/or a parameter of the power battery to an energy management system of the new energy vehicle to control a charging process; and the parameter of the power battery comprises charging requirements for battery cells of different categories and types.

In some embodiments, the battery body adopts the communication protocol between a power battery management system and the new energy vehicle; the communication protocol is configured to transmit a load capacity information of the power battery to the power battery management system; and a control system of the new energy vehicle is configured to select a power supply mode according to the load capacity information of the quick-change power battery obtained by the energy management system.

In a third aspect, the present disclosure provides a power battery system to popularize battery replacement.

In some embodiments, combining with shapes and sizes of the power battery, several models of the power battery with the above-mentioned structures are determined to form a power battery system. Battery bodies having the same size and arranged in the same battery compartment or component for connection and accommodation of the quick-change power battery belong to the same main model; and there are no more than eight types of main models of power batteries for various new energy vehicles to select and replace.

In some embodiments, different categories and types of battery cells are arranged in individual power batteries of the same main model for replacement.

A power battery system is composed of the power batteries with a small number of models (the number of main models of the power battery in the power battery system is no more than eight), such that the power battery system can be used in most of new energy vehicles and the battery replacement is popularized. Different battery cells can be arranged in different power batteries of the same main model for replacing, so as to accommodate the application of various types of power batteries. The main models of the power battery can also be continuously used in the development of power battery technology.

In a fourth aspect, the present disclosure provides a vehicle using the power battery mentioned above.

The vehicle comprises a vehicle body, wherein the vehicle body is provided with a quick-change connection port corresponding to the battery body.

The vehicle comprises a mater vehicle with driving force and a slave vehicle without a driving force. In some embodiments, the vehicle body is a master vehicle; the slave vehicle is connected to the master vehicle; the slave vehicle is replaceable; the slave vehicle is provided with the quick-change power battery to power the master body; and the slave vehicle is driven by the master vehicle.

When a plurality of power battery packs are arranged on the vehicle as needed, a power supply of the vehicle is realized through a switch between the combined power supply and a single-pack power supply and a reasonable arrangement of a power consumption plan of each of the plurality of power battery packs according to charging and battery replacement of the vehicle on the road.

In a fifth aspect, the present disclosure provides a control system for the power battery mentioned above.

In some embodiments, the control system comprises a power-distribution control unit; the power-distribution control unit is configured to control a combined power supply of two or more independent power battery packs; the power-distribution control unit is configured to control a power consumption sequence of individual independent power battery packs through a switch between the combined power supply and a single-pack power supply or a switch between different power supply combinations; and each of the two or more independent power battery packs is composed of a plurality of the quick-change power batteries.

In some embodiments, the power-distribution control unit comprises a multi-input DC-DC converter or a multi-input DC-AC converter; the two or more power battery packs are connected to the multi-input DC-DC converter or the multi-input DC-AC converter; and the two or more power battery packs are configured to implement the combined power supply through the multi-input DC-DC converter or the multi-input DC-AC converter.

In some embodiments, the power-distribution control unit is configured to implement the combined power supply through switching the two or more power battery packs into series connection.

In some embodiments, the power-distribution control unit is configured to output a single-pack power supply of a first power battery pack or a combined power supply of a plurality of power battery packs through a DC-DC converter and connect the single-pack power supply of the first power battery pack or the combined power supply of the plurality of power battery packs with the single-pack power supply of a second battery pack in parallel to implement the combined power supply.

In some embodiments, the control system comprises a power-distribution control unit; the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

In some embodiments, the control system comprises a charging control unit; the charging control unit is configured to charge the two or more independent power battery packs using a charging control unit; and each of the two or more independent power battery packs is composed of a plurality of quick-change universal power batteries. The plurality of power battery packs are charged as needed, improving charging efficiency.

In some embodiments, the charging control unit is configured to control the charging source to charge different power battery packs through multiple paths with a multi-output charger.

In some embodiments, the charging control unit is configured to charge temporarily switch the two or more power battery packs into series connection and charge the two or more power battery packs using the charging source.

In some embodiments, a communication protocol between a power battery management system and a new energy vehicle is adopted between a quick-change power battery and the energy management system of the new energy vehicle;

the communication protocol is configured to obtain a category and a type of a battery cell in the power battery and/or a parameter of the power battery; the parameter of the power battery comprises charging requirements for different categories and types of the battery cell; the power battery is charged by an on-board charger on the new energy vehicle or charged by an off-board charger under management of the energy management system; the energy management system is configured to determine whether the power battery is chargeable; if the power battery is chargeable, the on-board charger or the off-board charger charges the power battery according to charging requirements of different categories and types of battery cells through a charging control unit; the energy management system and the power battery management system adopts the communication protocol for communication and control of a charging process; and the off-board charger communicates with the new energy vehicle to together control the charging process.

In some embodiments, the control system comprises an energy management system; the energy management system a communication protocol between a power battery management system and the new energy vehicle; the communication protocol is configured to transmit a load capacity information of the power battery to the power battery management system; and a control system of the new energy vehicle is configured to select a power supply mode according to the load capacity information of the power battery obtained by the energy management system.

In a sixth aspect, the present disclosure provides a replacement station of the power battery mentioned above. The replacement station is equipped with no more than eight main models of power batteries for the new energy vehicle; the replacement station is further equipped with a replacement apparatus of the no more than eight main models of power batteries; and the replacement station is configured for replacement of a power battery of various new energy vehicles.

The beneficial effects of the present disclosure are described as follows.

A quick-change power battery with a structure for expanding an applicable occasion largely increases the applicability and versatility of the power battery. A power battery system is composed of the power batteries with a small number of models, such that the power battery system can be used in most of new energy vehicles and the battery replacement is popularized.

Different battery cells can be arranged in different power batteries of the same main model for replacing. Therefore, main models of the power battery can also be continuously used in the development of power battery technology, keeping stability of the power battery system of the quick-change universal power battery.

A new energy vehicle is provided with a plurality of power battery packs as need. The power supply and charging are managed properly. The new energy vehicle provided herein is suitable for the application of the quick-change power battery.

DETAILED DESCRIPTION OF EMBODIMENTS

The present disclosure will be further described in detail below with reference to the embodiments and the accompanying drawings.

As shown in the figures, a power battery for a new energy vehicle includes a battery body 1. The battery body 1 is provided with a quick-change connection port for quick disassembly and assembly. The quick-change connection port includes a main electrical connection port. The battery body 1 is connected to the new energy vehicle when in use. The battery body 1 is further provided with one or more of a recessed structure, an independent liquid temperature-control loop and a multi-connection port structure.

Figure 1:
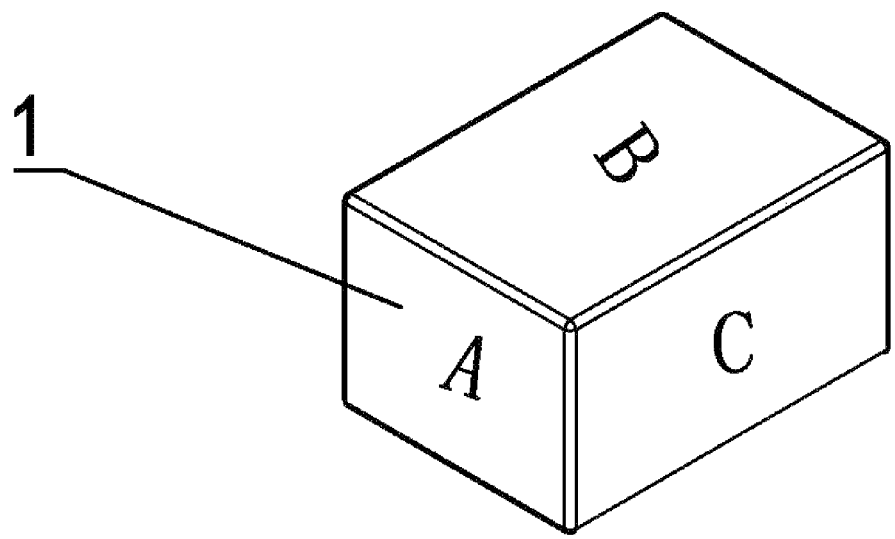
FIG. 1 schematically depicts a structure of a battery body in accordance with an embodiment of the present disclosure.

Unless otherwise specified, surface A in FIG. 1 is a left end of the power battery, and a direction away from the surface A is a right end of the power battery; surface B in FIG. 1 is an upper end of the power battery, and a direction away from the surface B is a lower end of the power battery; and surface C is a front end of the power battery, and a direction away from the surface C is a rear end of the power battery.

Figure 2:
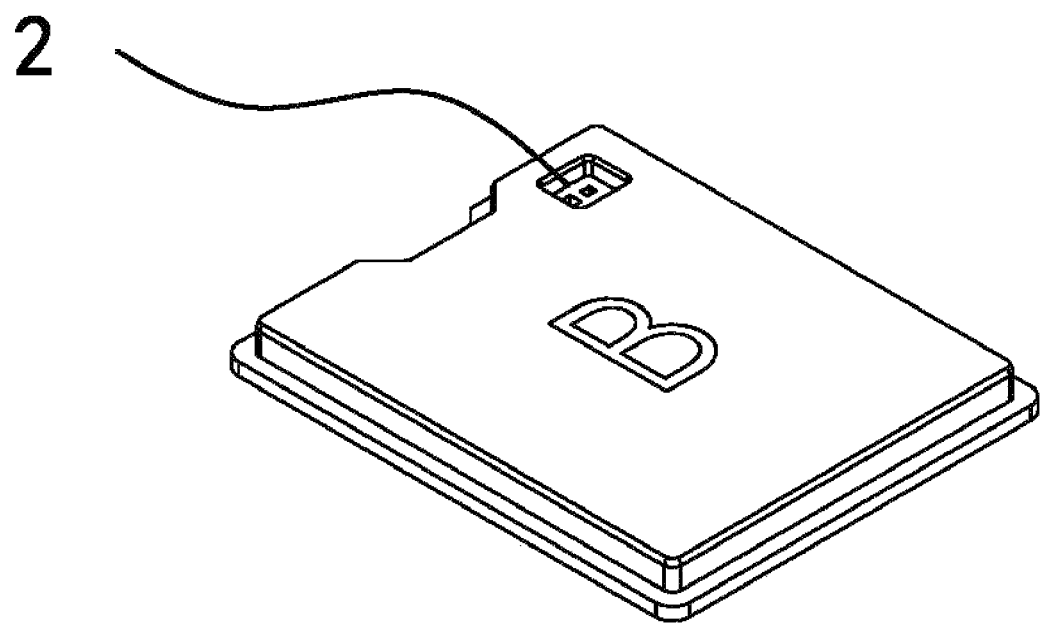
FIG. 2 schematically depicts a structure of the battery body in accordance with an embodiment of the present disclosure.

The recessed structure includes a recessed area 2. The recessed area is arranged on the battery body 1. In FIG. 2, the recessed area 2 is arranged above the battery body 1, and is upward arranged on the new energy vehicle when in use.

Figure 3:
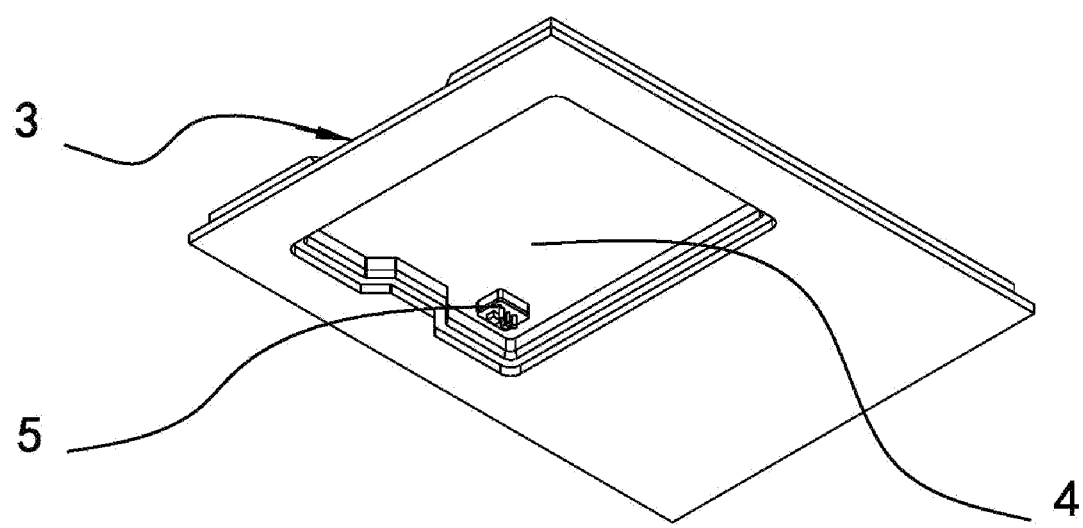
FIG. 3 schematically depicts a structure of a battery compartment in accordance with an embodiment of the present disclosure.

Since the battery body 1 is provided with the recessed area 2, a connecting part in a battery compartment 4 (or other parts used to connect and accommodate the battery body 1) on a battery support 3 of the new energy vehicle is set as a protrusion 5 as shown in FIG. 3. The structures of most vehicles are compact, and thus there are many limitations on the space. Whereas the protrusion 5 is configured to enter the corresponding recess area 2 of the battery body 1 during an arrangement of the battery body 1. No additional space behind the battery compartment 4 is required, that is, the space behind the battery compartment 4 is little occupied, preventing that the battery compartment 4 cannot be arranged in the new energy vehicle due to the occupation space of the connecting part or the battery compartment 4 is limited to a specific position. Therefore, the layout of the battery compartment 4 is flexible, and has strong versatility, greatly expanding the applicable occasion of the battery body.

Figure 4:
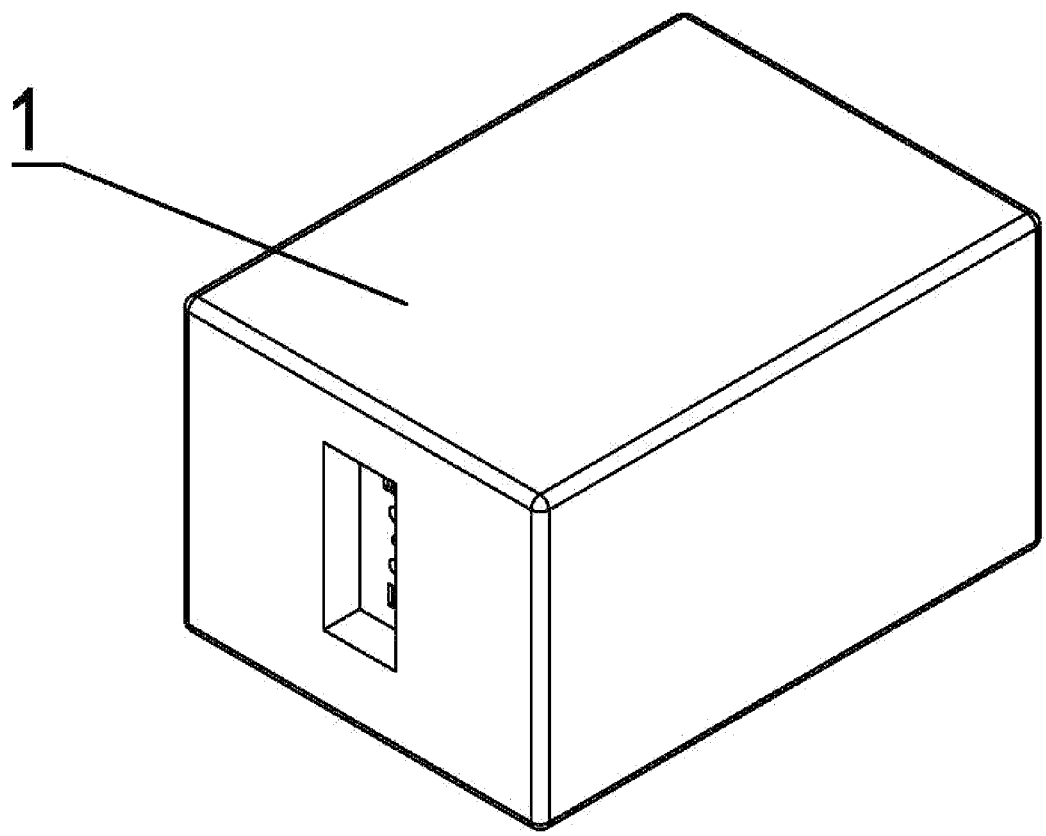
FIG. 4 schematically depicts a structure of the battery body in accordance with an embodiment of the present disclosure.

In FIG. 4, the recessed area 2 is arranged on a side of the battery body 1, and the battery body 1 is laterally arranged on the new energy vehicle.

Figure 5:
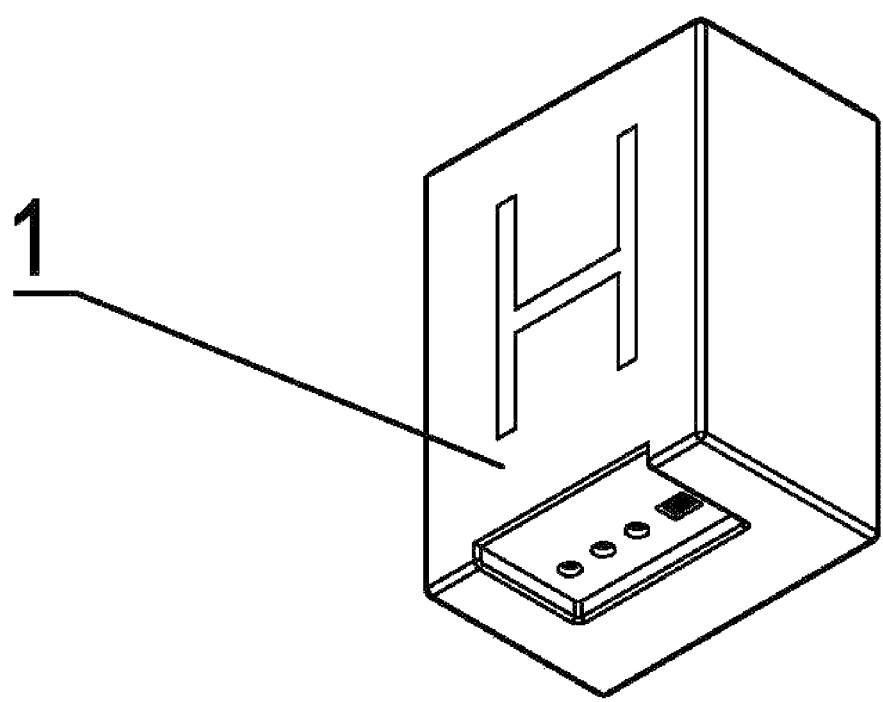
FIG. 5 schematically depicts a structure of the battery body in accordance with an embodiment of the present disclosure.

In FIG. 5, the recessed area 2 is arranged at the lower end of the battery body 1, and the battery body 1 is downward arranged on the new energy vehicle.

Vehicles equipped with the recessed structure mentioned above, the space behind the battery compartment 4 is little occupied by the connecting part. Therefore, the arrangement of the battery compartment on various vehicles is not limited to the occupation space of the connecting part, which increases the applicable occasion and versatility of the power battery.

The recessed area of the recessed structure can be arranged in an end surface or at an edge of the end surface.

Figure 6:
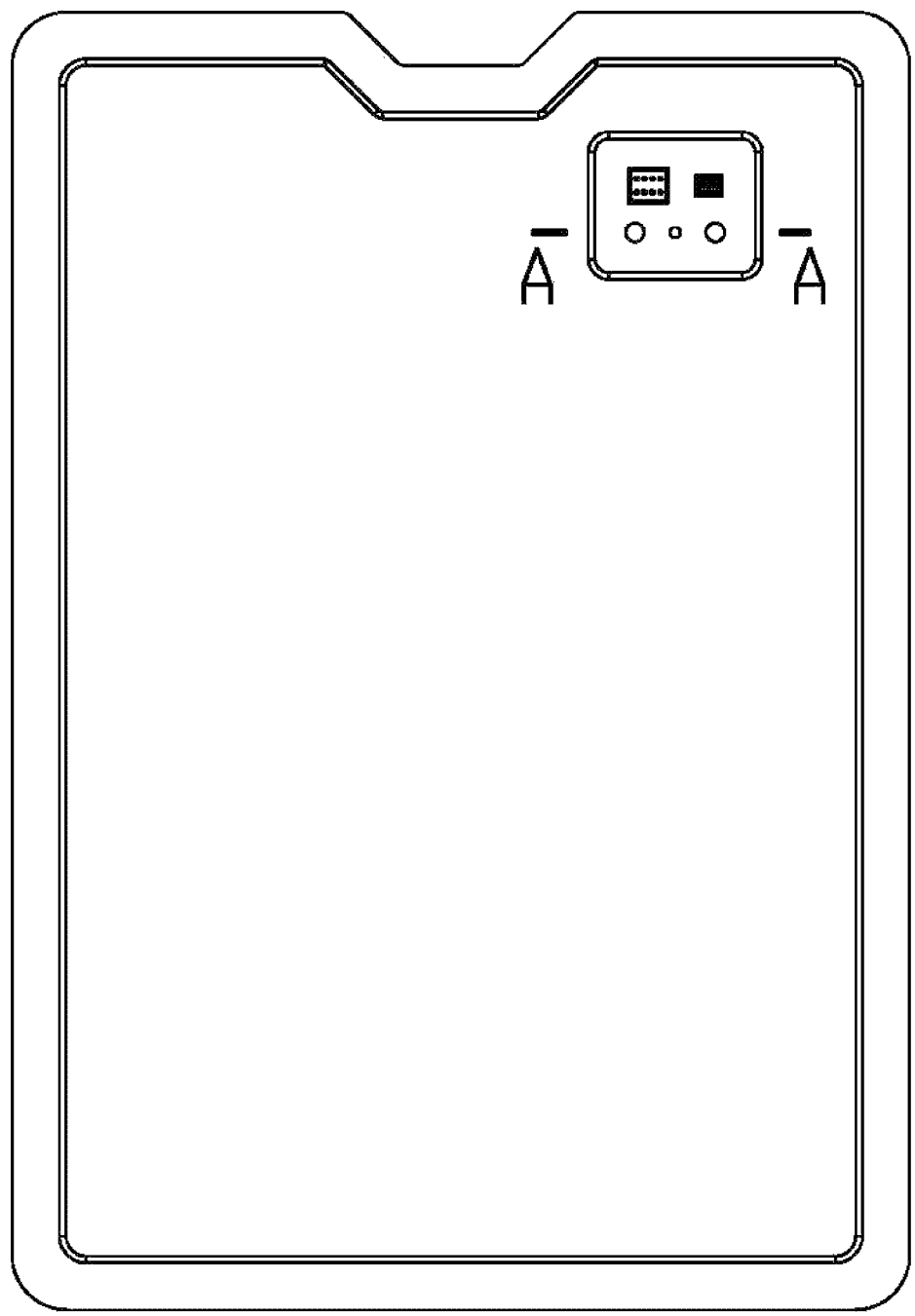
FIG. 6 schematically depicts a structure of a quick-change connection port in accordance with an embodiment of the present disclosure.
Figure 7:
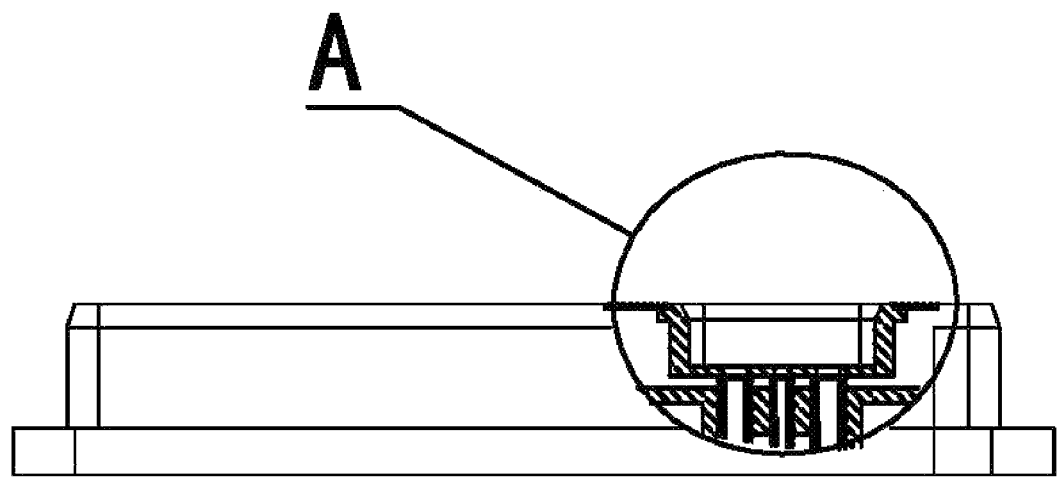
FIG. 7 is a cross-sectional view of the quick-change connection port in accordance with an embodiment of the present disclosure.
Figure 8:
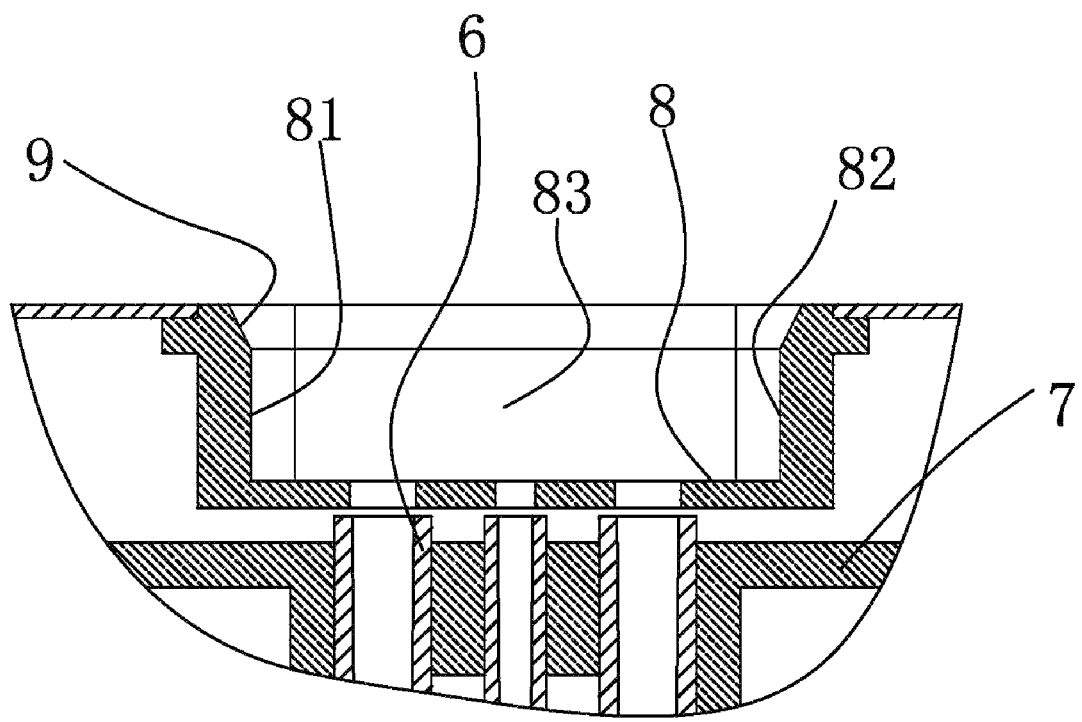
FIG. 8 is an enlarged view of part A in FIG. 7.

FIGS. 6-8 show an embodiment of the recessed area of the recessed structure and the quick-change connection port of the power battery. The recessed area is provided with an electrical connecting part 6 of the quick-change connection port and an internal-insulation fixing part 7. The electrical connecting part 6 includes a primary electrical connecting part and a secondary electrical connecting part. The secondary electrical connecting part may also be arranged on the battery body 1. The electrical connecting part 6 and the internal-insulation fixing part 7 are configured to provide an electrical connection, which belongs to the prior art and is not explained in detail herein. An insulating base surface 8 is arranged in the recessed area 2, and the electrical connecting part 6 and the internal-insulation fixing part 7 are arranged below the insulating base surface 8.

Since the electrical connecting part of the quick-change connection port is arranged within the corresponding insulating base surface 8 and is not exposed to the insulating base surface 8, any two separate electrical connecting parts of the quick-change connection port cannot be electrically connected by any straight-sided conductive object, preventing a short circuit when the two separate electrical connecting parts are touched by a conductive object at the same time. When the power battery is not in use, the primary electrical connecting part is disconnected from the battery body, increasing the safety of the power battery and preventing the power battery from being damaged during the transportation. Therefore, the versatility of the power battery is enhanced.

A lateral gap is provided between an outer shell of the battery body the battery compartment 4 or other parts used to connect and accommodate the battery body, so as to facilitate an installation of the power battery. The lateral gap of the large-sized power battery is relatively large. An inserting direction of the connecting part of the power battery to the new energy vehicle is the same as an arrangement direction of the power battery. A side of the recessed area is in a clearance fit with a side of the protrusion on the new energy vehicle. A fitting gap of the clearance fit is smaller than the lateral gap between the outer shell of the battery body and the battery compartment. The fitting gap is provided with an inward guiding chamfer 9. When the power battery is installed, the recessed area and the protrusion will be aligned, and then the connecting parts can be further aligned through an introduction structure thereof (In order to achieve a final accurate alignment between the connecting parts, the connecting parts may be provided with a lateral floating structure, that is, a small amount of free side movement is allowed, and the recessed area or the protrusion may also be provided with the lateral floating structure). The recessed area of the recessed structure is arranged within the end surface, that is, the recessed area is provided with four side surfaces. Two side surfaces of the four side surfaces faced to each other are aligned along two facing directions. In FIG. 8, a first side face 81 is faced to a second side surface 82. A third side surface is faced to a sided surface that is not shown in FIG. 8. The protrusion corresponding to the battery compartment is provided with two groups of side surfaces. Therefore, the two groups of side surfaces are aligned along the two facing directions. When the recessed area of the recessed structure is arranged at the edge of the end surface, two side surfaces faced to each other are formed. The two side surfaces are aligned with the corresponding side surfaces of the protrusion of the battery compartment.

The multi-connection port structure includes the quick-change connection port arranged on the battery body, and at least two surfaces of the battery body are provided with the quick-change connection port. The two surfaces are faced to different directions. The same face or different faces faced to the same direction can also be provided with the quick-change connection port.

Figure 9:
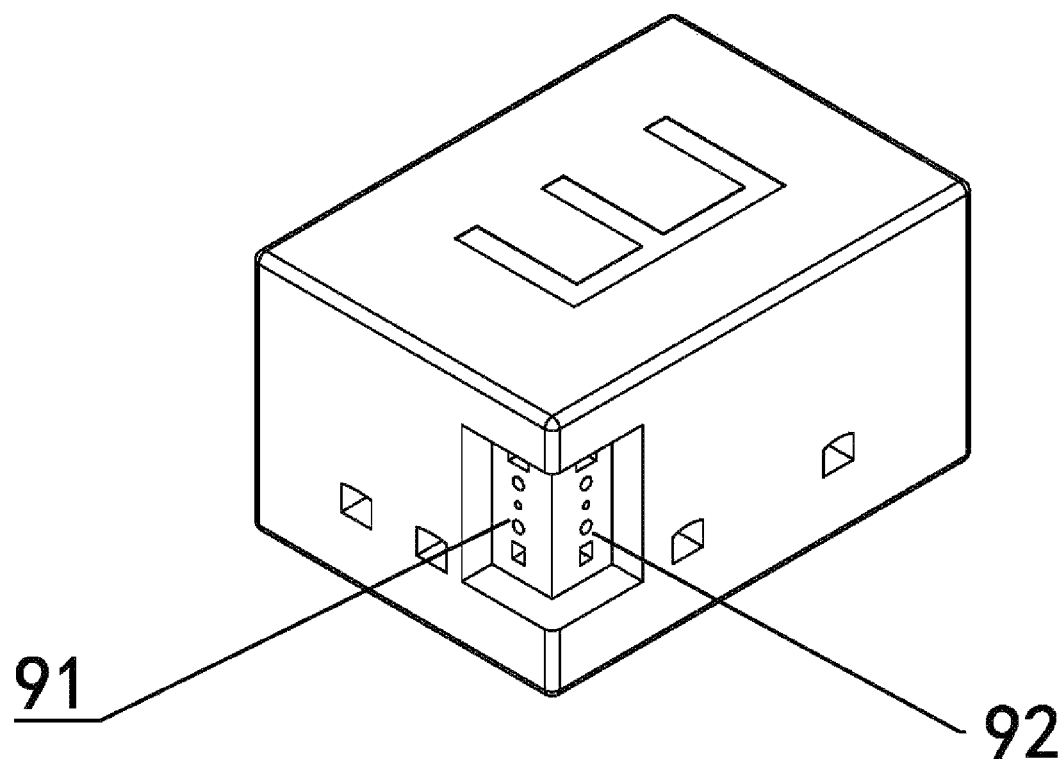
FIG. 9 schematically depicts a multi-connection port structure of a power battery in accordance with an embodiment of the present disclosure.

FIG. 9 is a first embodiment of the multi-connection port structure of the power battery. The power battery is an E-type power battery, which includes a battery body, a quick-change connection port. The fast replacing port is arranged on the battery body. The quick-change connection port includes a first port assembly 91 and a second port assembly 92. The first port assembly 91 is arranged at a front end of a left side of the battery body. The second port assembly 92 is arranged at a left end of a front side of the battery body. The E-type power battery is generally arranged leftward or forward on a truck or a large passenger vehicle. The power battery can be arranged on various vehicles in various ways.

Figure 48A:
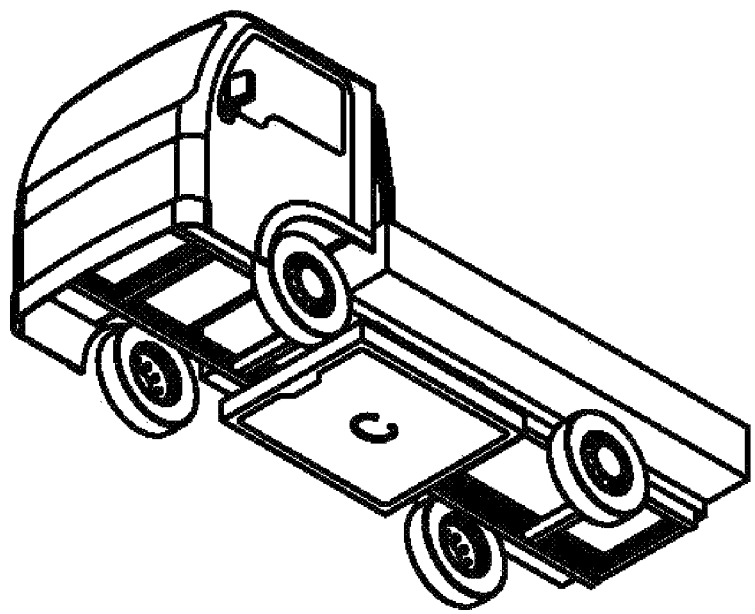
FIGS. 48A-E schematically depict arrangement positions of the power battery in trucks with different models.
Figure 48B:
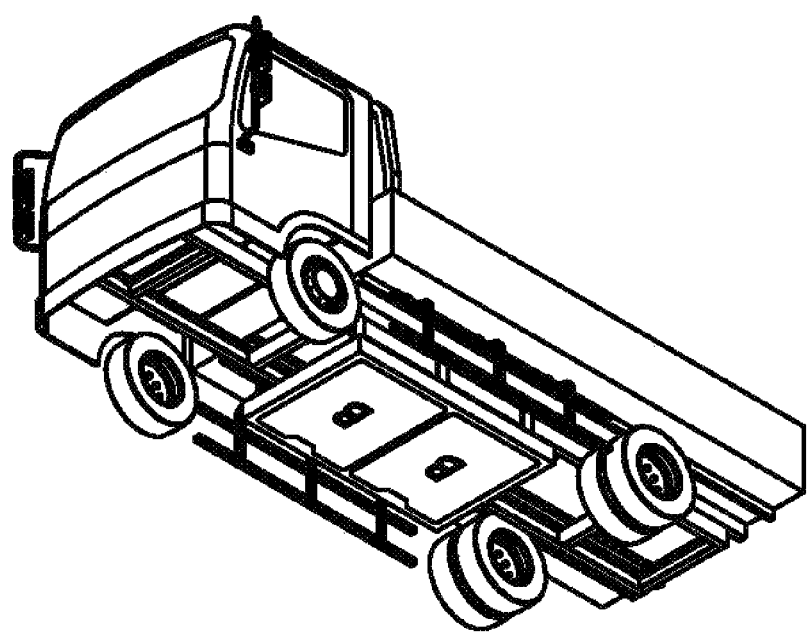
Figure 48C:
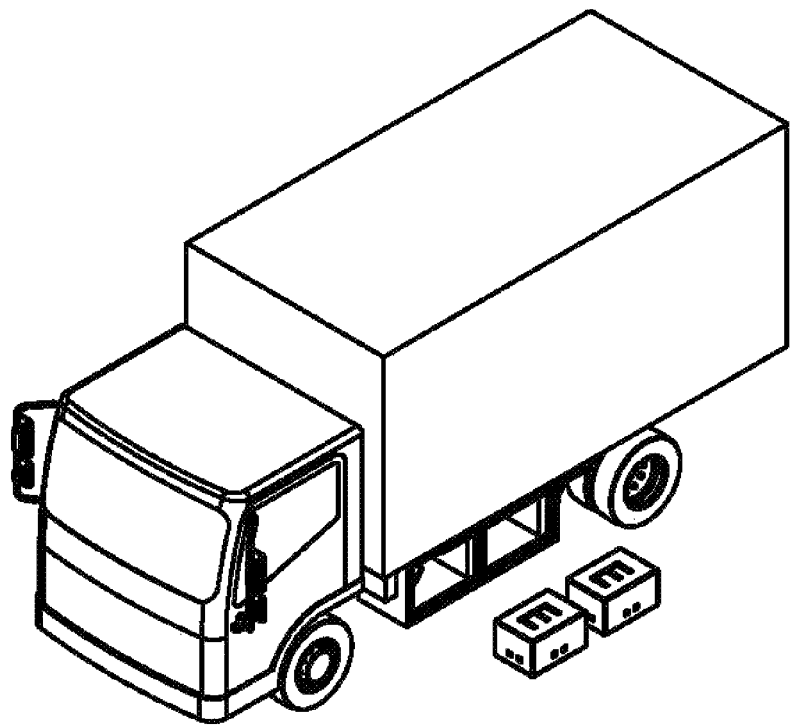
Figure 48D:
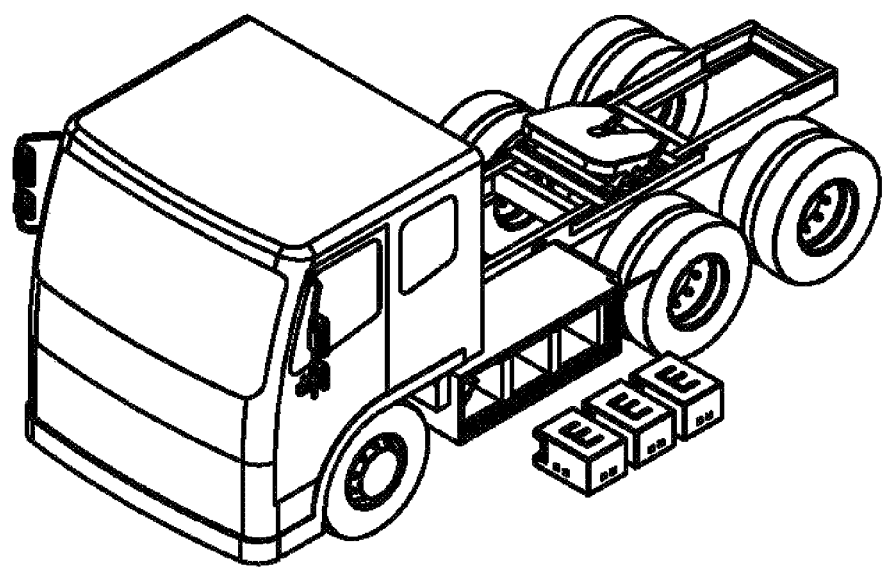
Figure 48E:
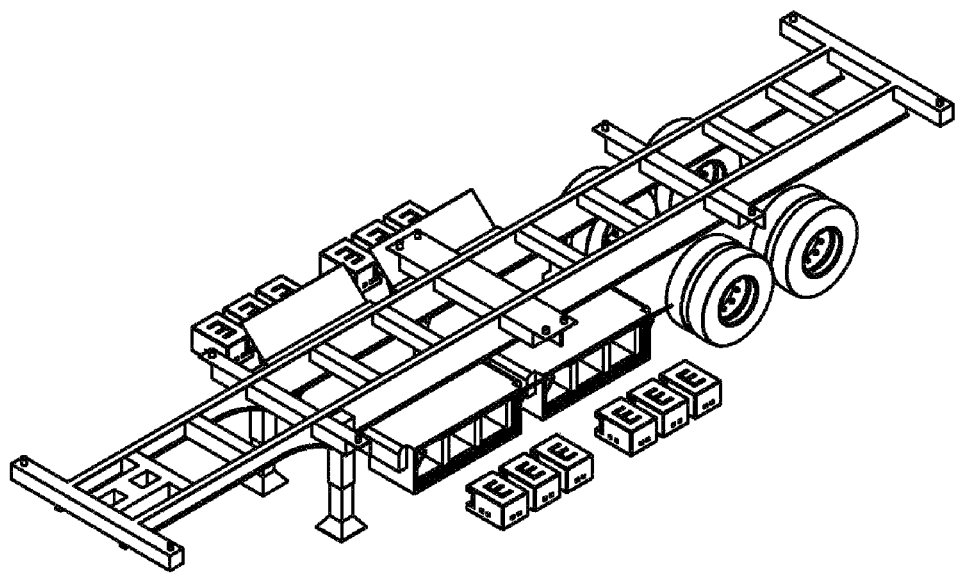

FIGS. 48c-48e schematically depict several arrangements of the E-type power battery in various trucks. The battery compartments are arranged on both sides of the beams of the trucks. The E-type power battery is arranged in the battery compartment from a side of the vehicle. As shown in FIG. 48c, both sides of a light-truck beam are small, and the power battery is loaded from a width direction. As shown in FIG. 48d, both sides of a heavy-truck beam are large, and the power battery is loaded from a length direction. As shown in FIG. 48e, both sides of a semi-trailer beam are large, and the power battery is loaded from a length direction. The E-type power battery is provided with two groups of quick-change connection ports, and thus can be arranged on various vehicles in various ways, increasing the applicable occasion and versatility of the power battery.

Figure 10:
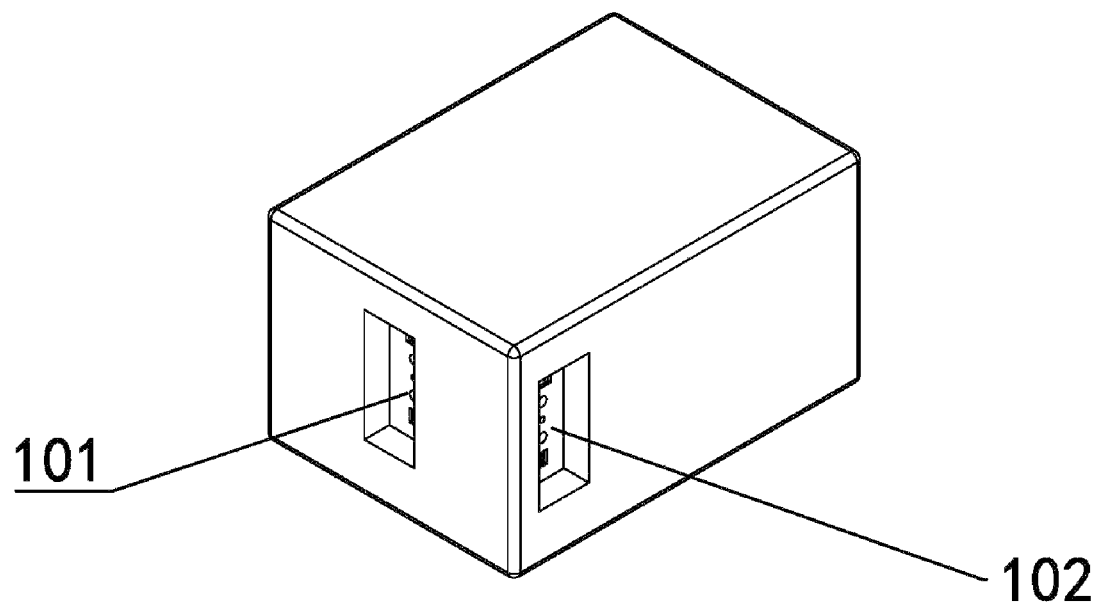
FIG. 10 schematically depicts the multi-connection port structure of the power battery in accordance with an embodiment of the present disclosure.

FIG. 10 is a second embodiment of the multi-connection port structure of the power battery. Compared to the power battery in the first embodiment, positions of a first port assembly 101 and a second port assembly 102 are different. The first port assembly 101 is arranged in a middle of the left side of the battery body, and the second port assembly 102 is arranged at the left end of the front side of the battery body and keeps a distance from a wall of the left end. The power battery provided herein is generally arranged on a truck or a large passenger vehicle, and is arranged on the vehicle to the left or forward. The power battery can be arranged on various vehicles in various ways, increasing the applicable occasion and versatility of the power battery.

Figure 11:
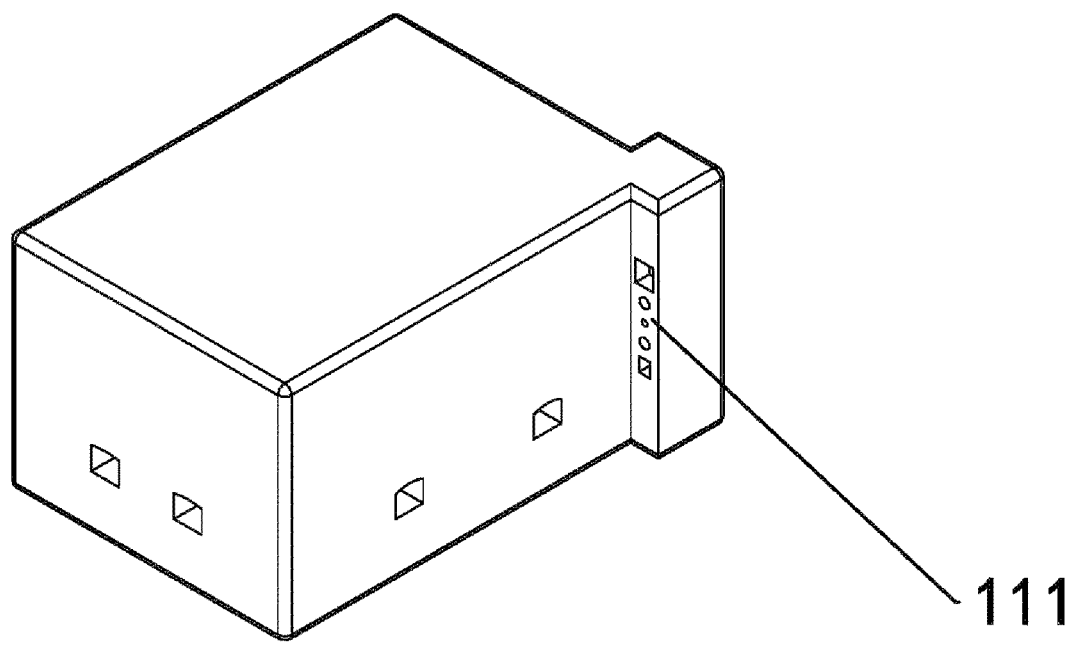
FIG. 11 schematically depicts the multi-connection port structure of the power battery in accordance with an embodiment of the present disclosure.

FIG. 11 is a third embodiment of the multi-connection port structure of the power battery. The power battery includes the battery body. A front side and a right side of the battery body are connected to a protrusion column. The protrusion column is provided with the quick-change connection port. The quick-change connection port includes a first port assembly 111 and a second port assembly. The first port assembly 111 is arranged at a left end of the protrusion column, and the second port assembly is arranged at a rear end of the protrusion column (not shown). The power battery provided herein is generally arranged leftward or backward on a truck or a large passenger vehicle.

Figure 12:
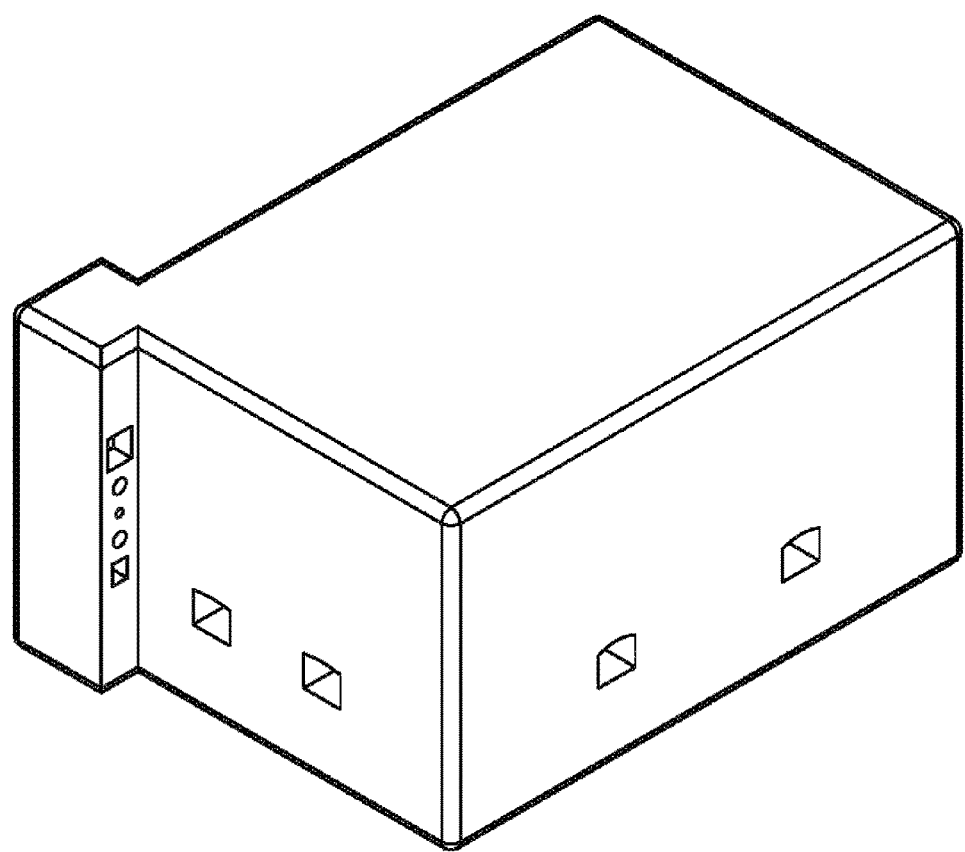
FIG. 12 schematically depicts the multi-connection port structure of the power battery in accordance with an embodiment of the present disclosure.

FIG. 12 depicts the power battery in the third embodiment from a different angle. The power battery is arranged on the vehicle to the forward or right. The power battery can be arranged on various vehicles in various ways, increasing the applicable occasion and versatility of the power battery.

Figure 13:
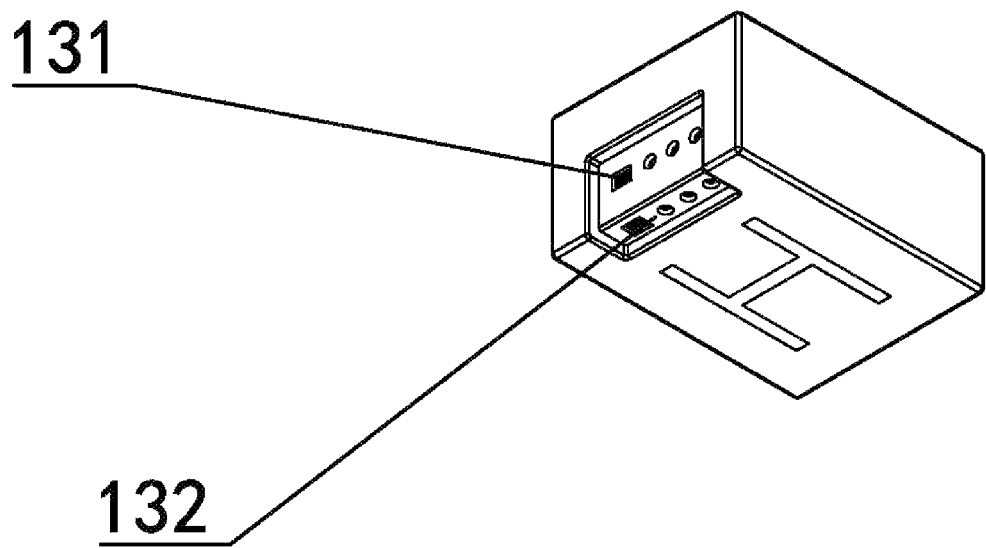
FIG. 13 schematically depicts the multi-connection port structure of the power battery in accordance with an embodiment of the present disclosure.
Figure 14:
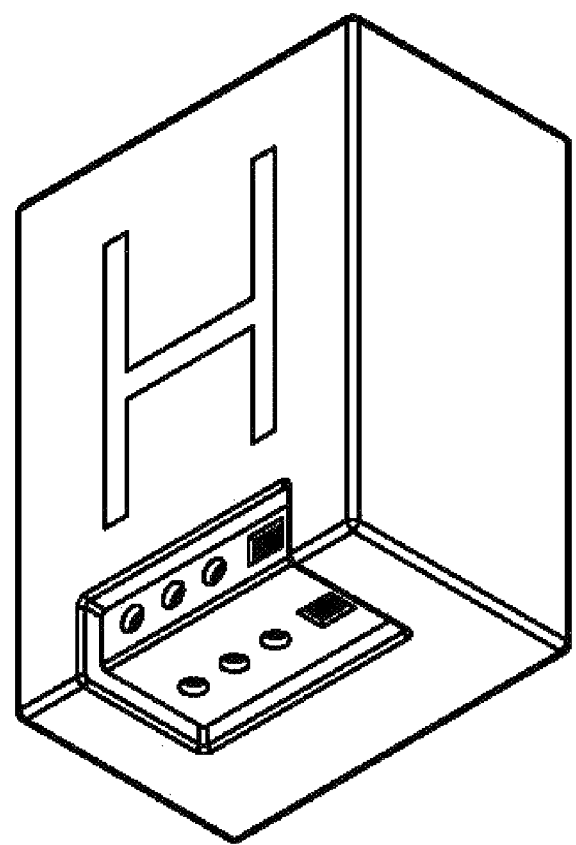
FIG. 14 schematically depicts the multi-connection port structure of the power battery in accordance with an embodiment of the present disclosure.

FIG. 13 is a third embodiment of the multi-connection port structure of the power battery. Compared to the power battery in the first embodiment, positions of a first port assembly 131 and a second port assembly 132 are different. The first port assembly 131 is arranged at a left side of a bottom end of the battery body, and the second port assembly 132 is arranged at a bottom of a left side of the battery body. The power battery provided herein is generally arranged on a small vehicle, and is arranged on the vehicle to the left or forward. The quick-change connection port of the power battery can be inverted as shown in FIG. 14. The power battery can be arranged on various vehicles in various ways, increasing the applicable occasion and versatility of the power battery.

Figure 15:
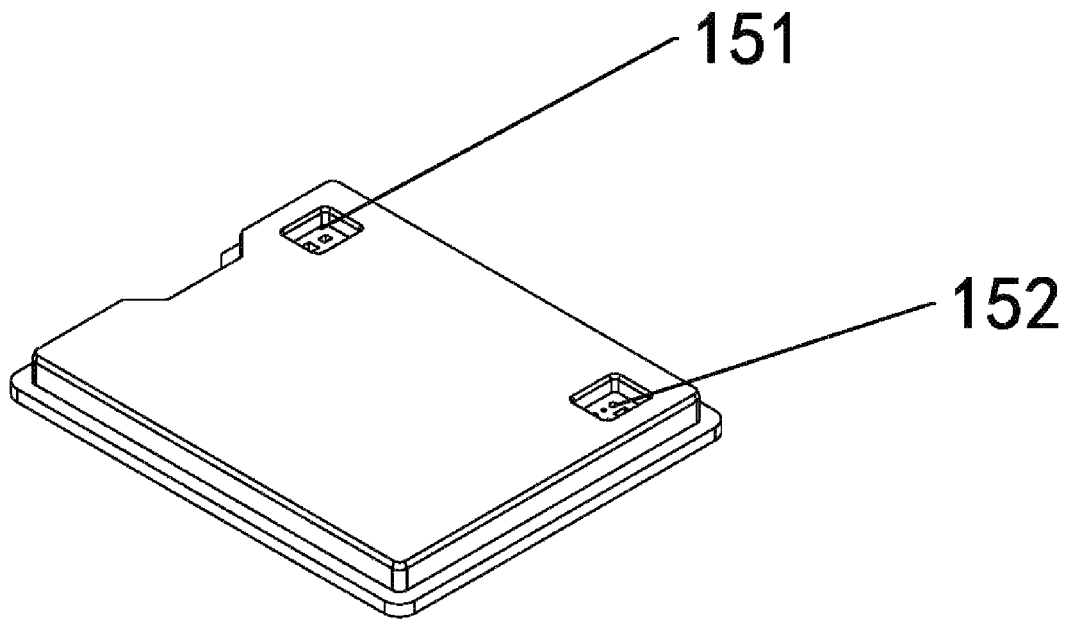
FIG. 15 schematically depicts the multi-connection port structure of the power battery in accordance with an embodiment of the present disclosure.

As shown in FIG. 15, a plurality of quick-change connection ports are arranged on the same surface. The power battery provided herein includes the battery body. The quick-change connection port includes a first port assembly 151 and a second port assembly 152. The first port assembly 151 is arranged at a rear side of a top end of the battery body close to a right side. The second port assembly 152 is arranged at a front side of the top end of the battery body close to the right side. The power battery provided herein can be arranged on various passenger vehicles, trucks and buses, and is upward arranged on the vehicle.

The power battery is provided with a plurality of quick-change connection ports, such that the power battery is able to be arranged at various connection positions or to be arranged in various directions, increasing the applicable occasion and versatility of the power battery. The various connection positions help the new energy vehicle to avoid an inappropriate port position. The power battery can be arranged in different direction under different conditions, fully utilizing the arrangement space of the new energy vehicle while reducing the variety of the power battery. The plurality of quick-change connection ports increase the applicable occasion and versatility of the power battery.

The performance of the power battery is mostly affected by temperature and needs to be controlled within a suitable temperature range. The common methods of temperature-control of the power battery are air cooling, liquid cooling (the heat passes through a liquid loop to a radiator to dissipate heat, and a heater can also be used to heat the power battery by heating the liquid; the loop can also only heat up the power battery without a radiator), direct cooling (a compressed refrigerant dissipates heat in a condenser, and enters an evaporator arranged inside the power battery after throttling to evaporate and absorb heat to cool the power battery; the loop is provided with a reversing valve such as a four-way valve that can reverse a flow direction of the loop; the original evaporator and the condenser are interchanged to heat the power battery; the loop can also be one-way heating loop for the power battery; direct cooling loop heating is generally referred to as heat pump heating) and a combination thereof. There are also other methods such as semiconductor refrigeration. Liquid temperature-control includes liquid cooling, direct cooling and a combination thereof. Other innovative liquid temperature-control methods can also be used. The liquid temperature-control has a strong ability of temperature-control, and the temperature-control effect is generally better than other methods such as air cooling and semiconductor refrigeration. Vehicles with high electrical power and high heat generation from power batteries or vehicles often used in a high-temperature or a and low-temperature environment should be equipped with the liquid temperature-control. The power battery is provided with the liquid temperature-control, and a liquid temperature-control loop is independent. All components of the liquid temperature-control loop are arranged on the battery body to meet different requirements for temperature-control ability in different usage conditions of various new energy vehicles. The power battery does not require the new energy vehicle to have an ability to form a combined liquid temperature-control system with the power battery as the existing quick-change power battery does. The liquid temperature-control loop is no need to be disconnected and reconnected during a battery replacement. The battery body is no need to be provided with a connecting port for a liquid temperature-control loop connected to the new energy vehicle. In addition, it is not necessary for all new energy vehicles using the power battery to use the same refrigerant or the same cooling liquid, reducing the constraints to the development of power battery temperature-control technology. Therefore, various vehicles can solve the problem of battery temperature-control through using the power battery. The applicable occasion and versatility of the power battery are increased.

The independent liquid temperature-control loop includes a direct cooling loop or/and a liquid cooling loop. The direct cooling loop and the liquid cooling loop are arranged on the battery body and are arranged on a surface of the power battery as a component of an external heat exchanger. The direct cooling loop or the liquid cooling loop is not limited to a single loop, and can have a branch and a multiple-loop coupling.

Figure 16:
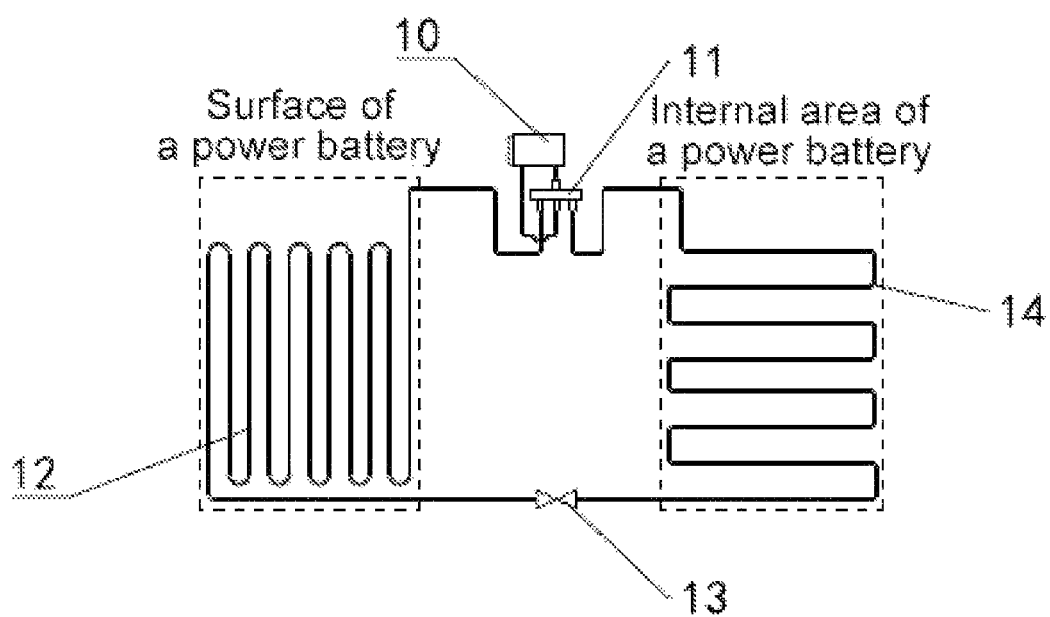
FIG. 16 schematically depicts a structure of a direct cooling loop of the power battery in accordance with an embodiment of the present disclosure.

FIG. 16 is a first embodiment of the independent liquid temperature-control loop of the power battery, and schematically depicts a structure of a direct cooling loop. The direct cooling loop includes a compressor 10. The compressor 10 is connected to a four-way valve 11, a condenser 12, a throttling device 13 and an evaporator 14 through a pipeline. A refrigerant is used in the direct cooling loop. The compressor 10, the four-way valve 11, the condenser 12, the throttling device 13, the evaporator 14 and the pipeline are all arranged on the battery body. In the traditional liquid temperature-control loop, some components are arranged on the battery body, and the other components are arranged on the vehicle. Disassembly and assembly of the power battery needs to disconnect the loop. Therefore, it is difficult to implement on the quick-change power battery and the stability of loop is easy to be affected. When the vehicle is equipped with multiple quick-change power batteries, the loop is more complicated and difficult to implement. All components of the direct cooling loop provided herein are arranged on the battery body, and the liquid temperature-control can work independently. The liquid temperature-control loop is no need to be disconnected and reconnected during a battery replacement. In addition, it is not necessary for all new energy vehicles using the power battery to use the same refrigerant, reducing the constraints to the development of power battery temperature-control technology. Therefore, various vehicles can solve the problem of battery temperature-control through using the power battery. The applicable occasion and versatility of the power battery are increased.

Figure 17:
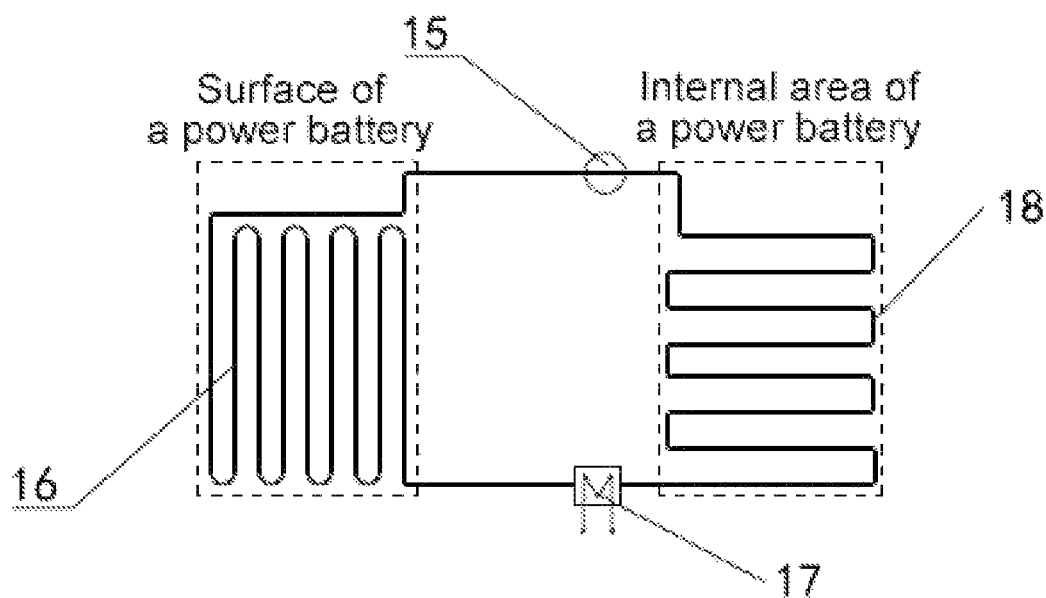
FIG. 17 schematically depicts a structure of a liquid cooling loop of the power battery in accordance with an embodiment of the present disclosure.

FIG. 17 is a second embodiment of the independent liquid temperature-control loop of the power battery, and schematically depicts a structure of a liquid cooling loop. The liquid cooling loop includes a pump 15, a radiator 16, a heater 17 and a liquid cooling pipeline 18. Water or a cooling liquid is used in the liquid cooling loop. The pump 15, the radiator 16, the heater 17 and the liquid cooling pipeline 18 are all arranged on the battery body. In the traditional liquid temperature-control loop, some components are arranged on the battery body, and the other components are arranged on the vehicle. Disassembly and assembly of the power battery needs to disconnect the loop. Therefore, it is difficult to operate the liquid cooling loop of the power battery on the quick-change power battery. When the vehicle is equipped with multiple quick-change power batteries, the operation is more complicated and difficult to implement. All components of the liquid cooling loop provided herein are arranged on the battery body, and the liquid temperature-control can work independently. The liquid temperature-control loop is no need to be disconnected and reconnected during a battery replacement. In addition, it is not necessary for all new energy vehicles using the power battery to use the same cooling liquid, reducing the constraints to the development of power battery temperature-control technology. Therefore, various vehicles can solve the problem of battery temperature-control through using the power battery. The applicable occasion and versatility of the power battery are increased.

Figure 18:
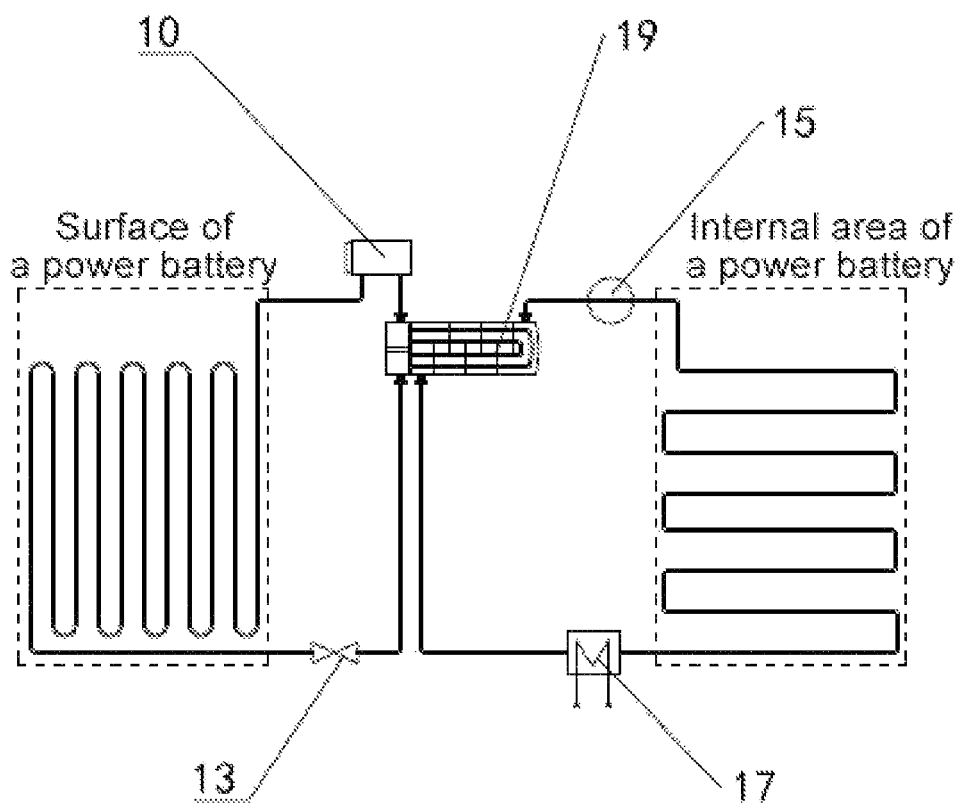
FIG. 18 schematically depicts a coupling loop of the direct cooling loop and the liquid cooling loop of the power battery in accordance with an embodiment of the present disclosure.

FIG. 18 is a third embodiment of the independent liquid temperature-control loop of the power battery, and schematically depicts a coupling loop of the direct cooling loop and the liquid cooling loop. The coupling loop of the direct cooling loop and the liquid cooling loop includes a compressor 10, a direct cooling pipe, a condenser 12, a throttling device 13, an evaporator 14, a cooling device 19, a pump 15, a radiator 16, a heater 17 and a liquid cooling pipeline 18. The cooling device 19 is coupled with the evaporator 14 of the direct cooling loop and the radiator 16 of the liquid cooling loop, and the direct cooling loop and the liquid cooling loop in the cooling device (the direct cooling loop and the liquid cooling loop are not connected). The compressor 10, the direct cooling pipeline, the condenser 12, the throttling device 13, the evaporator 14, the cooling device 19, the pump 15, the radiator 16, the heater 17 and the liquid cooling pipeline 18 are all arranged on the battery body, and thus the liquid temperature-control of the battery body is independent, increasing the applicable occasion and versatility of the power battery. The coupling loop of the direct cooling loop and the liquid cooling loop can be used to cool the power battery. If the direct cooling loop is used for internal heating, or the direct cooling loop is added with a four-way valve 11 to reverse a flow direction of the loop for the internal heating, the coupling loop can heat up the power battery without using the heater 17 or can be combined with the heater 17 to heat up the power battery.

The power battery is provided with the independent liquid temperature-control circuit. A component as an external heat exchanger is arranged on a surface on which it is in an air circulation environment or an air circulation environment that is easy to create (some loops, such as a liquid cooling loop that only heats the battery, may not need to be used as a radiator for the external heat exchanger). The power battery, which is upward arranged from the bottom of the vehicle, can be arranged at the lower end of the power battery. The vehicle using this power battery can also be equipped with a device at the bottom to promote air circulation, and accelerate the heat exchange between the external heat exchanger and the air during low-speed and high-power driving or charging. With respect to the power battery arranged in the battery compartment on the side of the vehicle in FIGS. 48c-e, the external heat exchanger can be arranged at an upper end of the power battery. There is a space between the upper end of the battery and an upper surface of the battery compartment. The space can be communicated the outside and create an air flow environment by being provided with a fan. The power battery itself can also be equipped with a fan to speed up the heat exchange between the external heat exchanger and the air. The external heat exchanger can also be arranged at a lower end of the power battery. A bottom surface of the battery compartment is made of a heat-dissipating material. An inner surface (top) of the bottom surface of the battery compartment is in contact with the external heat exchanger of the power battery, and an outside (bottom) of the bottom surface of the battery compartment is exposed to the air. In an embodiment, a large through hole is provided in a middle of the bottom surface of the battery compartment to directly expose the external heat exchanger of the power battery to the air. In another embodiment, the external heat exchanger is respectively arranged at an upper end and a lower end of the power battery to enlarge an external heat exchange surface.

If the external heat exchanger is arranged at a vulnerable place, such as the bottom of the vehicle, and is exposed to the outside, the cooling liquid or refrigerant should be flame-retardant for safety.

If some components of the liquid temperature-control loop need to be arranged at an unsealed place, the corresponding part of the power battery can be designed to be communicated with the outside.

The battery body is provided with one or more of the recessed structure, the independent liquid temperature-control loop and the multi-connection port structure, increasing the applicable occasion and versatility of the power battery. Combining with shapes and sizes of the power battery, several models of the power battery are determined, such that the power battery can be used in most of new energy vehicles and the battery replacement is popularized. Some embodiments are described below.

The battery body is configured to output different voltages through an internal change. In some embodiments, the internal change is realized by switching a series-parallel connection of a plurality of equivalent battery packs to allow the battery body to output different voltages. Increasing the number of the plurality of equivalent battery packs connected in series will increase an output voltage of the battery body. Decreasing the number of the plurality of equivalent battery packs connected in series will decrease the output voltage of the battery body. Each of the plurality of equivalent battery packs is a battery cell or a battery pack. The battery cell is suitable for parallel connection. The battery pack is composed of a plurality of battery cells connected in series or parallel, and the battery pack is suitable for parallel connection.

Figure 19:
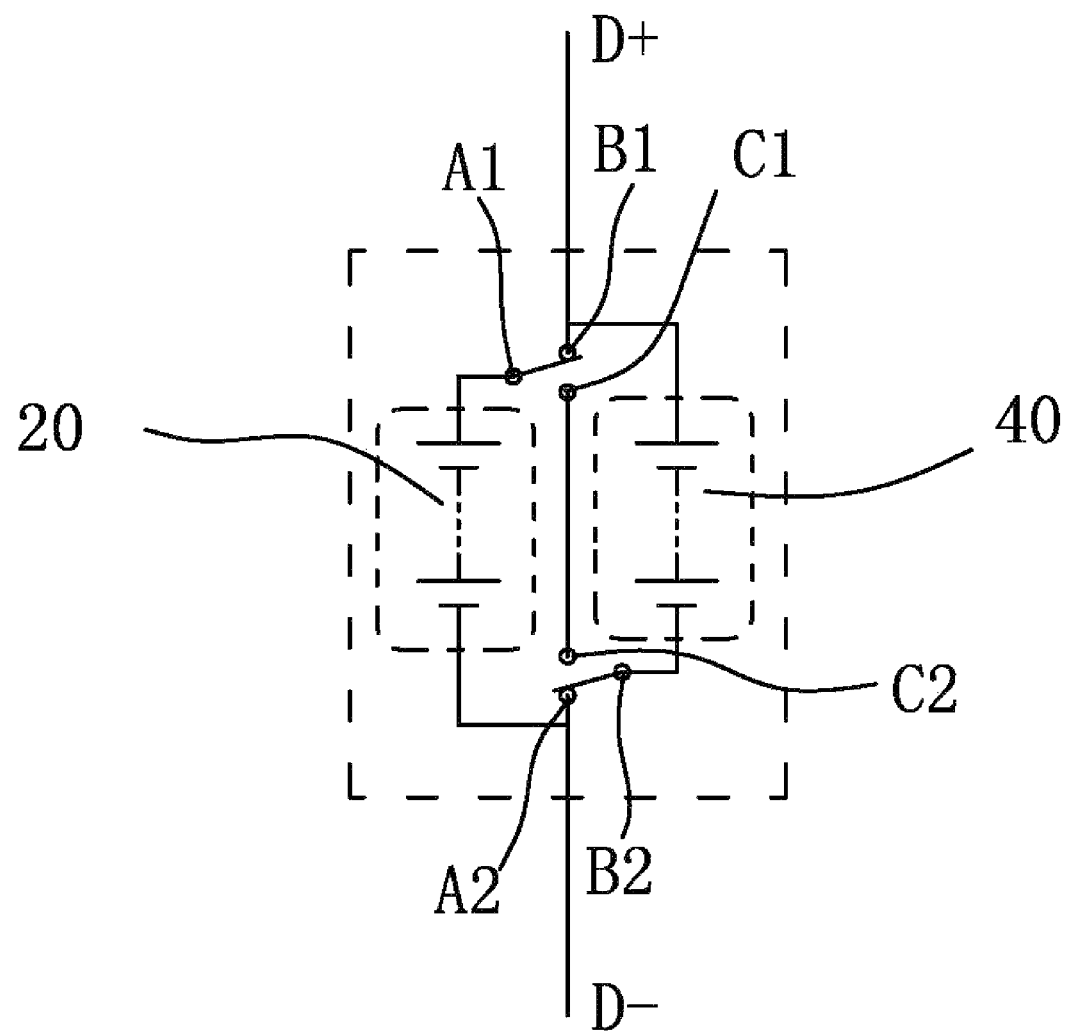
FIG. 19 schematically depicts an internal connection state of the power battery in accordance with an embodiment of the present disclosure.
Figure 20:
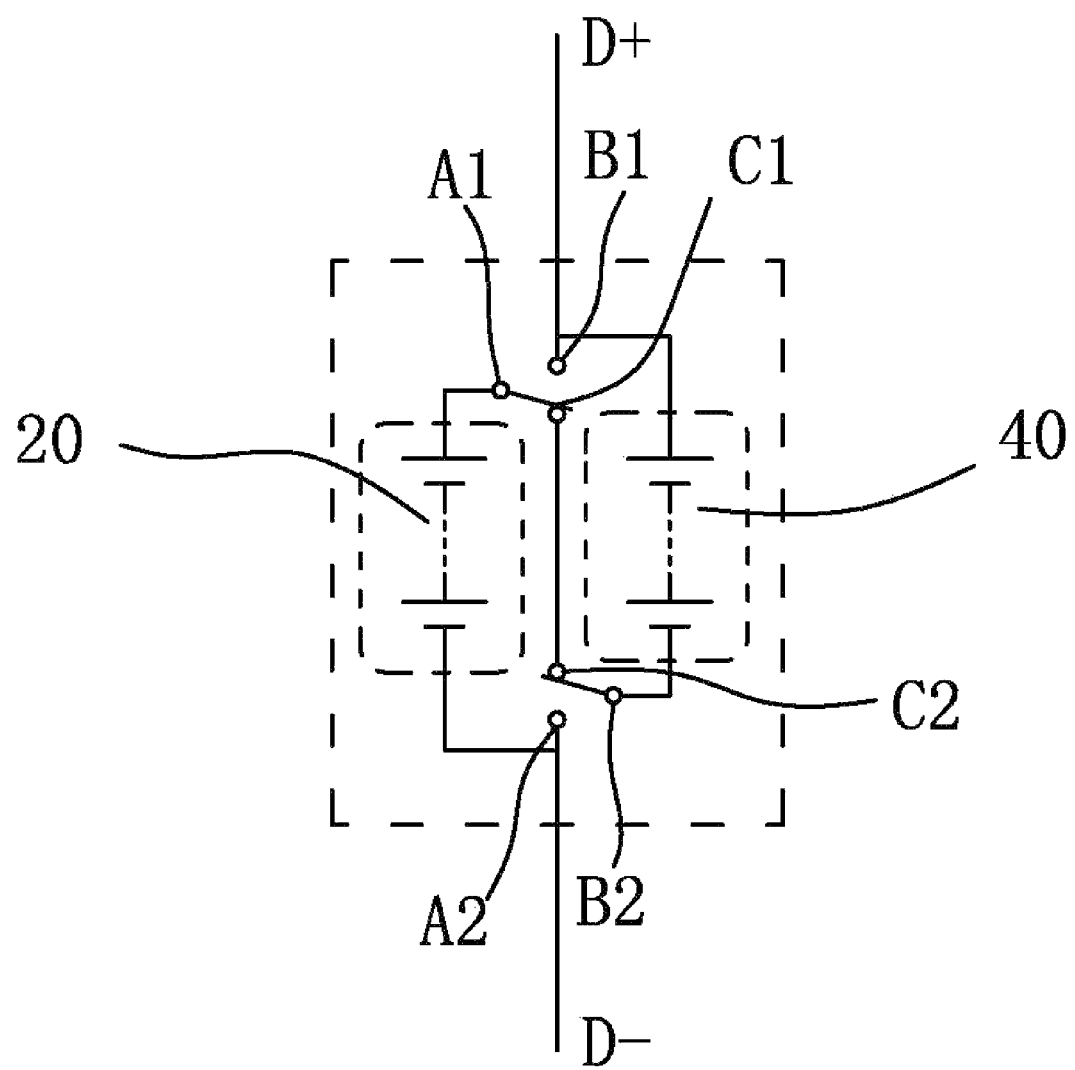
FIG. 20 schematically depicts the internal connection state of the power battery in accordance with an embodiment of the present disclosure.

FIGS. 19-20 are a first embodiment of a connection between the plurality of equivalent battery packs in the power battery. A first battery pack 20 and a second battery pack 40 are arranged in the battery body. A positive pole of the first battery pack 20 is connected to a terminal A1, and a negative pole of the first battery pack 20 is connected to a terminal A2. A positive pole of the second battery pack 40 is connected to a terminal B1, and a negative pole of the second battery pack 40 is connected to a terminal B2. A terminal C1 and a terminal C2 are connected by a wire. The terminal A1 can be selectively connected or disconnected to the terminal B1 and the terminal C1. The terminal B2 can be selectively connected or disconnected to the terminal C2 and the terminal A2. FIG. 19 shows a state of the first battery pack 20 and the second battery pack 40 inside the power battery. The terminal A1 and the terminal B1 are connected, and the terminal A1 and the terminal C1 are disconnected. The terminal A2 and the terminal B2 are connected, and the terminal B2 and the terminal C2 are disconnected. The first battery pack 20 and the second battery pack 40 are connected in parallel, and a voltage of the battery body is a voltage of a single battery pack.

FIG. 20 shows another state of the first battery pack 20 and the second battery pack 40 inside the power battery. The terminal A1 and the terminal C1 are t connected, and the terminal A1 and the terminal B1 are disconnected. The terminal B2 and the terminal C2 are connected, and the terminal B2 and the terminal A2 are disconnected. The first battery pack 20 and the second battery pack 40 are connected in series, and the voltage of the battery body is a sum of voltages of the two battery packs. The connection or disconnection of the aforementioned terminals can be directly pushed by a switch, or can be realized automatically under control, such as switching of a control relay or a contactor. Due to the switching method, an output after the voltage conversion basically does not increase an additional power loss.

Figure 21:
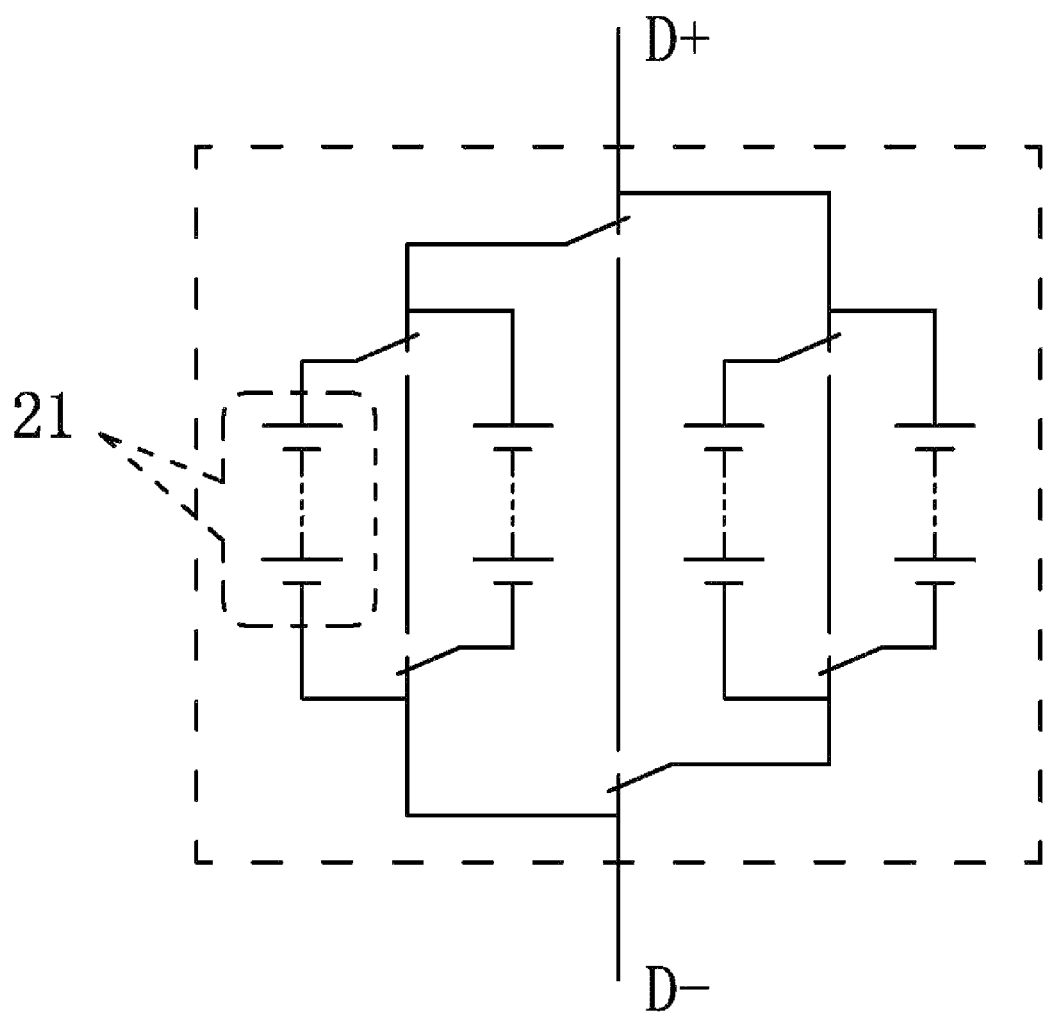
FIG. 21 schematically depicts the internal connection state of the power battery in accordance with an embodiment of the present disclosure.

FIG. 21 is a second embodiment of a connection between the plurality of equivalent battery packs in the power battery. Compared with the first embodiment, the difference is that two sets of a first battery pack and a second battery pack are provided. Four equivalent battery packs, those are, the first battery packs 21, are connected in parallel, and the voltage of the power battery is X at this time.

Figure 22:
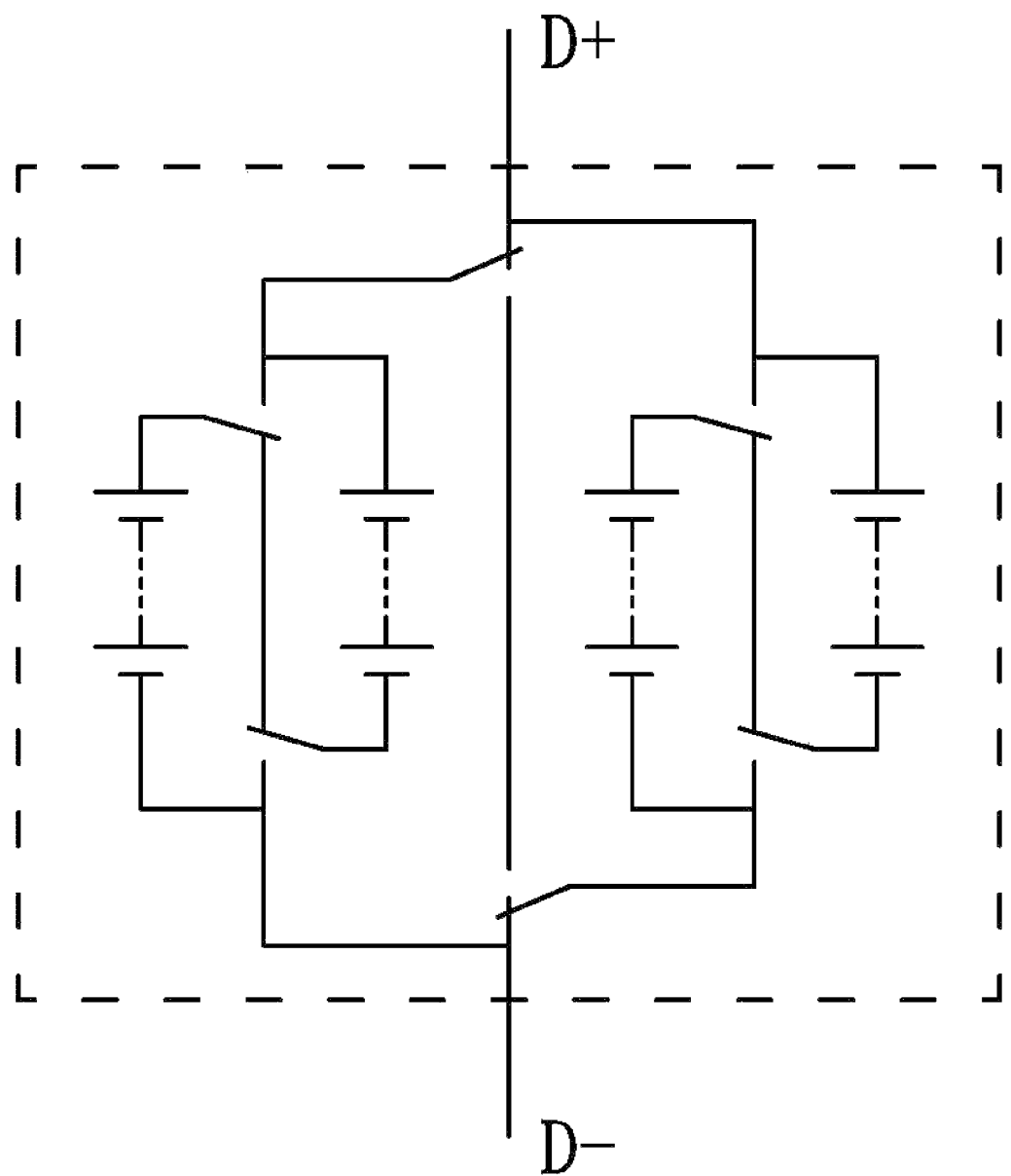
FIG. 22 schematically depicts the internal connection state of the power battery in accordance with an embodiment of the present disclosure.

FIG. 22 shows another state of the connection of the battery packs inside the power battery in the second embodiment. A new circuit is formed by connection and disconnection of the terminals. Two of the four equivalent battery packs are connected in parallel, and the other two are connected in series. The four equivalent battery packs are the first battery packs. The voltage of the power battery increases to 2×.

Figure 23:
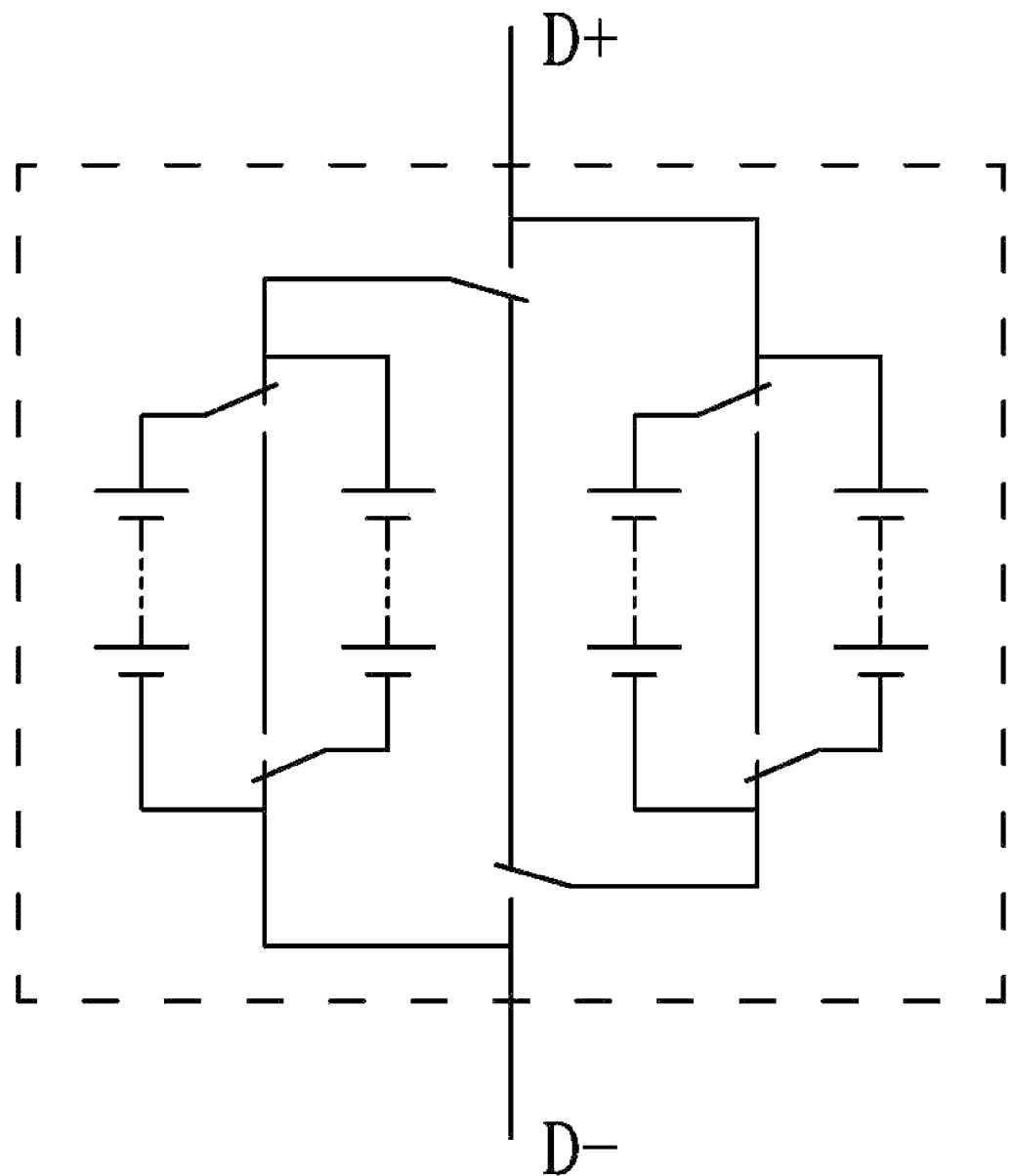
FIG. 23 schematically depicts the internal connection state of the power battery in accordance with an embodiment of the present disclosure.
Figure 24:
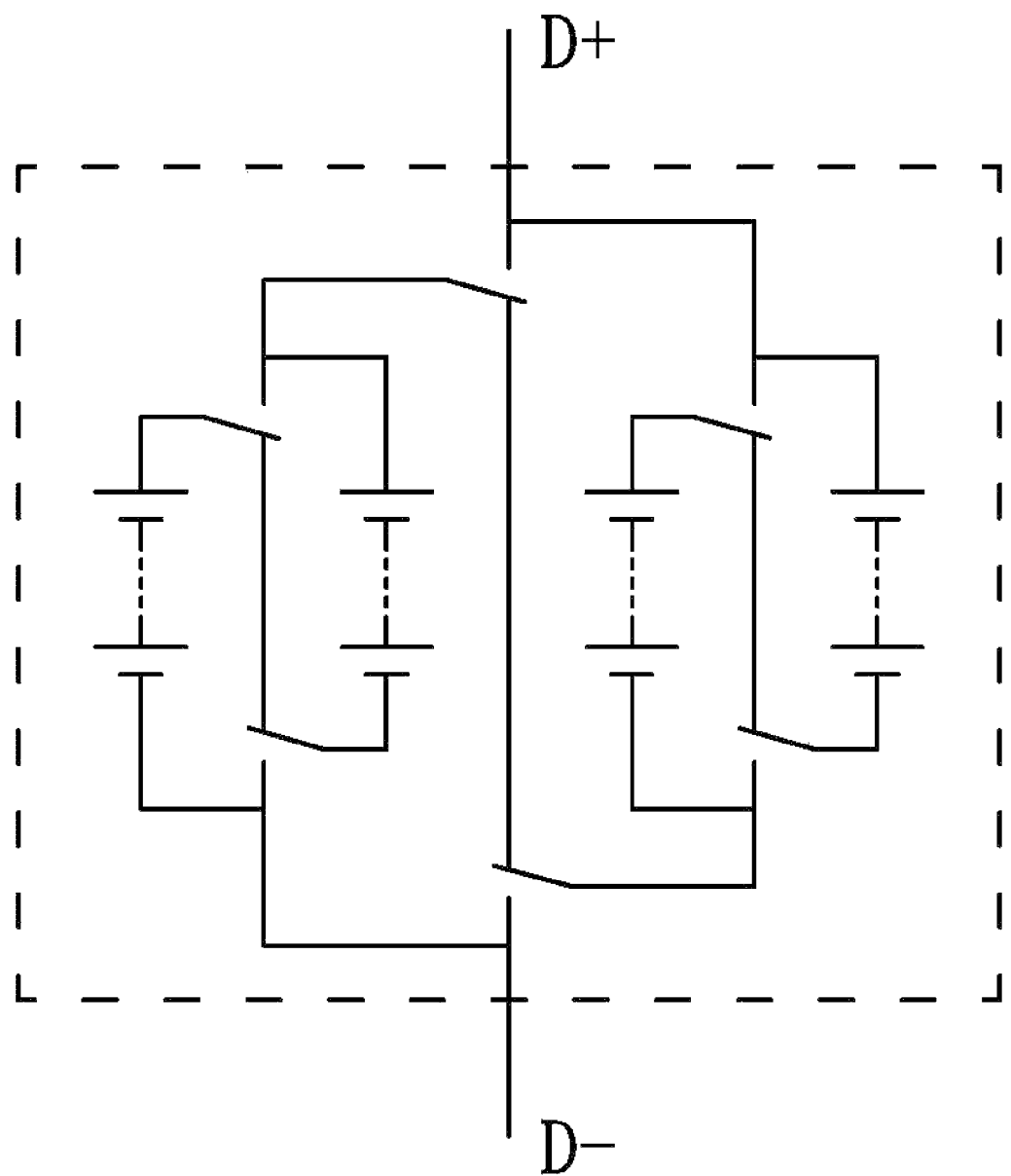
FIG. 24 schematically depicts the internal connection state of the power battery in accordance with an embodiment of the present disclosure.

FIG. 23 shows another state of the connection of the battery packs inside the power battery in the second embodiment. A new circuit is formed by connection and disconnection of the terminals. Two of the four equivalent battery packs are connected in parallel, and the other two are connected in series. The four equivalent battery packs are the first battery packs. The voltage of the power battery increases to 2×.

FIG. 23 shows another state of the connection of the battery packs inside the power battery in the second embodiment. A new circuit is formed by connection and disconnection of the terminals. The four equivalent battery packs, those are, are the first battery packs, are connected in series. The voltage of the power battery increases to 4×.

The foregoing embodiments can also have other states. All terminals in the first embodiment are disconnected. The terminal A1 is disconnected from the terminal B1 and the terminal C1. The terminal B2 is disconnected from the terminal A2 and the terminal C2. There is no connection between each equivalent battery pack, and the battery body has no output voltage. There are also two states in which the battery body has no output voltage. (a) The terminal A1 is disconnected from the terminal B1, the terminal A1 and the terminal C1 are connected; and terminal B2 is disconnected from the terminal A2 and the terminal C2. (b) The terminal A1 is disconnected from the terminal B1 and the terminal C1; the terminal B2 is disconnected from the terminal A2; and the terminal B2 and the C2 are connected. All terminals in the first embodiment can also be disconnected, and the battery body has no output voltage. There may also be other states: some terminals are connected but the battery body still cannot form an output, and there is no output voltage. One of the above states can be used as an initial state of the battery body to increase safety, and a required voltage is switched to before or after the installation of the power battery on the vehicle.

The above embodiments show that there can be a variety of equivalent battery packs inside the battery body. The equivalent battery pack is a battery cell or a battery pack. The battery cell is suitable for parallel connection. The battery pack is composed of a plurality of battery cells connected in series or parallel, and the battery pack is suitable for parallel connection. The internal change is realized by switching a series-parallel connection of the equivalent battery packs to allow the battery body to output different voltages. Increasing the number of the equivalent battery packs connected in series will increase an output voltage of the battery body. Decreasing the number of the equivalent battery packs connected in series will decrease the output voltage of the battery body.

When the above-mentioned power battery voltage is switched, discharge current and other parameters are also changed accordingly, and a corresponding control management mode can also be changed, for example, a fuse protection mode of the battery can be changed. If there is a difference in the performance of the battery cells in the power battery, it may form an imbalance in the voltage and stored power between the internal equivalent battery packs after the voltage is switched. An internal balanced line can be arranged between the battery packs in the for the balance, and checks an equilibrium state of the equivalent battery packs before switching from other states to a parallel state. Only those meeting the requirements can be converted to avoid high current discharge between the equivalent battery packs and the damage of the power battery after paralleling. The circulation can also be controlled using other methods.

The voltage can be selected before the battery is arranged in the car or after the battery is arranged in the car. There are many control methods available, such as directly pushing a switch to switch, or switching through a relay and a contactor. With respect to the power battery equipped with a battery management system (BMS), the energy management system of the vehicle can communicate with the BMS to control the voltage together through an auxiliary circuit on the battery. The control can be achieved with existing technology or innovative methods, which will not be further elaborated.

System voltage of different new energy vehicles is different, and thus power batteries with different rated voltages are required. Large new energy vehicles require a combination of multiple power batteries. Since the multiple power batteries are connected in different ways of series and parallel, and the system voltages are also different, power batteries with different voltages are required. Therefore, the power battery that can provide different voltages to select increases the applicable occasion and versatility of the power battery.

Figure 25A:
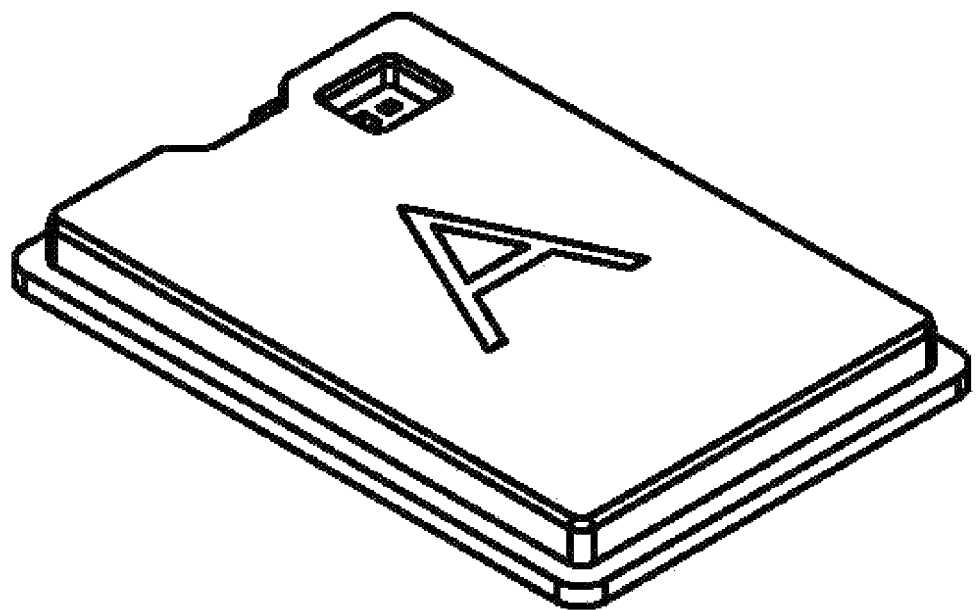
FIGS. 25A-F schematically depict different models of the power battery in a power battery system in accordance with an embodiment of the present disclosure.
Figure 25B:
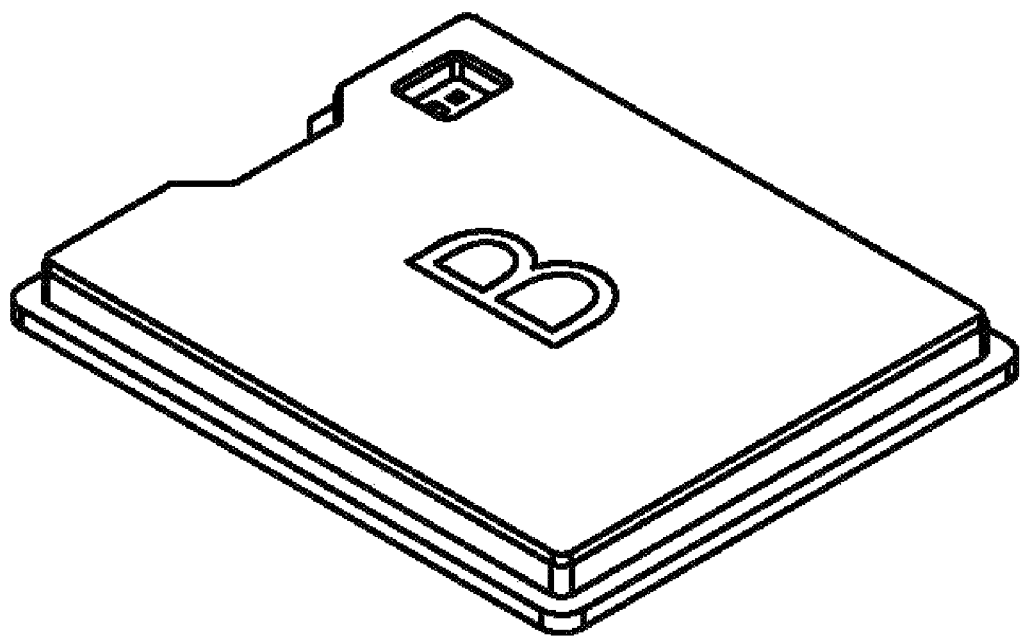
Figure 25C:
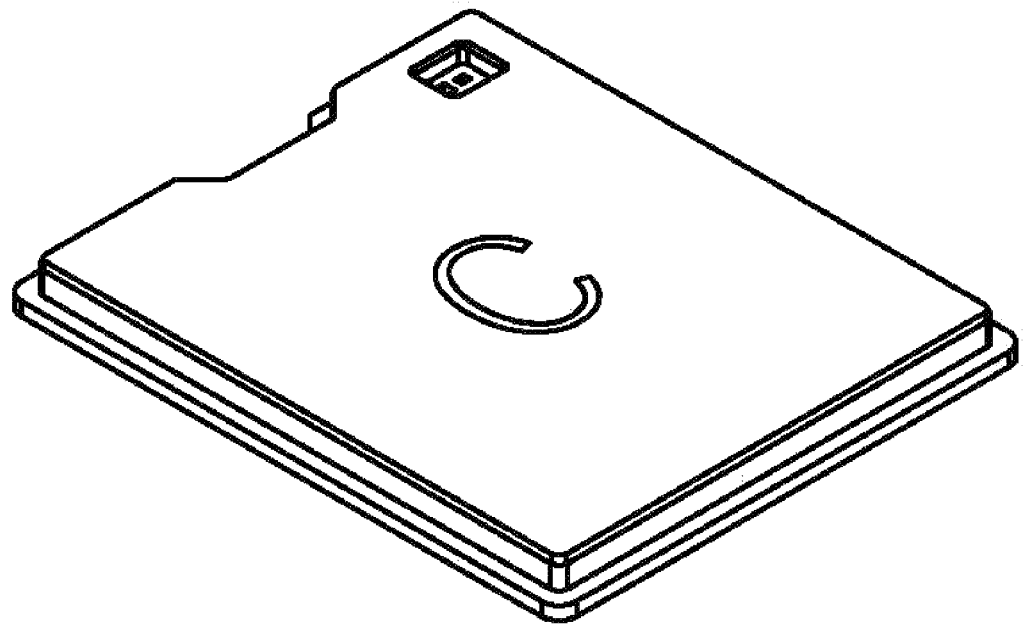
Figure 25D:
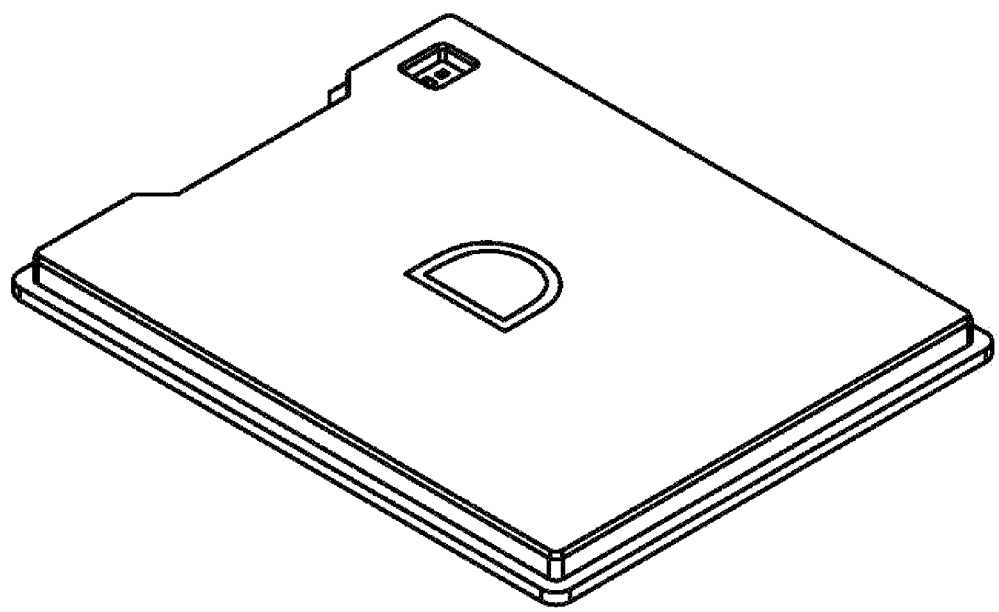
Figure 25E:
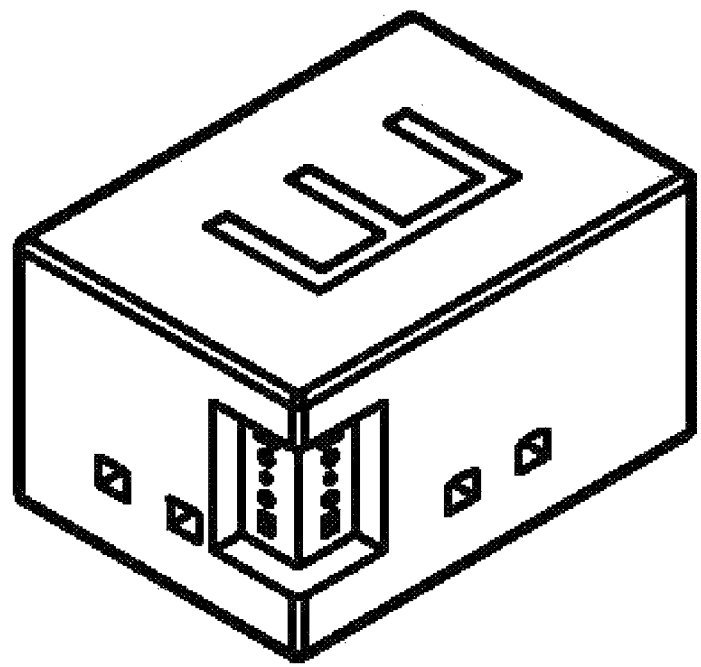
Figure 25F:
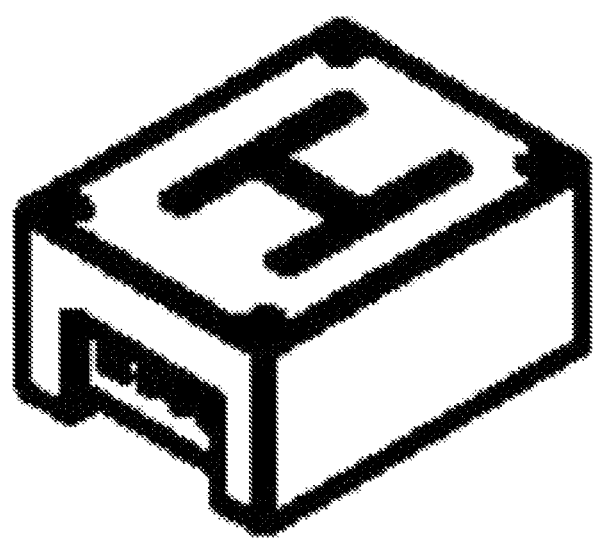

FIG. 25f is an embodiment of a miniaturized quick-change universal power battery. The power battery is provided with two quick-change connection ports. An area around the two quick-change connection ports is of a recessed structure. A length of the power battery is 218 mm. A width of the power battery is 166 mm. A height of the power battery is 108 mm. An area of a maximum surface of the power battery is 0.036 $m^2$. A volume of the power battery is about 3.82 L. A weight of the power battery is about 6.88 Kg.

Figure 26:
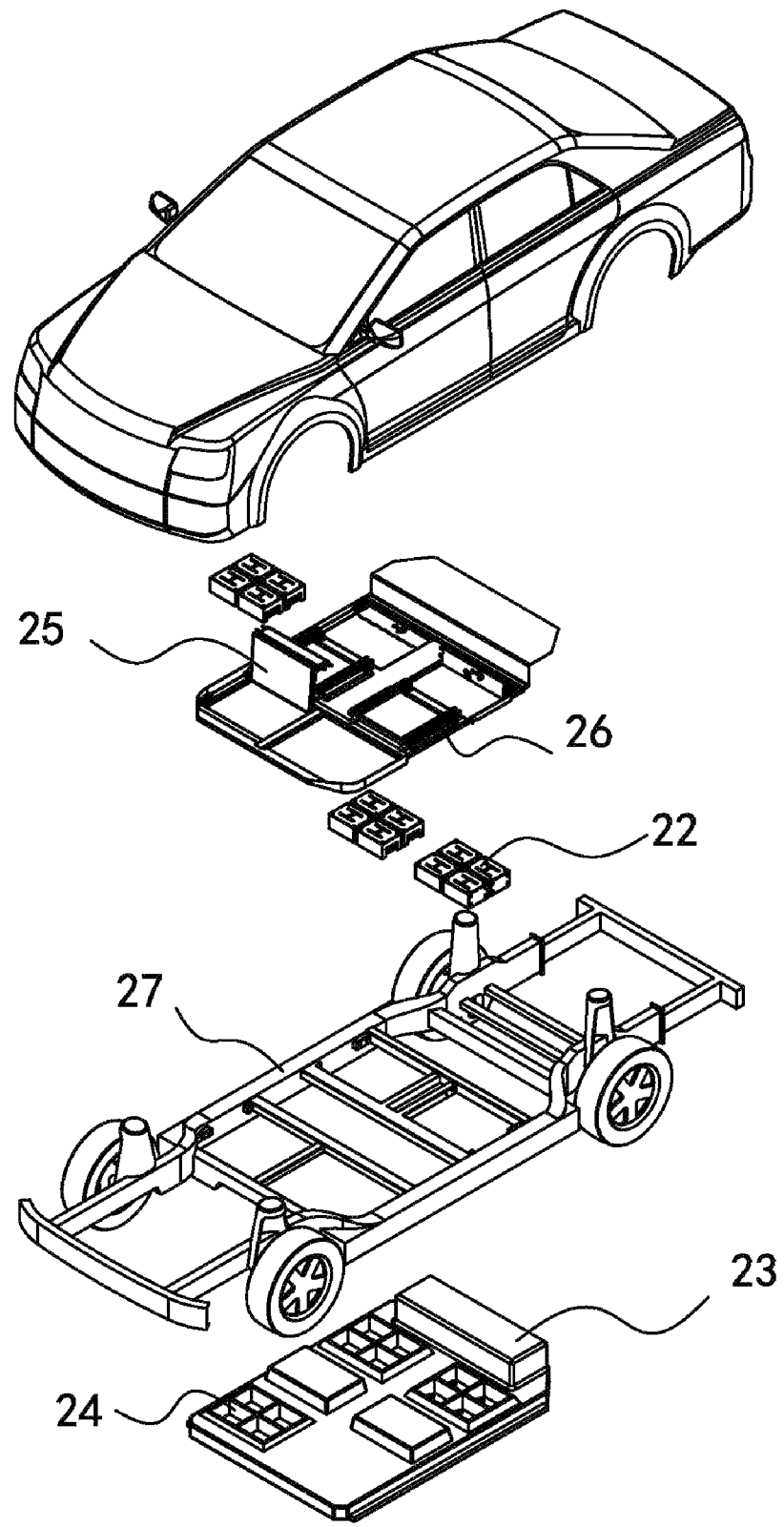
FIG. 26 schematically depicts an arrangement of a H-type miniaturized power battery in a passenger vehicle in accordance with an embodiment of the present disclosure.

A single miniaturized quick-change universal power battery has a small volume compared to the vehicle; however, a storage capacity is also small. Generally, it is necessary to connect multiple power batteries into an independent power supply battery through an on-board cable. As shown in FIG. 26, twelve miniaturized quick-change universal power batteries are connected into an independent power supply in a vehicle. The miniaturized quick-change universal power batteries can be arranged centrally or dispersedly in the vehicle. Since the miniaturized quick-change universal power battery is thin and has small size, it can be arranged at many positions and is suitable for many occasions. The miniaturized quick-change universal power battery can be used in various vehicles, and has strong versatility.

The single miniaturized quick-change universal power battery is light, suitable for most people to put it in a single hand. Multiple power batteries can be replaced at a time, which can realize manual battery replacement of new energy vehicles. The replacement can be implemented with a special hand-held tool. The replacement station can be set without mechanical equipment, so it is easy to set up and easy to generalize.

In addition to manual battery replacement, the miniaturized quick-change universal power battery can be replaced with mechanical equipment (including a robot).

The power battery system is composed of quick-change universal power batteries. Power batteries with the same appearance, sizes, arrangement dimensions and port positions, and can be arranged in the same battery compartment (or other parts used to connect and accommodate the battery body) belong to a same main model. The number of the main model of the power battery for being replaced in different new energy vehicles is no more than eight. When necessary, the shape and size of the power battery of the same main model can be changed accordingly, provided that the requirements of interchange arrangement are met.

The power battery of the main model that adds a port to the newly launched power battery is still included in the original main model.

Generally, the main models of quick-change universal power battery refer to the newly launched or original models of quick-change universal power battery, which have a reasonable design and a wide range of applications (new energy vehicles), and are still provided to various new energy vehicles without an announce to suspend their application in new energy vehicles. The model of quick-change universal power battery that is seldom used in new energy vehicles, or has not been widely distributed in the replacement stations does not belong to the main model. After the main appearance and arrangement dimensions of the original main model are changed, the new model can still use the name of the original main model; however, the new model is no longer universal.

The formation of quick-change universal power battery and system: select the appropriate form of quick-change power battery, which can have several types; determine the applicable size; adopt one or more of a recessed structure, an independent liquid temperature-control loop and a multiple-port structure, to increase the applicable occasions of the quick-change power battery; set a position of an external heat exchanger of the liquid temperature-control loop; and an internal change of the battery can also be used to make the battery voltage selectable. The quick-change universal power battery can be selected and replaced for a variety of new energy vehicles under various conditions. Due to the structure that can expand of the applicable occasions, the quick-change universal power battery is highly versatile, and can combine with a small number of main models of the quick-change universal power battery to construct a quick-change universal power battery system. Though the system only has a small number of models, it can be used in most of new energy vehicles.

In a quick-change universal power battery system, battery cells of different categories and types can be arranged in different power batteries of the same main model for replacing.

Battery category refers to different battery categories such as lead-acid batteries, nickel-metal hydride batteries and lithium-ion batteries.

Battery type refers to different types in the same category, such as: lithium manganese oxide battery, lithium cobalt oxide battery, lithium iron phosphate battery, lithium titanate battery, nickel cobalt manganese ternary lithium ion battery, nickel cobalt aluminum ternary lithium ion battery in the lithium-ion battery category.

There are many categories and types of power batteries that can be used. With the development of battery technology, new categories and types of power batteries may appear to enter practical applications. Different battery cells can be used in different power batteries of the same main model, and new energy vehicles using power batteries of this main model can use power batteries with different performances. With the development of battery technology, battery cells with better performance can be used to form power batteries. When the battery cell with a new category or type has a higher storage capacity, the vehicle replaced with the power battery of new main model will drive a far distance per charge.

Different battery cells can be arranged in different power batteries of the same main model for replacing. After the main model is implemented, it can be used continuously to maintain the stability of the quick-change universal power battery system.

The connection and combination of the battery cells in different power batteries of the same main model can also be different. For the various individual differences of the power battery of the same main model, those that need to be distinguished can be distinguished by subdivision models.

Some models have requirements for battery cell categories and types due to safety considerations for the power batteries to be installed and used, and the quick-change universal power battery that meets the requirements is chosen. When necessary, the battery safety level is divided according to the categories and types of battery cells used in the quick-change universal power batteries of the same main model. The power battery and the vehicle use a fool-proofing structure. The power battery that meets the safety level of the vehicle can be completely installed in the vehicle, and the power battery whose safety level is lower than that required by the vehicle is blocked by the fool-proofing structure and cannot be fully installed.

If necessary, the main models in the system can be increased or decreased. When the new battery technology undergoes major changes or the quick-change universal power battery has made significant progress, a new quick-change universal power battery system should be implemented. The new quick-change universal power battery system can be used to gradually replace the original quick-change universal power battery system.

FIGS. 25a-25f show an embodiment of a quick-change universal power battery system. This system uses power batteries of six main models.

FIG. 25a schematically depicts power battery of a main model A. Excluding the mounting edge, a length of the power battery is 900 mm; a width of the power battery is 600 mm; a height of the power battery is 120 mm; a volume of the power battery is 63.5 L. The power battery is provided with a single-group quick-change connection port. An area around the single-group quick-change connection port is of a recessed structure. The power battery is also provided with an independent liquid temperature-control loop. An external heat exchanger is located at a lower end (bottom surface) of the power battery. A rated voltage of the power battery is only set to one gear, which is 192 V. (Battery cells of different categories and types can be arranged in different power batteries of the same main model for replacing. The rated voltage of the power battery of the same main model is not exactly the same, but is a range. The rated voltage of the specific subdivided model is one value of the range. The same below)

FIG. 25b schematically depicts power battery of a main model B. Excluding the mounting edge, a length of the power battery is 1000 mm; a width of the power battery is 820 mm; a height of the power battery is 120 mm; a volume of the power battery is 96 L. The power battery is provided with a single-group quick-change connection port. An area around the single-group quick-change connection port is of a recessed structure. The power battery is also provided with an independent liquid temperature-control loop. An external heat exchanger is located at a lower end (bottom surface) of the power battery. A rated voltage of the power battery is set to two gears, which are 192 V and 384 V.

FIG. 25c schematically depicts power battery of a main model C. Excluding the mounting edge, a length of the power battery is 1200 mm; a width of the power battery is 1000 mm; a height of the power battery is 120 mm; a volume of the power battery is 141 L. The power battery is provided with a single-group quick-change connection port. An area around the single-group quick-change connection port is of a recessed structure. The power battery is also provided with an independent liquid temperature-control loop. An external heat exchanger is located at a lower end (bottom surface) of the power battery. A rated voltage of the power battery is set to two gears, which are 192 V and 384 V.

FIG. 25d schematically depicts power battery of a main model D. Excluding the mounting edge, a length of the power battery is 1480 mm; a width of the power battery is 1180 mm; a height of the power battery is 120 mm; a volume of the power battery is 205 L. The power battery is provided with a single-group quick-change connection port. An area around the single-group quick-change connection port is of a recessed structure. The power battery is also provided with an independent liquid temperature-control loop. An external heat exchanger is located at a lower end (bottom surface) of the power battery. A rated voltage of the power battery is only set to one gear, which is 384 V.

FIG. 25e schematically depicts power battery of a main model E. Excluding the mounting edge, a length of the power battery is 560 mm; a width of the power battery is 400 mm; a height of the power battery is 350 mm; a volume of the power battery is 76.9 L. The power battery is provided with two groups of quick-change connection port. An area around the two groups of quick-change connection port is of a recessed structure. The power battery is also provided with an independent liquid temperature-control loop. An external heat exchanger is located at an upper end (up surface) of the power battery. A rated voltage of the power battery is set to two gears, which are 96 V and 192 V.

FIG. 25f schematically depicts power battery of a main model H. Excluding the mounting edge, a length of the power battery is 218 mm; a width of the power battery is 166 mm; a height of the power battery is 108 mm. An area of a maximum surface of the power battery is 0.036 $m^2$. A volume of the power battery is about 3.82 L. A weight of the power battery is about 6.88 Kg. The power battery provided herein is a miniaturized quick-change universal power battery. The power battery is provided with a single-group quick-change connection port. An area around the single-group quick-change connection port is of a recessed structure. An internal heat conduction sheet is combined with the heat conduction glue to conduct heat to a lower end (bottom surface) of the power battery, and the bottom surface of the power battery is provided with semiconductor refrigeration (reverse heating). A rated voltage of the power battery is only set to one gear, which is 384 V.

When the volumetric energy density of the above-mentioned power batteries reaches 400 w/L, the storage capacities of the power batteries are 25.4 kWh, 38.4 kWh, 56.4 kWh, 82.0 kWh, 30.7 kWh, 1.53 kWh, subsequently. If the actual energy density of the system is less than or greater than 400 w/L, the storage capacity of the corresponding single power battery will change according to the corresponding proportion.

The above-mentioned main models A, B, C, D are mechanical quick-change bottom-mounted universal power batteries. The battery body is flat and rectangular. These power batteries are mainly arranged from the bottom of the vehicle, and the sizes of power batteries of main models A, B, C, D are from small to large. Different models can be selected or combined to make a full use of the space on the vehicle. The main model E is a mechanical quick-change side-mounted universal power battery. The battery body is rectangular. The power battery of the main model E is mainly arranged from the side of the vehicle with two installation directions. The size of this power battery is suitable for most available vehicles. The power battery of the main model H is a miniaturized quick-change universal power battery, and is mainly used in small vehicles or new energy vehicles that require a small battery storage capacity. The power battery of the main model H can also be used in low-speed electric vehicles, two-wheeled electric vehicles and three-wheeled electric vehicles.

The embodiments of the quick-change universal power battery system can be selected and replaced by various new energy vehicles. Universal applications thereof will be described below in detail according to the vehicle classification: passenger cars, commercial vehicles (buses and trucks).

With respect to the passenger vehicles, the miniaturized quick-change universal power battery (main model) and the mechanical quick-change bottom-mounted universal power batteries (main model A, B, C and D) are mainly adopted.

FIG. 26 schematically depicts an arrangement of a H-type miniaturized quick-change universal power battery in a new energy passenger vehicle in accordance with a first embodiment of the quick-change universal power battery system. An axle distance of the vehicle is 2820 mm. A length of the vehicle is 4980 mm. A width of the vehicle is 1845 mm. A height of the vehicle is 1525 mm. An outer diameter of the tire is 660 mm. Twelve H-type miniaturized quick-change universal power batteries 22 and one non-universal power battery 23 are arranged on the vehicle. The non-universal power battery is integrated with a battery support. Battery compartments 24 of the H-type power battery are arranged above the non-universal power battery 23. Four of the battery compartments 24 are arranged under a front side of a front right seat; four of the battery compartments 24 are arranged under a left side of a rear seat; four of the battery compartments 24 are arranged under a right side of the rear seat. Four battery compartments 24 at the same position share one battery-compartment cover 25. The battery-compartment cover 25 is arranged on a floor of the vehicle and on a frame 27 of the vehicle. The battery-compartment cover 25 is a double-folding door that can be opened in the vehicle around a rotating shaft (the two doors also have a rotating shaft and can be turned with respect to each other). There are three battery-compartment covers 25 in total. A front seat rail 26, a front seat and a rear seat (not shown) are arranged on the floor. The front seats must be moved before the H-type power battery is installed (Move the front seat back before removing the battery in front of the front right front seat, and move the front seat forward before removing the battery in front of the rear seat). Due to the small thickness of the miniaturized quick-change universal power battery, the battery compartment can be arranged on the battery support under the floor of the vehicle. A port of the H-type power battery has a recessed structure. A connection part in the battery compartment can protrude upwards from a bottom of the battery compartment, and does not need to protrude downwards at a bottom of the vehicle (unreasonable and easy to be collided).

A refrigeration board is arranged at the bottom of the battery compartment, and a liquid temperature-control pipeline is arranged in the battery compartment. The liquid temperature-control pipeline is provided by a liquid temperature-control loop on the non-universal power battery or by a liquid temperature-control system shared by the vehicle.

The twelve H-type miniaturized quick-change universal power batteries are connected in series through the on-board cable to form one power battery pack, with a rated voltage of 576 V, and the non-universal power battery is set as the other power battery pack.

The power battery pack refers to a group of power batteries composed of several power batteries that can independently supply power for new energy vehicles (referring to the main power supply for vehicle driving). The power batteries of power battery pack are no longer divided into different groups to support power after they are normally installed on the vehicle, but work as an overall power supply unit (if there are parallel batteries in the group, the battery can supply power without being fully installed, which is a different state of the same power battery pack).

Two independent power battery packs are provided herein. The rated voltage of the non-universal power battery pack is 576V, which is the same as that of the miniaturized quick-change universal power pack. The rated voltage of the non-universal power battery pack can also be different with that of the miniaturized quick-change universal power pack.

In this embodiment, the non-universal power battery pack is the main power battery set, and the miniaturized quick-change universal power pack provides power for this model and can provide a cruising range of close to 100 kilometers (in the case of a volumetric energy density of 400 w/L), but the load capacity information of a single power supply may be small, which is not suitable for fast driving. The vehicle is equipped with a charging function and a mutual charging function. When charging is inconvenient, the miniaturized quick-change universal power pack will charge the non-universal power battery pack to supplement the power, while the miniaturized quick-change universal power pack replenishes power through quick-change batteries. There is also a method of multiple packs of combined power supply or multiple packs of power for the motors of different drive axles or drive wheels. The method and meaning are shown as follows.

Figure 27:
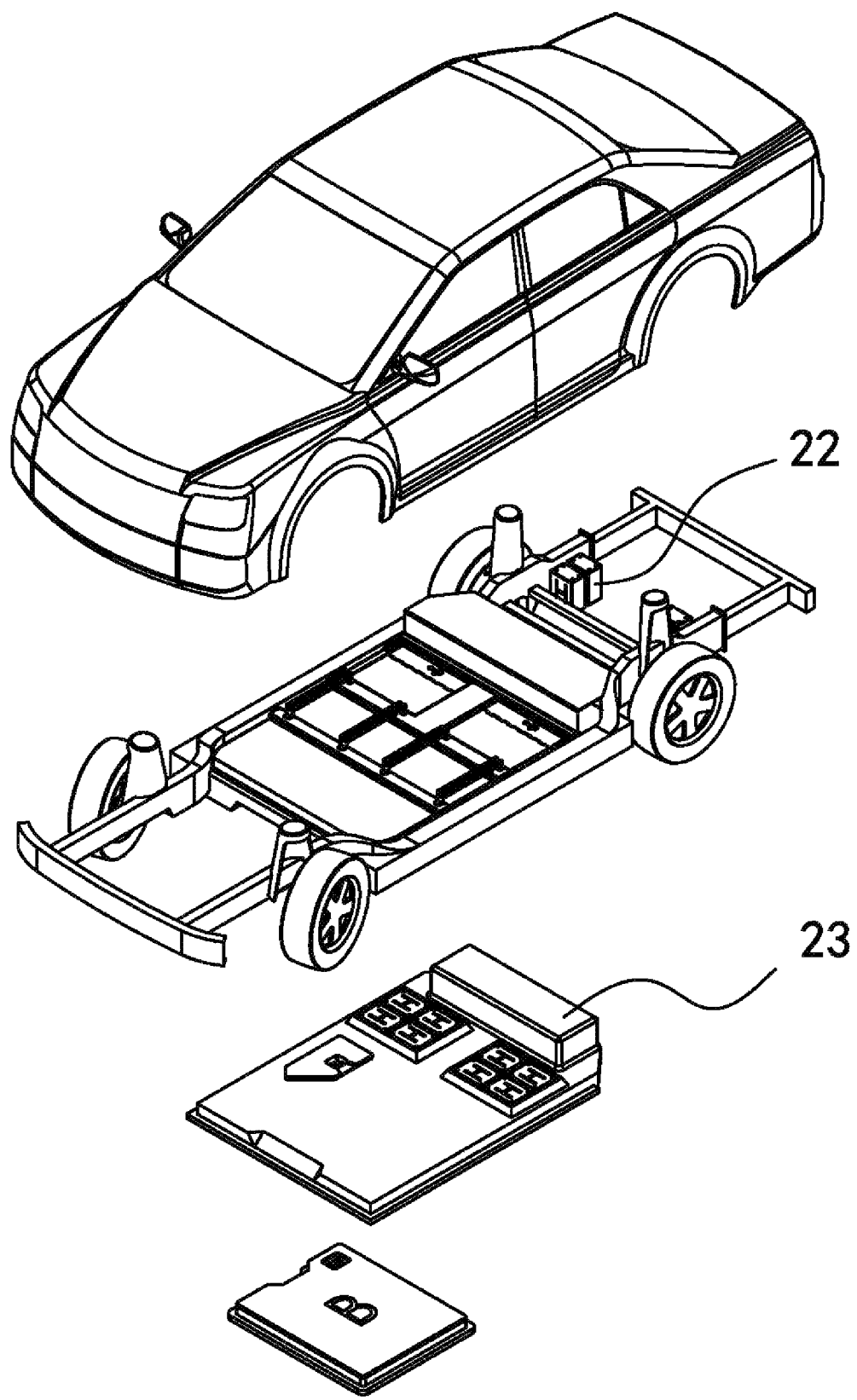
FIG. 27 schematically depicts an arrangement of the H-type miniaturized power battery and a B-type mechanical bottom-mounted power battery in the passenger vehicle in accordance with an embodiment of the present disclosure.

FIG. 27 schematically depicts an arrangement of a H-type miniaturized quick-change universal power battery and a B-type mechanical bottom-mounted universal power battery in a new energy passenger vehicle in accordance with a second embodiment of the quick-change universal power battery system. Two types of universal power battery are arranged on non-universal power battery 23 (the structure is integrated with the battery support). There are three power batteries arranged on the vehicle. The size of the passenger vehicle is the same as that in the first embodiment. The difference of the first embodiment is that the space under the front side the front seat is occupied by the B-type power battery upward arranged from the bottom of the vehicle. Therefore, the H-type miniaturized quick-change universal power battery is not arranged at this position. There are two H-type power batteries 22 on both sides of a trunk at the front (safer space close to the rear axle and body structure on both sides). The battery compartment is arranged under the trunk. The battery is downward arranged through erecting the port. A battery compartment cover can be arranged on the battery compartment, and the battery compartment cover can be opened in the trunk (the structure of the battery compartment is not shown). Similar to the first embodiment, there are four battery compartments with H-type power batteries under on the left and right sides of the rear seat respectively (four H-shaped batteries 22 are placed in each battery compartment in the figure).

Since the H-type battery is equipped with two groups of ports, the battery compartment arranged horizontally under the front side of the rear seat adopts a first port group, and the battery compartment arranged vertically under the trunk adopts a second port group. The temperature-control method of the H-type battery is the same as the method adopted in the first embodiment that the liquid temperature-control pipeline needs to be led to the battery compartment under the trunk, and the corresponding refrigeration board is arranged on a side of each battery compartment close to a rear direction of the vehicle.

The port of the B-type mechanical bottom-mounted universal power battery has a recessed structure, so the connecting part of the battery compartment protrudes less to the rear (upward) of the battery compartment, and the height of the protrusion is in the battery support (which is integrated with the non-universal power batter) within a normal distance from the floor of the vehicle. Therefore, this type of battery (mechanical bottom-mounted universal power battery is arranged flexibly under the passenger vehicle, and can be arranged in different positions according to needs. The B-type power battery is provided with an independent liquid temperature-control loop. This type of vehicle does not need to be combined with the vehicle when designing the temperature-control, which reduces the design difficulty and does not require disassembly and assembly of the liquid pipeline when changing the battery. Since the liquid temperature-control can achieve a strong temperature-control performance, the vehicle using this battery is suitable for use in various environments.

In this embodiment, the twelve H-type miniaturized quick-change universal power batteries are connected in series through the on-board cable to form a first power battery pack with a rated voltage of 576 V; the B type battery is set as a second power battery pack with a rated voltage of 384 V; and the non-universal power battery is set as a third power battery pack with a rated voltage of 384 V. The vehicle is equipped with a charging function and a mutual charging function. When charging is not convenient, the first battery power pack or the second battery power pack will charge the third power battery pack to supplement the electric energy. The power supply methods of different voltage packs and multiple packs of combined power supply will be described below.

Figure 28:
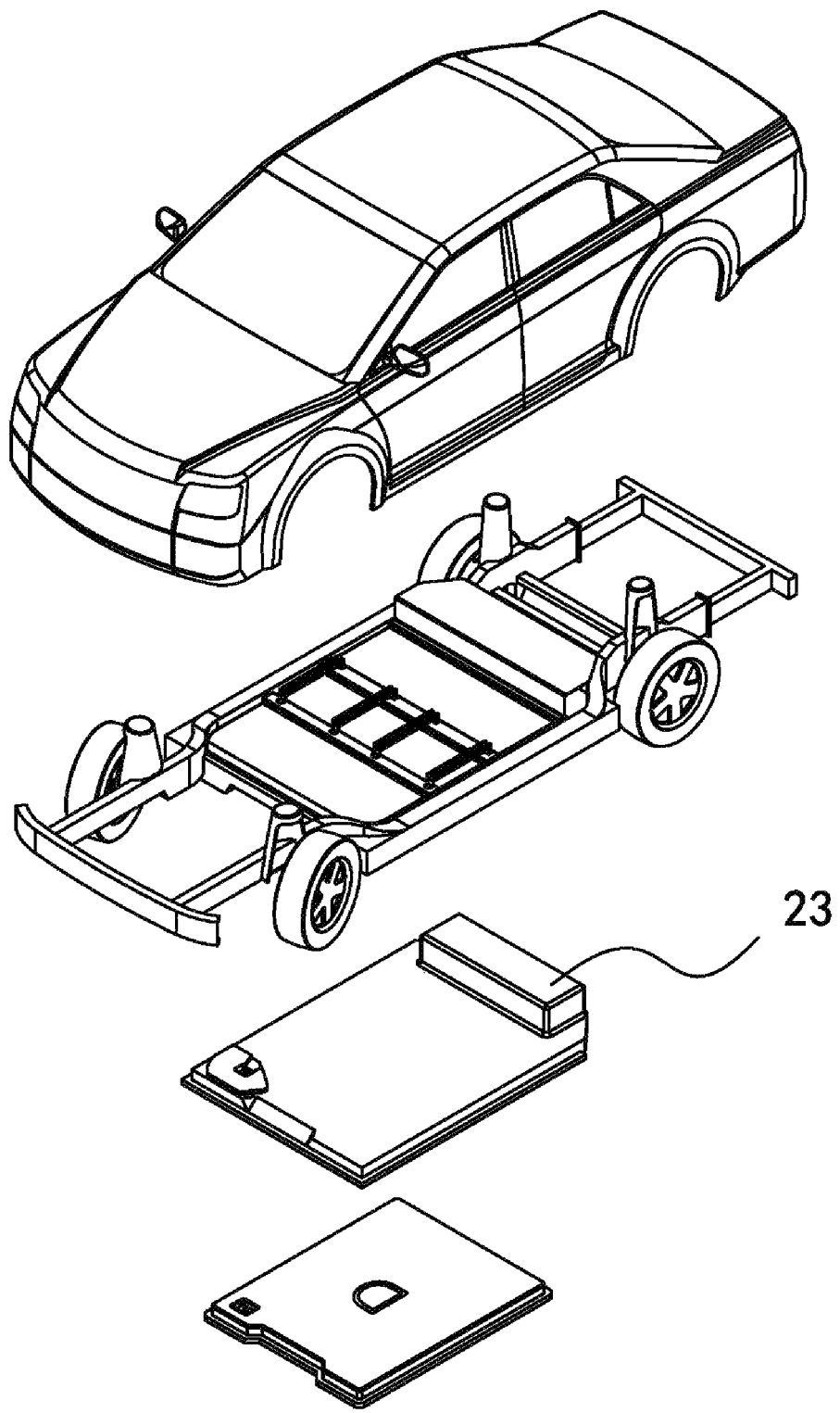
FIG. 28 schematically depicts an arrangement of a D-type mechanical bottom-mounted power battery in the passenger vehicle in accordance with an embodiment of the present disclosure.

FIG. 28 schematically depicts an arrangement of a D-type mechanical bottom-mounted universal power battery in a new energy passenger vehicle in accordance with a third embodiment of the quick-change universal power battery system. The size of the passenger vehicle is same as that provided in the first embodiment. A non-universal power battery 23 is also provided in this embodiment. The non-universal power battery 23 is integrated with the battery support. The battery compartment of the D-type battery is arranged on the non-universal power battery 23. The D-type mechanical bottom-mounted universal power battery is a power battery pack and the non-universal power battery 23 is the other power battery pack. Each power battery pack has a rated voltage of 384 V.

In this embodiment, the D-type battery is the main power battery pack and is provided with an independent liquid temperature-control loop. The storage capacity of a non-general power battery is small, and the load capacity information of a single power supply may be small, which is not suitable for fast driving. However, when the power energy of the D-type battery is used up, the vehicle can still be driven by the non-general power battery before the battery is replaced. The two power battery packs can be combined to supply power or respectively supply power to motors of different drive axles, and the method will be described below. The vehicle is equipped with a charging function and a mutual charging function. When it is inconvenient to charge, the D-type battery will charge the non-universal power battery to supplement the electric energy.

In the three embodiments mentioned above, the battery compartment or battery support can be separated from the non-universal power battery.

Compared to the first embodiment, in a fourth embodiment of the quick-change universal power battery system in a passenger vehicle (not shown), there are no non-universal power battery on the battery support of the passenger vehicle. Twelve H-type miniaturized quick-change universal power batteries are arranged on the battery support. The passenger vehicle provided herein only adopts one type of the power batteries, that is, the H-type miniaturized quick-change universal power battery.

Compared to the second embodiment, in a fifth embodiment of the quick-change universal power battery system in a passenger vehicle (not shown), there are no non-universal power battery on the battery support of the passenger vehicle, but eight H-type miniaturized quick-change universal power batteries and a B-type mechanical bottom-mounted universal power battery are still arranged on the passenger vehicle, and the other 4 H-type miniaturized quick-change universal power batteries are still arranged under the trunk. The passenger vehicle provided herein only adopts two types of the power batteries, those are, the H-type miniaturized quick-change universal power battery and the B-type mechanical bottom-mounted universal power battery.

Compared to the third embodiment, in a sixth embodiment of the quick-change universal power battery system in a passenger vehicle (not shown), there are no non-universal power battery on the battery support of the passenger vehicle, and the D-type mechanical bottom-mounted universal power battery is arranged on the battery support of the passenger vehicle. The passenger vehicle provided herein only adopts one type of the power batteries, that is, the D-type mechanical bottom-mounted universal power battery.

The above shows various embodiments of the power battery in the embodiments of the quick-change power battery system of the passenger vehicles. The overall status of the power battery in the embodiments of the quick-change power battery system of the passenger vehicles is as follows.

The applications of the H-type miniaturized quick-change universal power battery in passenger vehicles are described below. With respect to the applications of quick-change universal power battery system in the first embodiment, the second embodiment, the fourth embodiment and the fifth embodiment, if necessary, the battery compartments of the H-type batteries on various passenger vehicles can be set in different positions, or more battery compartments can be arranged on the vehicle. For example, the battery compartment can be arranged under the floor of the front seats in the first embodiment and the fourth embodiment (the battery compartment cover structure is reasonably designed to open). The battery compartment can be also arranged under the rear seat in the four embodiments. A front compartment of the car can be provided with a battery compartment (arranged in a safer space). The battery compartment can also be arranged at other positions according to the characteristics of the vehicle, and innovative ideas can be applied. Due to the small size and thin thickness of the miniaturized quick-change universal power battery, there are many positions that can be laid out, and there are multiple groups of ports that can be installed from different directions. Different models have different sizes of available space in the same location, the number of centrally installed battery compartments can be different, and the flexibility is large. Each model can be arranged according to its own characteristics and the requirements of the storage capacity of the power battery. Small passenger vehicles consume relatively little power (such as mini vehicles). The use of miniaturized quick-change universal power batteries can provide large cruising range and good applicability. Other new energy vehicles that require power batteries with small storage capacity are also suitable for use, such as various hybrid vehicles and fuel cell vehicle. The use of small quick-change universal power batteries can facilitate maintenance and upgrades.

The applications of mechanical bottom-mounted universal power batteries (main models: A, B, C, D) in passenger vehicles are described below. Electric-driven new energy passenger vehicles generally have no transmission mechanism between the front and rear axles, and the structure of a speed motor and a reducer of a drive axle is also compact, occupying a small longitudinal size. The space occupied by the suspension is described below. There are many types of suspension forks that can be used, each with its own advantages and disadvantages. Generally, the type of suspension fork is determined after comprehensive consideration in the design of each vehicle model. Most types of suspension forks take up less longitudinal space. A small number of passenger vehicles use leaf spring suspensions, for example, some minibuses and light buses (passenger vehicles with no more than nine seats) use leaf spring suspensions on the rear axles, and the longitudinal dimension that occupies the wheel position is slightly long. There are less-used suspension types that occupy long longitudinal space, such as torsion bar spring suspensions. The torsion bar spring suspensions may not be used in the new energy vehicles that the arranged mechanical quick-change bottom-mounted universal power battery has a large storage capacity, and other types of suspension forks may be used. If the number of the mechanical quick-change bottom-mounted universal power batteries is small, which do not affect the layout, the torsion bar spring suspensions can still be used.

From the lateral perspective of the vehicle body, vehicle body structures such as longitudinal beams and door frames require space, and the battery support (battery compartment) structure also needs space, and some need to leave necessary space for cables, pipes and other components. After the necessary space is left in the vertical and horizontal directions, the central concentrated part can be used as the layout space for the mechanical torsion bar spring suspensions bottom-mounted universal power battery. At present, most passenger vehicles adopt load-bearing or semi-load-bearing body structure. Because of the greater flexibility in the design of the body structure, a larger lateral space can be designed. In addition, the non-load-bearing structure of the car body is still used in passenger vehicles. The non-load-bearing structure generally has two longitudinal girders connecting the front and rear of the car, and the horizontal size of the concentrated space is relatively small.

For new energy passenger vehicles driven by other energy sources, the bottom space between the front and rear axles may be partly occupied by related components. According to space conditions and design needs, it can be determined whether to use mechanical quick-change bottom-mounted universal power batteries, and the layout model and quantity are also determined.

The following describes the layout of the space according to two types of vehicle body. With respect to the layout of new energy passenger vehicles with load-bearing or semi-bearing structure, because of the greater flexibility in the design of the body structure, it can be designed to be concentrated. The battery compartment is mainly arranged between the main longitudinal beams in the middle of the vehicle body. Due to the strength of the vehicle body and the installation of other components, the main longitudinal beams are generally connected by beams with a small section height. The beams are located above the battery compartment and keep a certain distance (necessary components such as cables and pipelines can pass through).

The wheelbase of vehicles is the most important parameter to determine the longitudinal space (and the most important difference in the size of each model), and the horizontal layout space under the same wheelbase has the largest correlation with the width of vehicle body. Other influencing factors are tire outer diameter (including its activity space) and suspension size.

With respect to the centralized installation space can be arranged with mechanical fast replaceable bottom-mounted general power batteries from a planar perspective, since the power batteries of A, B, C and D main models are flat and small in thickness, they are also provided with a recessed port, except for a small number of special vehicles, those power batteries can generally be arranged in a reasonable designed battery compartment.

Figure 49:
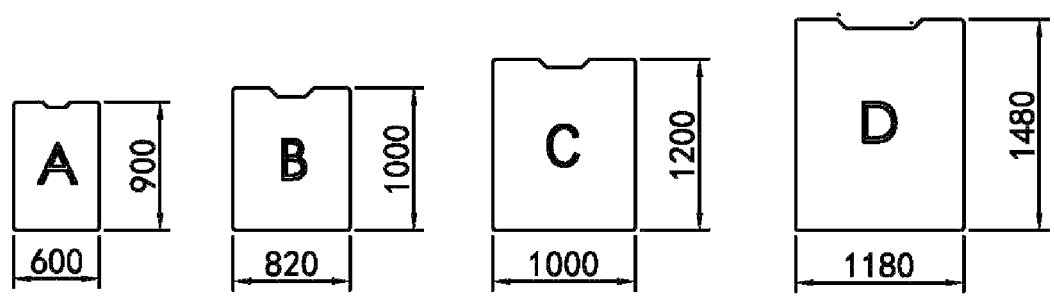
FIG. 49 schematically depicts mechanical bottom-mounted power batteries with different sizes.

FIG. 49 is a plan view of the main body of the four main models of power battery A, B, C and D with the mounting edges removed.

Figure 50:
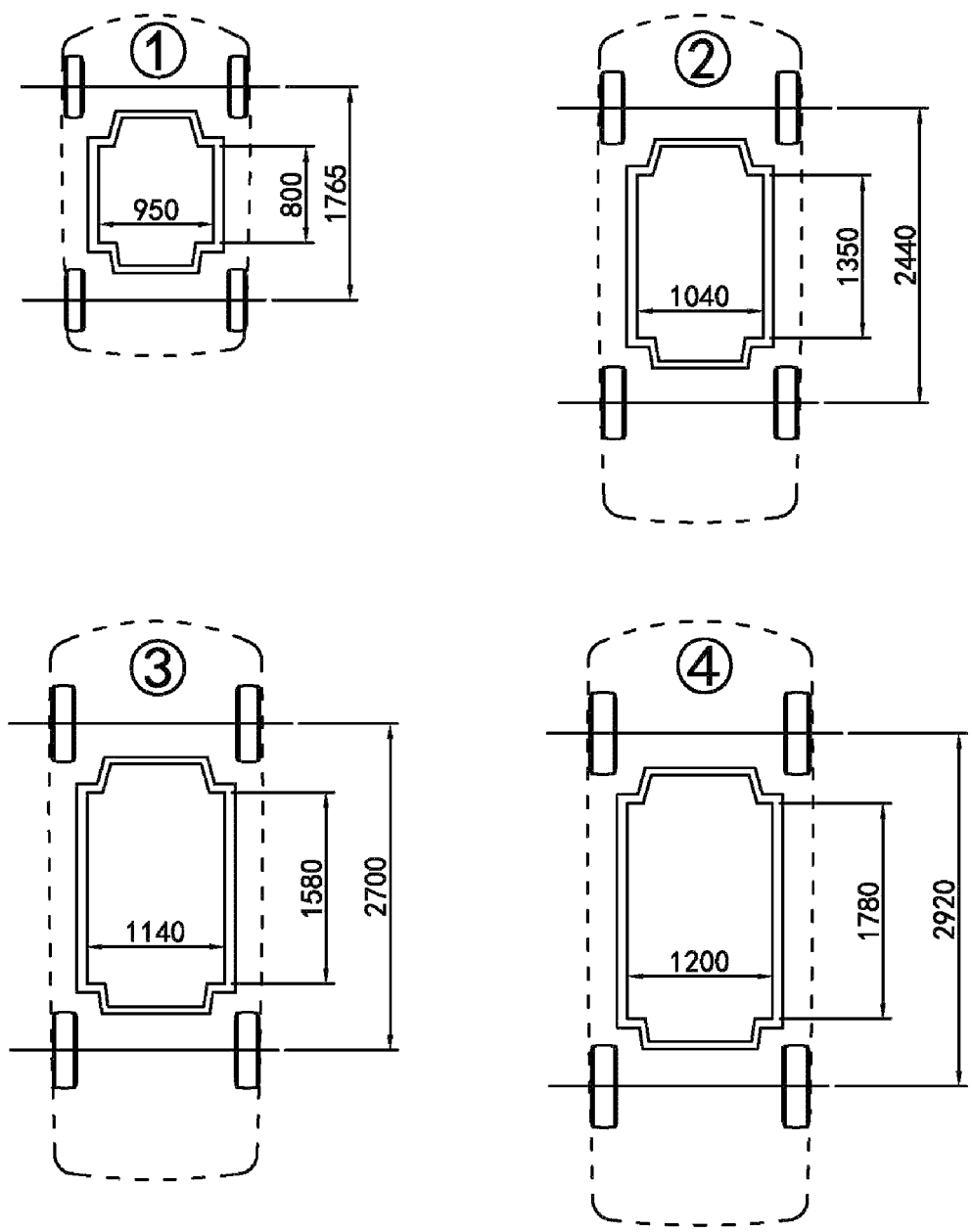
FIG. 50 is a top view of new energy vehicles with four different sizes.

Four sizes of new energy passenger vehicles are selected, 1-4 from small to large. FIG. 50 schematically depicts a top view of the four sizes of new energy passenger vehicles. A solid line frame in the middle is a concentrated area in which the battery body of the mechanical fast-replaced bottom-mounted universal power battery can be arranged on the new energy passenger vehicle. A wheelbase of the vehicle and a longitudinal dimension and a transverse dimension of a most important area in the concentrated area are marked in FIG. 50. A part in the solid line frame that exceeds the most important area in the longitudinal direction may be different in various vehicles due to the different structural dimensions of the selected suspension, motor, transmission and other components.

The main dimensions of the four sizes of new energy passenger vehicles are shown as follows (under the same wheelbase, if a steel plate suspension is used, the longitudinal dimension of the most important area in the concentrated area may be slightly smaller than the following data).

Passenger vehicle (1): The wheelbase is 1765 mm; the longitudinal dimension of the main installation area is 800 mm; and the lateral dimension is 950 mm.

Passenger vehicle (2): The wheelbase is 2440 mm; the longitudinal dimension of the main installation area is 1350 mm; and the lateral dimension is 1040 mm.

Passenger vehicle (3): The wheelbase is 2700 mm; the longitudinal dimension of the main installation area is 1580 mm; and the lateral dimension is 1140 mm.

Passenger vehicle (4): The wheelbase is 2920 mm; the longitudinal dimension of the main installation area is 1780 mm; and the lateral dimension is 1200 mm.

Figure 51:
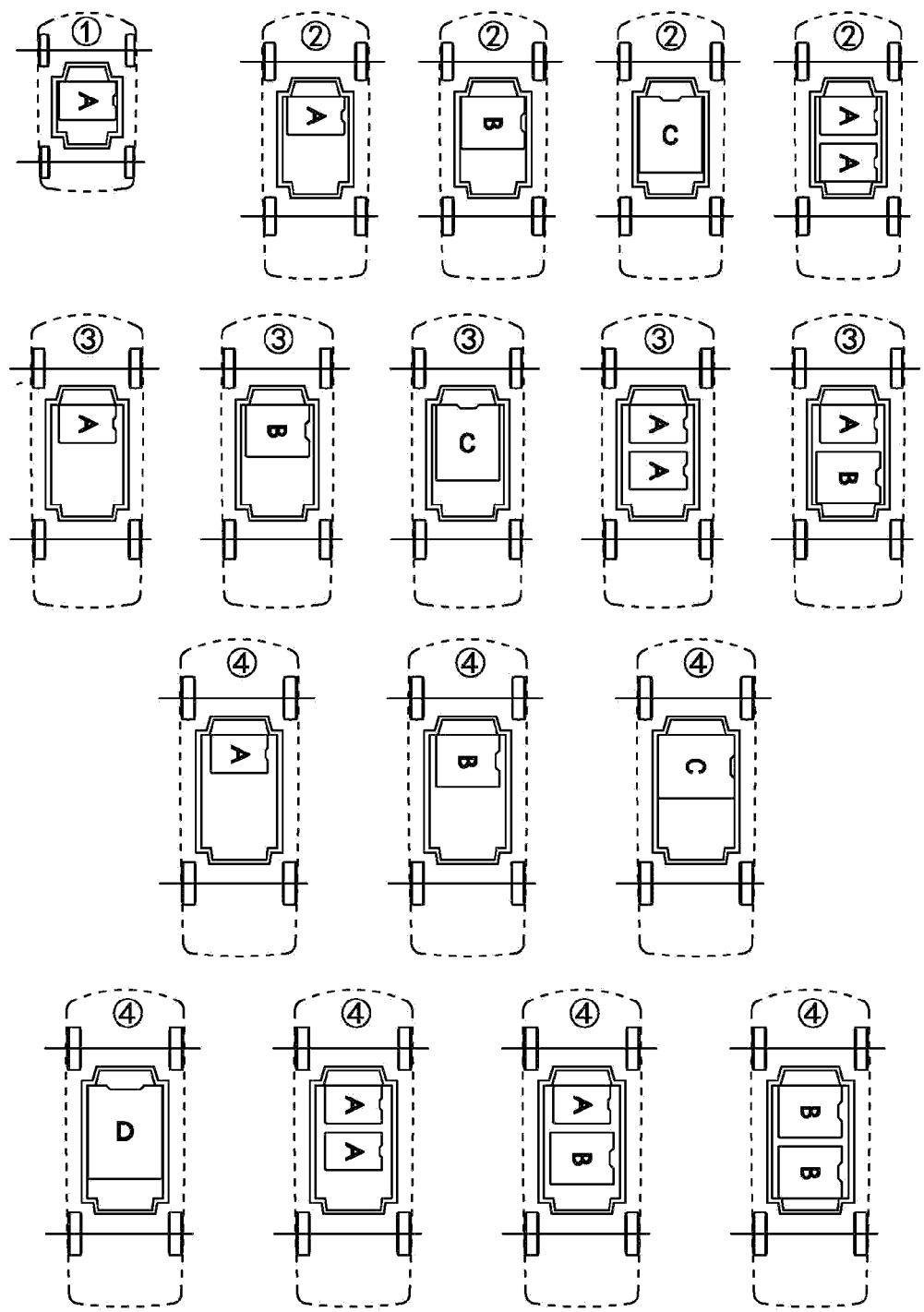
FIG. 51 schematically depicts arrangements of the mechanical bottom-mounted power batteries in the four new energy passenger vehicles with different sizes.
Figure 52:
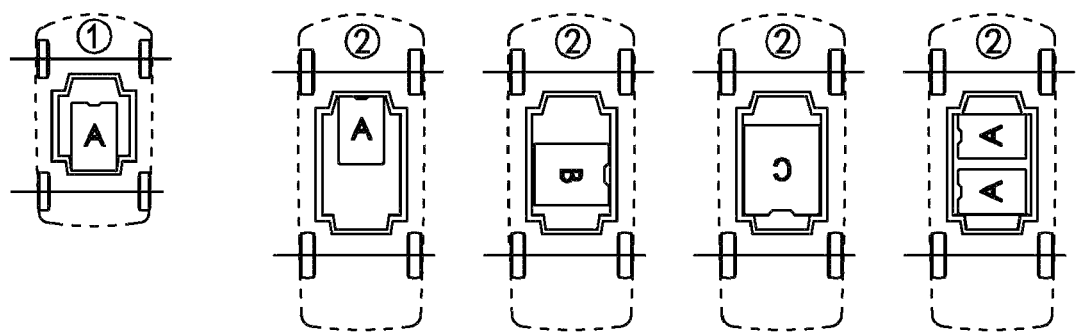
FIG. 52 is another arrangement in vehicle (1) and vehicle (2) in FIG. 51.

FIG. 51 shows the types and quantities of the mechanical quick-change bottom-mounted universal power batteries that can be arranged in the four sizes new energy passenger vehicles. If multiple mechanical quick-change bottom-mounted universal power batteries are arranged in a passenger vehicle, the space required by the battery compartment is left between the power batteries. There are many ways to actually arrange the power batteries at the position and direction when the power batteries can be accommodated in the passenger vehicle. FIG. 52 shows the different arrangements of the mechanical quick-change bottom-mounted universal power batteries in the passenger vehicle (1) and the passenger vehicle (2), and there are also many variations. The arrangement of the mechanical quick-change bottom-mounted universal power batteries in the passenger vehicle (3) and the passenger vehicle (4) can be deduced by analogy.

It can be seen from the figure that the larger the size of the vehicle, the more models and combinations of mechanical quick-change bottom-mounted universal power batteries can be selected. Since the types of vehicles are various, and the main relevant dimensions of each vehicle are different, four typical passenger vehicles from small to large are selected. If one or both of the vertical and horizontal dimensions of the main installation area of other vehicles are larger than the corresponding dimensions in the example, there is a possibility to choose more or larger mechanical quick-change bottom-mounted universal power batteries, depending on the actual size of the vehicle and the size of each mechanical quick-change bottom-mounted universal power battery corresponds.

With respect to the layout of new energy passenger vehicles with non-load-bearing structure, the non-load-bearing structure is still used in passenger vehicles such as some off-road vehicles, SUVs, minibuses and light buses (the passenger vehicles with no more than 9 seats). Non-load-bearing structures generally have two longitudinal beams connecting the front and rear of the vehicle, and the beams are also connected by crossbeams (the section height of some of the crossbeams is less than the height of the longitudinal girders). Therefore, the vehicle body with the non-load-bearing structure has not been specially treated, and the concentrated space in which the mechanical quick-change bottom-mounted universal power battery can be arranged is relatively narrow. There are several ways to deal with it. (a) Redesign the beam. A middle part of the beam is moved to both sides with a bending structure, and a space for centrally arranging the mechanical fast replaceable bottom-mounted universal power batteries is expanded. After this change, the concentrated space is similar to the new energy passenger vehicle with the above-mentioned load-bearing or semi-bearing structure. (b) Choose relatively small mechanical fast-bottom-mounted universal power batteries, and other components on the front and rear axles should be placed forward and backward as far as possible, so as to increase the length of a space to accommodate batteries in the middle of the beam and increase the number of the mechanical fast-bottom-mounted universal power batteries to accommodate. (c) If the space under the beam is sufficient (or after the vehicle body is adjusted), a battery support can be installed under the beam, and the concentrated space after the battery support is installed is also similar the new energy passenger vehicle with the above-mentioned load-bearing or semi-bearing structure.

Most of the pickup trucks in commercial vehicles are also has the non-load-bearing structure. The situation is similar to the above-mentioned passenger vehicle non-load-bearing structure, which is also explained here.

Figure 53:
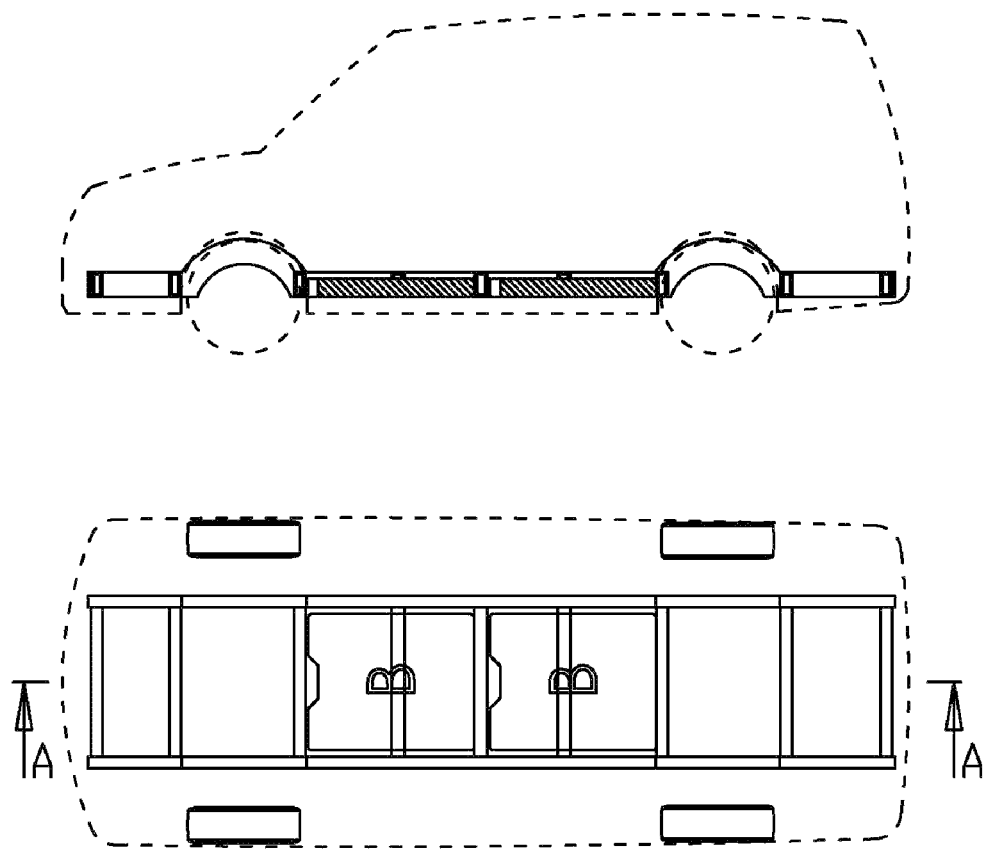
FIG. 53 schematically depicts an arrangement of the mechanical bottom-mounted power battery in a passenger vehicle and a truck with a non-bearing structural body according to the arrangement b described in FIG. 51.

FIG. 53 is a schematic diagram showing an arrangement of mechanical quick-change bottom-mounted universal power batteries in a passenger vehicle and a pickup truck with a non-bearing structure using the above-mentioned (b) method. There are generally many options for the type and quantity of the mechanical quick-change bottom-mounted universal power battery in the arrangement.

Figure 54:
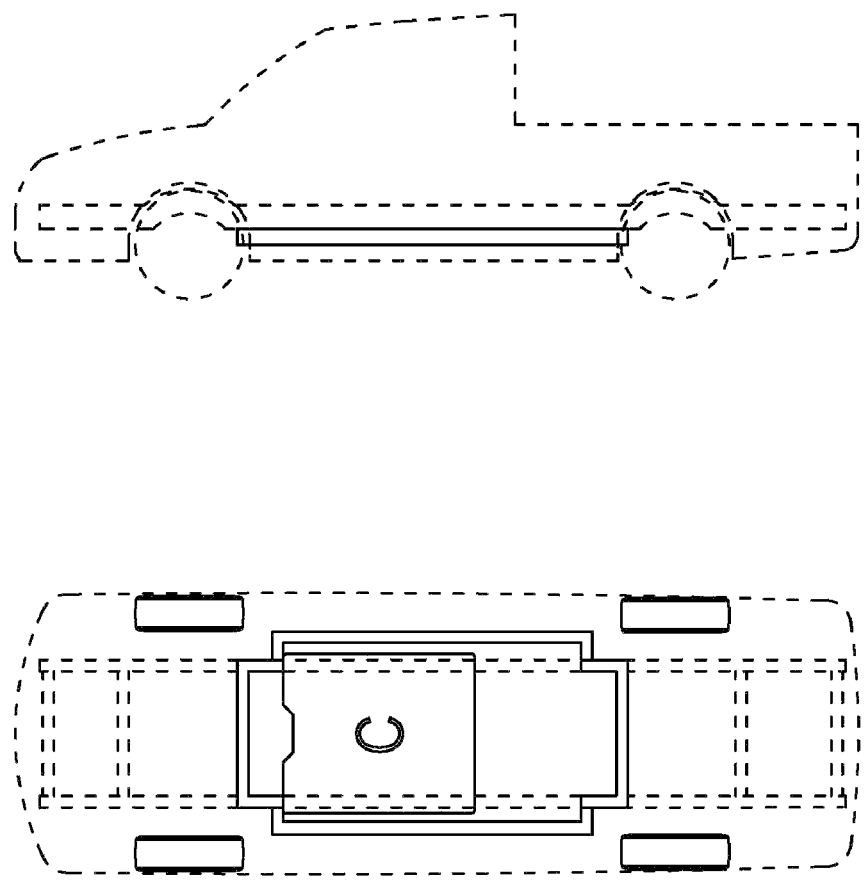
FIG. 54 schematically depicts an arrangement of the mechanical bottom-mounted power battery in a passenger vehicle and a truck with the non-bearing structural body according to the arrangement c described in FIG. 51.

FIG. 54 is a schematic diagram showing an arrangement of mechanical quick-change bottom-mounted universal power batteries in a passenger vehicle and a pickup truck with a non-bearing structure using the above-mentioned (c) method. The arrangement using this method is similar to the above-mentioned arrangement on the vehicle with the load-bearing or semi-bearing structure. There are generally many options for the type and quantity of the mechanical quick-change bottom-mounted universal power battery in the arrangement.

It can be seen from the above arrangements that most new energy passenger vehicles have multiple options for mechanical quick-change bottom-mounted universal power batteries from small to large (or more). The arrangement with a large number of power batteries is suitable for vehicles that are mainly powered by mechanical quick-change bottom-mounted universal power batteries and are designed to have a long range of pure electric power. The arrangement with a small number of power batteries is suitable the situation described below. Other types of power batteries (miniaturized quick-change general power batteries, non-universal power batteries) are arranged at the same time, or new power batteries with relatively small storage capacity are required for other energy drives. New energy passenger vehicles with a small design cruising range are also applicable. In the future, if the energy density of power batteries is greatly increased, and the volume of storage capacity batteries is reduced, the size of the mechanical quick-change bottom-mounted universal power battery can also be reduced.

Two mechanical quick-change bottom-mounted universal power batteries can be used as one power battery pack or as a power battery pack, respectively. When the mechanical quick-change bottom-mounted universal power batteries are respectively used as a power battery pack, they can be replaced in turn. Such configuration can be adopted regardless of the energy density of the power battery, and when the battery replacement is well-developed, this configuration can be used in on pure electric vehicles, solar electric vehicles (when solar power cannot support long-distance continuous driving) and other types of new energy passenger vehicles.

The mechanical fast bottom-mounted universal power battery with a suitable size can also be matched with fuel cell vehicles in new energy vehicles. Fuel cell vehicles can switch between a fuel-filled mode or a battery-replacement mode as needed.

The above-mentioned embodiments of the quick-change universal power battery system show that the four main models of A, B, C and D of the mechanical quick-change bottom-mounted universal power batteries can meet the requirements of most new energy passenger vehicles (except for some special vehicles, such as some racing cars require a particularly low body, and the height of the under-floor space is too small to accommodate the mechanical quick-change bottom-mounted universal power battery). Those batteries are arranged to meet the mileage needs. There are also slightly shortcomings. Micro-electric vehicles, especially the type of vehicle ① in the above figure (the vehicle ① is generally single-row and two-seater vehicle), only have a small number of ways to arrange the mechanical quick-change bottom-mounted universal power battery. Fortunately, the micro-electric vehicles just need a small number of power batteries, and the miniaturized quick-change universal power batteries can meet their need. Therefore, the micro-electric vehicle still has the flexibility of configuration.

According to the storage capacity the four main models of A, B, C and D of t mechanical quick-change bottom-mounted universal power batteries (when the volumetric energy density of the system is 400 W/L) and the current power consumption per unit mileage of each model of new energy passenger vehicle (and vehicle size, vehicle weight, the technical performance of electronic control and motor and other factors), a comprehensive cruising range, by a battery replacement, of a pure electric vehicle with the largest battery is calculated, Two-seater mini-electric vehicles, off-road vehicles with non-load-bearing structure and other models with relatively small configurable capacity can reach more than 200 kilometers, and other models can basically reach 270-400 kilometers. If the system energy density is greater than or less than 400 W/L, the comprehensive cruising range is increased or decreased proportionally based on the above-mentioned calculation data.

For new-energy passenger vehicles with multiple power battery packs, a combined power supply method and a sub-path power supply method can be adopted as required, and a joint charging setting can also be configured to improve the charging efficiency. These methods will be described below. Mutual charging can also be configured based on applicability.

In general, the embodiments of the quick-change universal power battery system can be universally applied in new energy passenger vehicles.

With respect to the trucks in commercial vehicles, the trucks mainly use quick-change bottom-mounted universal power batteries (main models: A, B, C, D) and mechanical quick-change side-mounted general power batteries (main model E). Miniaturized quick-change universal power battery (main model H) can also be used.

With respect to the application of H-type miniaturized quick-change universal power battery in a truck, the H-type miniaturized quick-change universal power battery is small and has small storage capacity, and the application opportunity in the truck is relatively small. The H-type miniaturized quick-change universal power battery can be used in small trucks such as minivans or new energy trucks that require a small number of power batteries. Due to its small size, the H-type miniaturized quick-change universal power battery is easy to arrange in a suitable position in the vehicle, and the design and arrangement of the corresponding battery compartment and battery compartment cover is also easy. It can be applied in a suitable environment (the surrounding temperature may need to be controlled).

The application of the mechanical quick-change universal power batteries (main models: A, B, C, D, E) in trucks will be described below.

Generally, the arrangement position of the mechanical quick-change universal power batteries in the new energy truck need to avoid axles, drive motors, transmission mechanisms, suspensions and tires. Similar to the above-mentioned new energy passenger vehicles, the suspension that occupies a longer longitudinal space may not be used when designing a new energy vehicle, but if the number of mechanical quick-change universal power batteries is small and does not affect the layout, such suspension can still be adopted. The steel plate suspension, which is still commonly used in trucks, is under consideration. In addition, the drive motor and transmission mechanism on the new energy truck may occupy a relatively large amount of longitudinal space (which is related to the size of the power; generally, one direction of the axle takes up more; and it is also related to the structure, for example, the use of in-wheel motor drive has no direct effect on the longitudinal space), but generally does not affect the space outside the beam. Other components with greater flexibility in structure or installation location can provide a space for the arrangement of mechanical quick-change universal power batteries through re-planning the structure or the installation location.

New energy trucks mainly adopt non-load-bearing structure, and some adopt load-bearing or semi-loading (such as some minivans) structure, but the layout space conditions are basically similar in similar vehicles. The following embodiments are mainly based on the vehicles with non-load-bearing structure, and vehicles with other body structures are not explained.

FIGS. 48*a*-48*e* show applications of the mechanical quick-change universal power battery (main models: A, B, C, D, E) in the truck.

FIG. 48*a* shows an arrangement of one C-type mechanical quick-change bottom-mounted universal power battery in a mini-truck. A voltage of the C-type mechanical quick-change bottom-mounted universal power battery can be 192 V or 384 V. A length of the mini-truck is 4850 mm. A width of the mini-truck is 1600 mm. A height of the mini-truck is 2100 mm. A wheelbase of the mini-truck is 2600 mm.

FIG. 48*b* shows an arrangement of two B-type mechanical quick-change bottom-mounted universal power batteries in a light truck. A voltage of the B-type mechanical quick-change bottom-mounted universal power battery can be 192 V or 384 V. The two B-type mechanical quick-change bottom-mounted universal power batteries are connected in series to form a power battery pack with a voltage of 384 V or 768 V. A length of the light truck is 5980 mm. A width of the light truck is 2050 mm. A height of the light truck is 2360 mm. A wheelbase of the light truck is 3360 mm.

FIG. 48*c* shows an arrangement of four E-type mechanical quick-change side-mounted universal power batteries in a light truck (van type). A voltage of the E-type mechanical quick-change side-mounted universal power battery can be 96 V or 192 V. The four E-type mechanical quick-change side-mounted universal power batteries are connected in series to form a power battery pack with a voltage of 384 V or 768 V. A length of the light truck is 5980 mm. A width of the light truck is 2050 mm. A height of the light truck is 2900 mm. A wheelbase of the light truck is 3360 mm. The light truck provided herein is basically the same as that in FIG. 48*b* except that the light truck provided herein has a van-type carriage.

FIG. 48*d* shows an arrangement of six E-type mechanical quick-change side-mounted universal power batteries in a semi-trailer tractor (heavy truck). A voltage of the E-type mechanical quick-change side-mounted universal power battery is 192 V. The six E-type mechanical quick-change side-mounted universal power batteries are connected in series to form a power battery pack with a voltage of 1152 V. A length of the semi-trailer tractor is 6920 mm. A width of the semi-trailer tractor is 2500 mm. A height of the semi-trailer tractor is 3000 mm. A wheelbase of the semi-trailer tractor is 3300+1350 mm.

FIG. 48d shows an arrangement of twelve E-type mechanical quick-change side-mounted universal power batteries in a semi-trailer. A voltage of the E-type mechanical quick-change side-mounted universal power battery is 96 V. The twelve E-type mechanical quick-change side-mounted universal power batteries are connected in series to form a power battery pack with a voltage of 1152 V. A length of the semi-trailer is 12200 mm. A width of the semi-trailer is 2480 mm. A height of the semi-trailer is 1580 mm.

There are many types of trucks and need to be fully explained. From the perspective of truck applications, ordinary trucks, including pickup trucks, mini trucks, light trucks, medium trucks (not shown), and conventional-load trucks in the heavy trucks (not shown), account for the largest proportion. There are also many types of carriage, but the carriages basically do not affect the arrangement of power batteries.

The following types of trucks account for the secondary proportion: trailers, dump trucks and concrete mixer trucks. The trailers include full trailers, semi-trailers, semi-trailer tractors (heavy trucks) and central axle trailers.

Other types of trucks account for a relatively small proportion, such as road cleaning trucks, fire trucks, truck cranes, mining trucks, and engineering trucks. There are also many special vehicles. Although they have many varieties in general, but their proportion is small.

The ordinary transport vehicles, pickup trucks, have been explained in the new energy passenger vehicles above.

The mini-truck has a low body, and the mini-truck with the non-load-bearing structure, the load-bearing structure or the semi-loaded body structure is suitable for adopting the mechanical quick-change bottom-mounted universal power battery, and the arrangement is similar to new energy passenger vehicle.

For light trucks, medium trucks, and heavy trucks, the general rule is that if the tonnage is large, the body size is correspondingly large and the length is long. More or larger mechanical quick-change universal power batteries can be configured to meet the needs of cruising range.

In the layout, both types of mechanical quick-change universal power batteries can be configured. From the figures, in general, the vehicles of the same size, the mechanical quick-change bottom-mounted universal power battery is arranged below the main beam and the mechanical quick-change side-mounted universal power battery is arranged outside the main beam. The mechanical quick-change side-mounted universal power battery arranged outside the main beam has a larger battery storage capacity. As shown in FIG. 48b and FIG. 48c, the two light trucks have the same size, and the former has two B-type mechanical quick-change bottom-mounted universal power batteries and the latter has four E-type mechanical quick-change side-mounted universal power batteries. Under the same volumetric energy density (400 W/L) of the battery system, the total battery storage capacity of the former is 76.8 kWh, and the total battery storage capacity of the latter is 122.8 kWh. However, if some of the side space is occupied by other devices, it may not have this feature.

Two types of mechanical quick-change universal power batteries can also be configured at the same time. There are two arrangement ways. (a) After the E-type mechanical quick-change side-mounted universal power battery is arranged on both sides, the mechanical quick-change bottom-mounted universal power battery is arranged below the main beam and inside the battery compartment of the mechanical quick-change side-mounted universal power battery. However, the layout space is relatively narrow. (B) After the E-type mechanical quick-change side-mounted universal power battery is arranged on both sides, the mechanical quick-change bottom-mounted universal power battery is arranged below the main beam and battery compartment of the mechanical quick-change side-mounted universal power battery. The layout space is relatively wide. The former layout is suitable for vehicles with low vehicle body, while the latter requires a higher vehicle body but can obtain a larger battery storage capacity. In addition, the space above the mechanical quick-change bottom-mounted universal power battery and the inner space of battery compartment of the mechanical quick-change side-mounted universal power battery can also be equipped with non-general power batteries. However, in order to simplify the design, manufacturing and battery replacement, it is recommended that new energy trucks use one type of mechanical quick-change universal power battery or adopt a combination of a type of mechanical quick-change universal power battery and a non-universal power battery. If it is really in need, two types of mechanical quick-change universal power batteries can be configured at the same time, or they can be combined with non-universal power batteries.

With respect to the above-mentioned light-duty trucks with smaller size and lower body, the E-type mechanical quick-change side-mounted universal power battery may cause the ground clearance to be too small. It can be adjusted by appropriate design for arranging the power battery, such as appropriately increasing the height of the bottom of the cargo carriage.

With respect to the trailers, dump trucks, and concrete mixers concrete mixer trucks. The trailers include full trailers, semi-trailers, semi-trailer tractors (heavy trucks) and central axle trailers. The semi-trailers include container semi-trailers, dropside semi-trailers, cargo semi-trailers, van semi-trailers, platform semi-trailers, tank semi-trailers, low-bed semi-trailers, and car-transporter trailers. Most trailers have many spaces for accommodating the mechanical quick-change universal power batteries, such as the space between longitudinal tires in a full trailer, the space between a rear tire and an intersection of a tractor and a semi-trailer, and the space around a central tire of a central axle trailer. The mechanical quick-change universal power battery can be arranged below a main beam and below an outer carriage of the main beam. After the arrangement, the battery replacement can bring a larger cruising range to the overall driving of the tractor and the trailer. Only a few types of vehicles, such as double-deck car-transporter trailers (for transporting cars), cannot be equipped with mechanical quick-change side-mounted universal power battery due to low vehicle body, but the double-deck car-transporter trailers can be equipped with mechanical quick-change bottom-mounted universal power battery, and the cruising range brought by a battery replacement is relatively small.

The vehicle body of the semi-trailer tractor is relatively short, and the amount of mechanical quick-change universal power batteries that can be deployed corresponding to the tonnage is relatively small, but the semi-trailer tractor is light-loaded when driving alone, and the cruising range is still large. When towing a semi-trailer, the mechanical quick-change universal power battery configured on the corresponding semi-trailer can be used. Therefore, the cruising range brought by a battery replacement mainly depends on the arrangement condition of the mechanical quick-change universal power battery on the semi-trailer.

The vehicle body characteristics of dump trucks and concrete mixer trucks are similar to those of the above-mentioned semi-trailer tractors (heavy trucks). The tonnage is large but the vehicle body is relatively short. The corresponding tonnage can be equipped with a relatively small amount of mechanical quick-change universal power batteries. The cruising range brought by battery replacement is relatively small. The power battery can be used in combination with the non-universal power battery, which is suitable for regional transportation. For continuous long-distance driving, the trip can be completed through multiple battery replacements. If the energy density of the battery is greatly improved in the future, the cruising range brought by a battery replacement can be increased.

The above-mentioned types of special trucks can be equipped with non-universal power batteries at the same time. When necessary and feasible, the trucks can also be equipped with two types of mechanical quick-change universal power batteries, or combine the two types of mechanical quick-change universal power batteries with non-general power batteries.

With respect to other special vehicles that account for a relatively small proportion, the space for accommodating the mechanical quick-change universal power battery is mainly located above the beam, between the longitudinal tires or at sides of the vehicle. There are also vehicles that are not suitable for accommodating the mechanical quick-change universal power battery. For example, some road washing-and-sweeping vehicles, in which washing-and-sweeping devices are arranged on the inner and outer sides between the front and rear tires, are not suitable for accommodating the mechanical quick-change universal power battery. With respect to extra-large mining vehicles, the conventional arrangement of the mechanical quick-change universal power battery requires too many batteries, such that the mechanical quick-change universal power battery is difficult to accommodate and replace. Extra-heavy flatbed trucks usually have small spacing between the longitudinal tires, which makes it impossible to arrange the mechanical quick-change universal power batteries. There may be other types of vehicles that are not suitable for accommodating the mechanical quick-change universal power battery, but their overall proportion is small.

According to what mentioned above, except for a few special vehicles, most of trucks can be equipped with mechanical quick-change universal power batteries. According to the storage capacity of each main model of the mechanical quick-change universal power battery when the volumetric energy density of the system is 400 W/L and the current power consumption per unit mileage of each model of new energy trucks (and vehicle size, vehicle weight, the technical performance of electronic control and motor and other factors), a comprehensive cruising range, by a battery replacement, of the above-mentioned vehicles with the sufficient batteries are calculated. The driving distance per charge of ordinary transport vehicles is 200-350 kilometers. The driving distance per charge of most semi-trailers combined with tractors is 200-350 kilometers or longer. The driving distance per charge of car-transporter trailers is above 150 kilometers. The driving distance per charge of dump trucks, concrete mixer trucks and other heavy vehicles is above 100 kilometers. If two types of mechanical quick-change universal power batteries are configured at the same time, the comprehensive cruising range brought by one battery change can also be increased. If the volumetric energy density of the system is greater than or less than 400 W/L, the comprehensive cruising range will increase or decrease proportionally based on the above-mentioned calculation data.

Some of the above-mentioned special trucks that are not suitable for arranging mechanical quick-change universal power batteries can also use mechanical quick-change universal power batteries normally after appropriate adjustments when switching from fuel-based vehicles to new energy vehicles. For example, with respect to the road washing-and-sweeping vehicles in which the washing-and-sweeping devices are arranged at the front and rear positions (front suspension and rear suspension), and the mechanical quick-change universal power battery can be normally arranged between the longitudinal tires. The adjustment methods of other various vehicles should be designed according to the characteristics of the vehicles.

Embodiments of the quick-change universal power battery system for trucks using other new energy types are generally equipped with few power batteries. The situation is similar to the above-mentioned new energy passenger vehicles, and there may also can be better combinations. For example, the combination of fuel cell and mechanical quick-change universal power battery can also be applied flexibly and practically on new energy trucks.

For new-energy passenger trucks with multiple power battery packs, a combined power supply method and a sub-path power supply method can be adopted as required, and a joint charging setting can also be configured to improve the charging efficiency. These methods will be described below. Mutual charging can also be configured based on applicability.

In general, the embodiments of the quick-change universal power battery system can be applied in most of the new energy trucks. The E-type mechanical quick-change side-mounted universal power batteries account for a large proportion of new energy trucks. Due to the use of two groups of port, for the heavy trucks and other large vehicles, the power battery, along a length direction thereof, can be arranged in the battery compartment from the side of the vehicle, and for the light trucks and other small vehicles, the power battery, along a width direction thereof, can be arranged in the battery compartment from the side of the vehicle. Therefore, one main type of power battery can meet the needs of the vehicles that need to be equipped with the side-mounted batteries (in the two arrangement ways, after the power battery is installed and fixed, the battery compartment door can be closed, and there is a distance between the outside of the battery and the battery compartment door; and if the vehicle is accidentally hit, it is not easy to hit the battery, which can increase safety). The number of main models of the quick-change universal power battery system is effectively controlled, so the system has strong versatility.

With respect to the buses in commercial vehicles, the passenger vehicles mainly adopt the mechanical quick-change bottom-mounted general power batteries (main models: A, B, C, D) in the embodiments of the quick-change universal power battery system. The larger passenger buses can also adopt quick-change side-mounted universal power battery (main model E). The miniaturized quick-change universal power batteries (main model H) can also be used.

With respect to the application of the H-type miniaturized quick-change universal power batteries in the buses, minibuses belong to passenger vehicles and have been explained. Other buses are relatively large in size and weight, and due to the small size and small storage capacity of the H-type miniaturized quick-change universal power battery, the application opportunities in other buses are also small. The H-type miniaturized quick-change universal power battery can also be used in other buses if necessary, and there are many positions in the buses for accommodating the power batteries, referring to the arrangements in passenger vehicles and trucks.

The application of the power mechanical quick-change universal power batteries (main models: A, B, C, D, E) in buses will be described below.

Generally, the arrangement position of the mechanical quick-change universal power batteries in the new energy bus need to avoid axles, drive motors, transmission mechanisms, suspensions and tires. Similar to the above-mentioned new energy passenger vehicles, the suspension that occupies a longer longitudinal space may not be used when designing a new energy vehicle, but if the number of mechanical quick-change universal power batteries is small and does not affect the layout, such suspension can still be adopted. The steel plate suspension, which is still commonly used in trucks, is under consideration. In addition, the drive motor and transmission mechanism on the new energy bus may occupy a relatively large amount of longitudinal space (which is related to the size of the power; generally, one direction of the axle takes up more; and it is also related to the structure, for example, the use of in-wheel motor drive has no direct effect on the longitudinal space), but generally does not affect the space outside the beam. Other components with greater flexibility in structure or installation location can provide a space for the arrangement of mechanical quick-change universal power batteries through re-planning the structure or the installation location.

Non-bearing, semi-bearing, and load-bearing structure are adopted used in buses (many medium and large passenger buses adopted full-bearing integral frame structure). Since the chassis of new energy buses is high, in addition to avoiding the above components, various bus bodies can be equipped with a battery support (battery compartment of the mechanical quick-change bottom-mounted universal power battery under the bus. For buses with high or partially high floors in the bus, in addition to avoiding the necessary components, the battery compartment of the mechanical quick-change side-mounted universal power battery can be reasonably configured in the corresponding position.

Figure 55A:
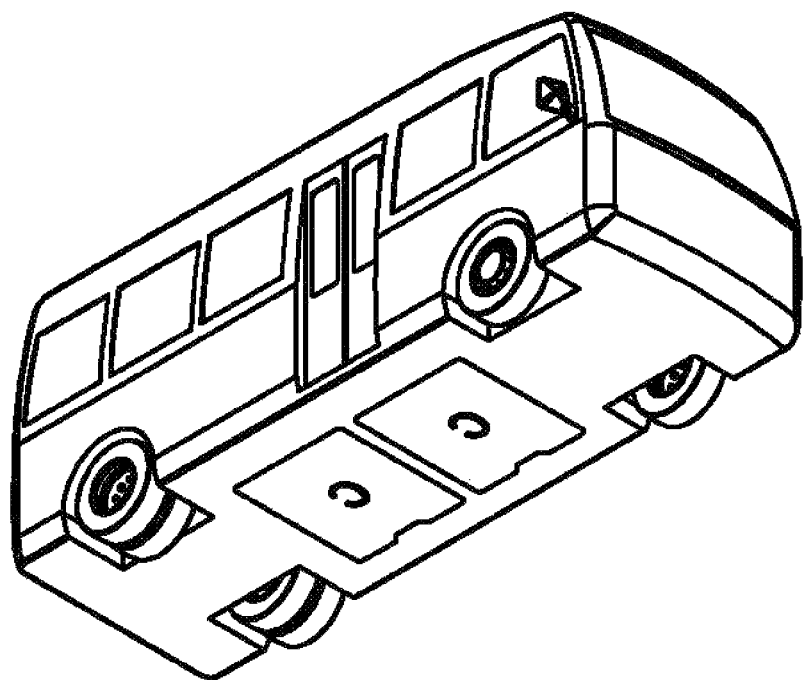
FIGS. 55A-C schematically depicts an application of a mechanical power battery in the passenger vehicle.
Figure 55B:
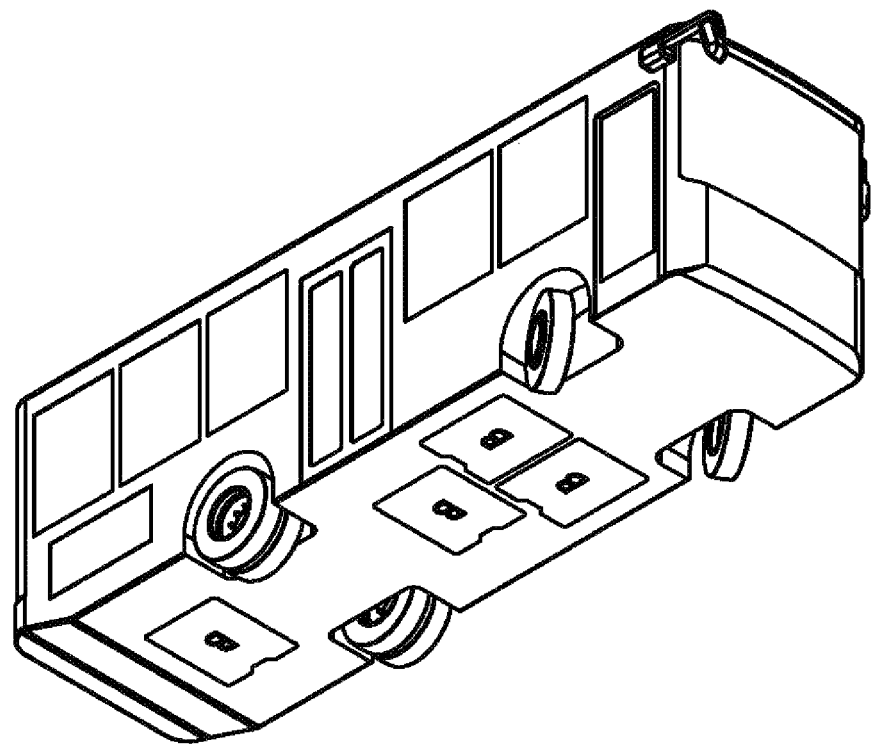
Figure 55C:
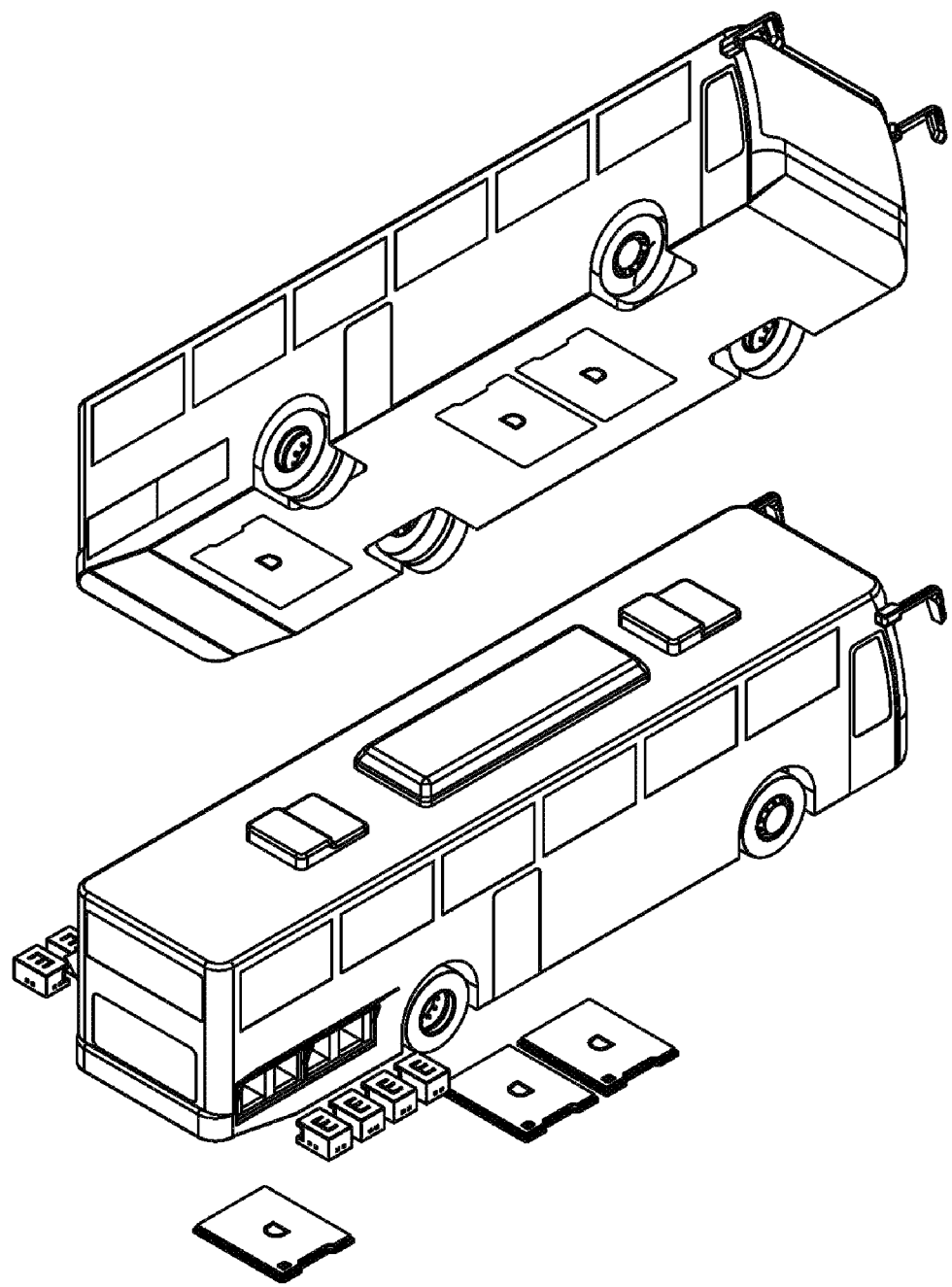

FIGS. 55a-55c show application of the mechanical quick-change universal power battery (main models: A, B, C, D, E) in buses (the drawings are simplified diagrams, and d, and do not indicate body structure of the buses).

FIG. 55a shows an arrangement of two C-type mechanical quick-change bottom-mounted universal power batteries in a light bus. A voltage of the C-type mechanical quick-change bottom-mounted universal power battery is 192 V or 384 V. The two C-type mechanical quick-change bottom-mounted universal power batteries are in series to form a power battery pack with a voltage of 384 V or 768 V. A length of the light bus is 6000 mm. A width of the light bus is 2080 mm. A height of the light bus is 2520 mm. A wheelbase of the light bus is 3800 mm.

FIG. 55b shows an arrangement of four B-type mechanical quick-change bottom-mounted universal power batteries in a medium-sized bus. A voltage of the B-type mechanical quick-change bottom-mounted universal power battery is 192 V. The four B-type mechanical quick-change bottom-mounted universal power batteries are in series to form a power battery pack with a voltage of 768 V. A length of the medium-sized bus is 8720 mm. A width of the medium-sized bus is 2380 mm. A height of the medium-sized bus is 3340 mm. A wheelbase of the medium-sized bus is 4000 mm.

FIG. 55c shows an arrangement of three D-type mechanical quick-change bottom-mounted universal power batteries and eight E-type mechanical quick-change side-mounted universal power batteries in a large bus. A voltage of the D-type mechanical quick-change bottom-mounted universal power battery is 384 V. The three D-type mechanical quick-change bottom-mounted universal power batteries are in series to form a first power battery pack with a voltage of 1152 V. A voltage of the E-type mechanical quick-change side-mounted universal power battery is 96 V. The eight E-type mechanical quick-change side-mounted universal power batteries are in series to form a second power battery pack with a voltage of 768 V. A length of the large bus is 12060 mm. A width of the large bus is 2560 mm. A height of the large bus is 3380 mm. A wheelbase of the large bus is 5800 mm. With respect to the arrangement provided herein, if the two power battery packs are required to have the same voltage, two adjustment methods are provided. (a) The number of the D-type mechanical quick-change bottom-mounted universal power batteries is reduced to two, and the voltage of both power battery packs is 768 V. (b) The number of the E-type mechanical quick-change side-mounted universal power batteries is reduced to six, and the voltage of the E-type mechanical quick-change side-mounted universal power is adjusted to 192 V. The voltage of both power battery packs is 1152 V.

Some of the medium-sized buses and large buses have high floors in the vehicle or have high floors in some areas of the vehicle (such as the floor position at the rear of the vehicle is gradually increased). The E-type mechanical quick-change side-mounted universal power batteries can be arranged under the floor. (If there are other necessary components, the position for those components should be set aside). The mechanical quick-change bottom-mounted universal power battery can still be arranged at the bottom of the vehicle. The buses with a low floor therein mainly adopt the mechanical quick-change bottom-mounted universal power batteries, and the layout can be determined in conjunction with the body structure.

New energy buses that use mechanical quick-change universal power batteries can still be equipped with non-universal power batteries at the same time.

According to the storage capacity of each main model of the mechanical quick-change universal power battery when the volumetric energy density of the system is 400 W/L) and the current power consumption per unit mileage of each model of new energy buses (and vehicle size, vehicle weight, the technical performance of electronic control and motor and other factors), a comprehensive cruising range, by a battery replacement, of the above-mentioned vehicles with the sufficient batteries are calculated. The driving distance brought by one battery replacement usually above 200 kilometers. For example, for those medium-sized and large new energy buses that accommodate two types of mechanical quick-change universal power batteries, the driving distance brought by one battery replacement can reach 350-500 kilometers. If the volumetric energy density of the system is greater than or less than 400 W/L, the comprehensive cruising range will increase or decrease proportionally based on the above-mentioned calculation data.

There may be some special buses, and the space for accommodating the mechanical quick-change universal power battery is occupied or partially occupied by other components.

Embodiments of the quick-change universal power battery system for buses using other new energy types are generally equipped with few power batteries. The situation is similar to the above-mentioned new energy passenger vehicles, and there may also be better combinations. For example, the combination of fuel cell and mechanical quick-change universal power battery can also be applied flexibly and practically on new energy buses.

For new-energy buses with multiple power battery packs, a combined power supply method and a sub-path power supply method can be adopted as required, and a joint charging setting can also be configured to improve the charging efficiency. These methods will be described below. Mutual charging can also be configured based on applicability.

In general, the embodiments of quick-change universal power battery system can be applied in most of the new energy buses.

According to what mentioned above, the embodiments of the quick-change universal power battery system can be applied in most of passenger cars, trucks and buses.

The applications of the quick-change universal power battery system in other new energy vehicles will be described below.

Low-speed electric vehicles are generally small vehicles, and suitable for using the H-type miniaturized quick-change universal power battery and the A-type mechanical quick-change bottom-mounted universal power battery.

Electric vehicles (two-wheel or three-wheel) can use the H-type miniaturized quick-change universal power battery.

With respect to the application of power batteries of the embodiments of the quick-change universal power battery system a vehicle, when multiple quick-change universal power batteries are need to form a power battery pack, the power batteries are usually connected in series to form the power battery pack. When the number of power batteries is large, those power batteries can be divided into multiple power battery packs. The power batteries can also be connected in parallel. If the power batteries are connected in parallel, it is necessary to prevent large current circulating current after installation under different conditions, and the corresponding configuration should be added. In an embodiment, a balanced line is set to perform a balance before the parallel connection. In another embodiment, an anti-circular current component, such as a diode is arranged at an output end of the power battery pack.

Adjustments of the embodiments of the quick-change universal power battery system will be described below.

The main models of power battery in the embodiments of the quick-change universal power battery system can be adjusted when necessary. The following adjustment scheme is a backup scheme. The adjustments are necessary before or at the beginning of implementing the quick-change universal power battery system, it is indeed to make. After it has been implemented, the implemented power battery should not be easily removed.

(1) With respect to the remove of the D-type mechanical quick-change bottom-mounted universal power battery in the embodiments, the premise is that during the introduction of the mechanical quick-change universal power battery, the energy density of the corresponding power battery will increase quickly, and the battery space of each vehicle model that can originally be equipped with D-type power battery can be arranged with other types of relatively small mechanical quick-change bottom-mounted universal power batteries. Although the space utilization rate may be reduced, the increase in the energy density of the power battery will eliminate the impact. Reducing the battery type in the embodiment is beneficial to improving the versatility.

Figure 56:
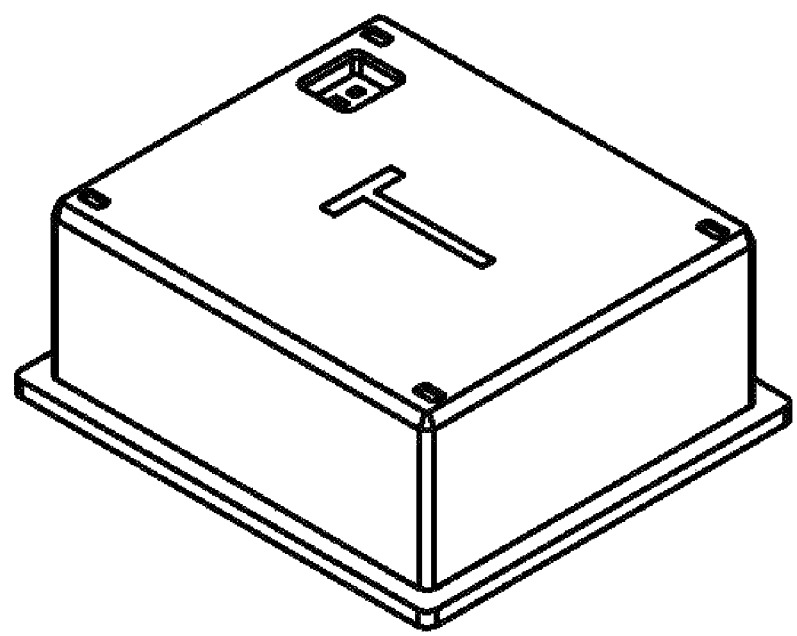
FIG. 56 schematically depicts a structure of the power battery used in a large new energy vehicle.

(2) FIG. 56 schematically depicts a thick mechanical quick-change bottom-mounted universal power battery, which is a main model T of the power battery. This type of the power battery is used for large new energy vehicles, can be arranged under the main beam of the vehicle with non-load-bearing structure, or arranged at the bottom of the vehicle with load-bearing or semi-bearing structure. Regardless of the mounting edge, a length of the T-type power battery is 800 mm; a width of the T-type power battery is 700 mm; a height of the T-type power battery is 350 mm; and a volume of the T-type power battery is about 195.5 L. When a volumetric energy density of the system is 400 W/L, a storage capacity of the T-type power battery is 78.2 kWh. A single quick-change connection port is arranged on the battery body, and an area around the quick-change connection port is of a recessed structure. The T-type power battery is provided with an independent liquid temperature-control loop. An external heat exchanger is arranged at a lower end (bottom surface) of the T-type power battery. A rated voltage of the T-type power battery has two modes: 288 V and 576 V. The use of T-type power battery can increase an overall storage capacity of mechanical quick-change universal power batteries when arranged in a large-scale vehicle, and increase the comprehensive driving distance brought by one battery replacement. For heavy vehicles such as semi-trailer tractors and dump trucks, on the basis of accommodating the E-type power batteries on both sides, one to two T-type power batteries can be arranged at under a middle main beam (between battery compartments of E-type power batteries on both sides), which can greatly improve the overall storage capacity. For semi-trailers and other vehicles, when the T-type power battery is arranged under the middle main beam, the driving distance brought by battery replacement can be further increased.

Figure 57A:
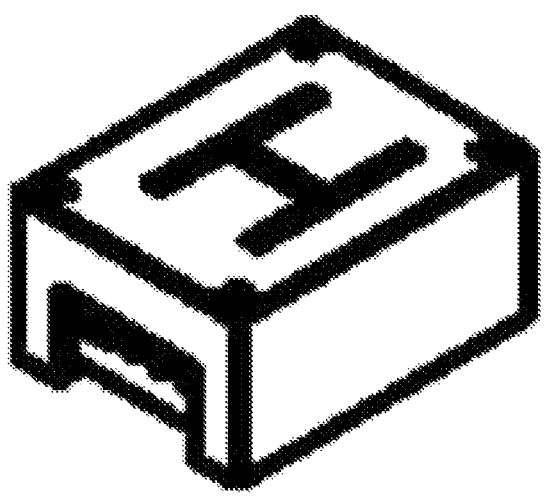
FIGS. 57A-C schematically depict different models of the power battery in the power battery system in accordance with an embodiment of the present disclosure.
Figure 57B:
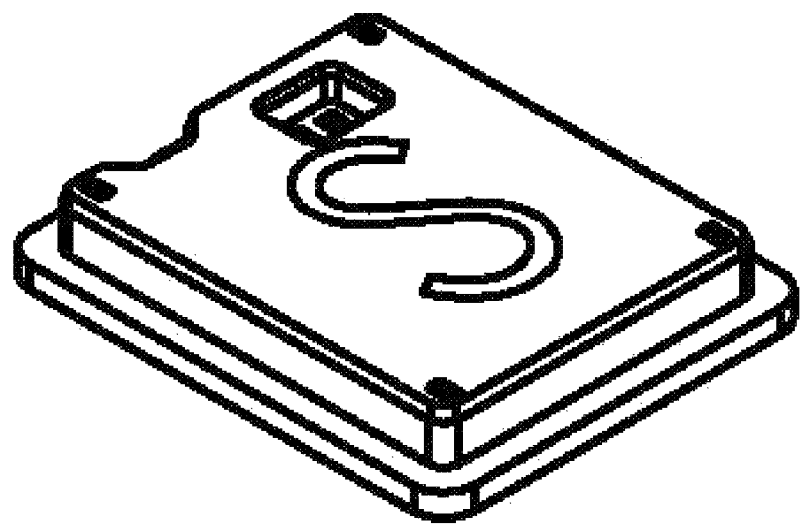

(3) FIG. 57b schematically depict a smaller mechanical quick-change bottom-mounted universal power battery, which is a main model S of the power battery. Regardless of the mounting edge, a length of the S-type power battery is 520 mm; a width of the S-type power battery is 420 mm; a height of the S-type power battery is 120 mm; and a volume of the S-type power battery is about 25.5 L. When a volumetric energy density of the system is 400 W/L, a storage capacity of the S-type power battery is 10.2 kWh. A single quick-change connection port is arranged on the battery body, and an area around the quick-change connection port is of a recessed structure. An internal heat-conducting sheet is combined with a heat-conducting glue to conduct heat to a lower end (bottom surface) of the S-type power battery, and the bottom surface of the S-type power battery is provided with semiconductor refrigeration (reversible heating). A rated voltage of the S-type power battery is 96 V. The S-type power battery can be flexibly arranged in a mini-vehicle, such as the vehicle (1) shown in FIG. 58 (1-3 S-type power batteries can be arranged). The S-type power battery is also more suitable for low-speed electric vehicles, and can also be arranged in wide-body two-wheeled or three-wheeled electric vehicles. The S-type power battery can be adopted in the embodiments of the quick-change universal power battery system in two ways. One is adding to the system, and the other is replacing the A-type power battery.

Modifications of the embodiments of the quick-change universal power battery system will be described below.

The above-mentioned S-type power battery can replace original types of mechanical quick-change bottom-mounted universal power batteries under following conditions. (a) The components of the independent liquid temperature-control loop are miniaturized, and are suitable for use on the S-type power battery. Or due to technological development, the S-type power battery does not need to adopt liquid temperature-control and can be used under various conditions. (b) The technology and equipment of battery replacement are improved, and improving the replacement efficiency (for example, a set of battery-replacement equipment is equipped with multiple replacing parts, and can replace multiple batteries at the same time; each replacing part can automatically adjust a position and rotation orientation; and the speed of removing and arranging the battery is fast). (c) The energy density of power battery cells continues to increase. Due to the small size of the batteries used, the proportion of structure and other components occupying the vehicle space will increase, reducing the energy density of the system.

Figure 58:
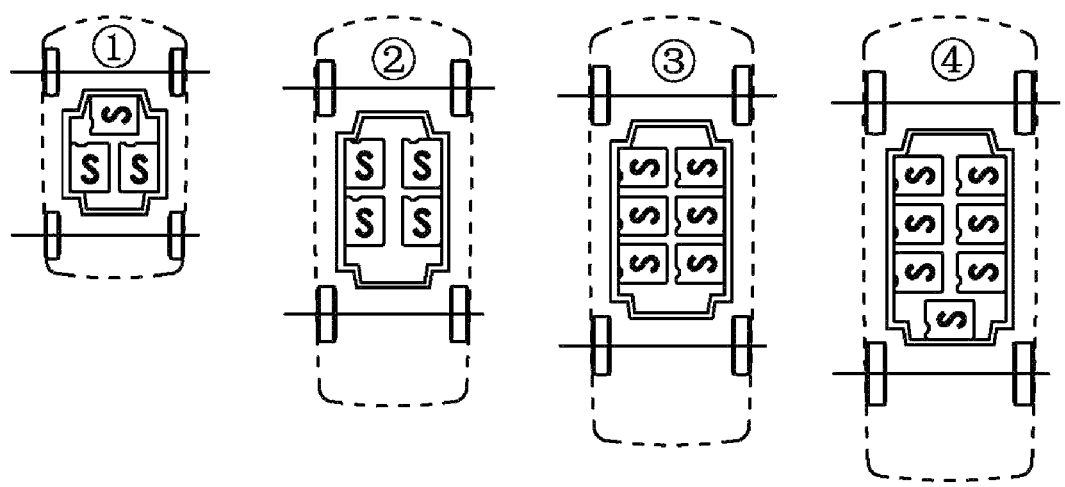
FIG. 58 schematically depicts arrangements of the power battery in different passenger vehicles.

The vehicle models that are originally suitable for accommodating various types of mechanical quick-change bottom-mounted universal power batteries can accommodate the S-type power battery, but the number of S-type power battery to be arranged should be increased. After the replacement, the new model will no longer use other models of mechanical quick-change bottom-mounted universal power batteries, and the system will be changed. FIG. 58 shows arrangements of the S-type power battery in the vehicle (1), the vehicle (2), the vehicle (3) and the vehicle (4), respectively.

Figure 57C:
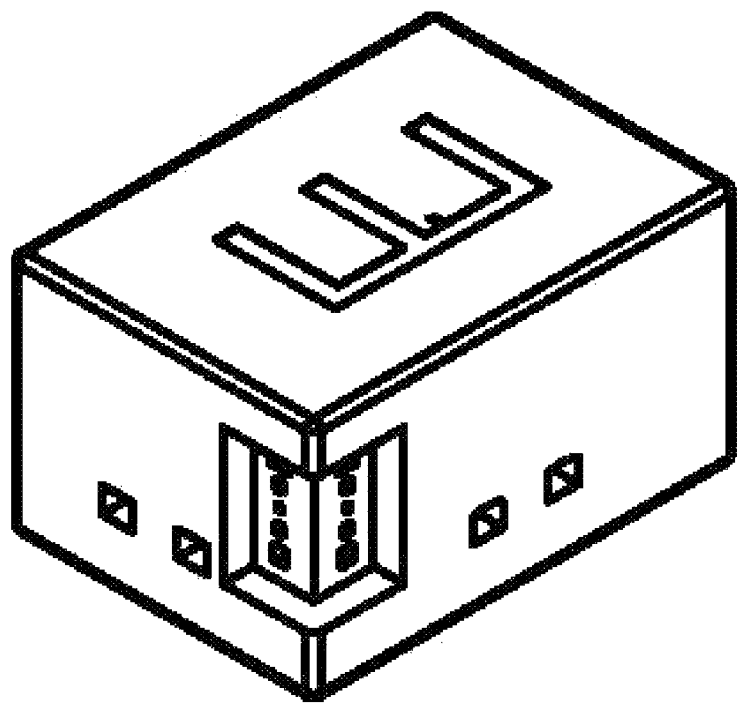

The embodiment of the modified quick-change universal power battery system is shown in FIG. 57. There are 3 main models of the power battery in total. FIG. 57*c* and FIG. 57*a* show the arrangement of the E-type power battery and H-type power battery, respectively. If the aforementioned T-type power battery is used, there are a total of 4 main models. The main models in the system are reduced, and the versatility is stronger.

According to the above-mentioned applications and embodiments of the quick-change universal power battery system, as for the quick-change universal power battery system, battery bodies having the same size and arranged in the same battery compartment belong to the same main model of the power battery; the battery bodies arranged in a component configured to connect and accommodate the power battery belong to the same main model of the power battery, and the number of the main model of the power battery for being replaced in different new energy vehicles is no more than eight. In the quick-change universal power battery system, battery cells of different categories and types can be arranged in different power batteries of the same main model for replacing.

By using the quick-change universal power battery system, the needs of the most models can be met by the several main models of power battery, popularizing the application of battery replacement. Based on this, the replacement stations can be widely distributed to realize the universal battery replacement of new energy vehicles.

With respect to the quick-change universal power battery system, when battery technology or quick-change universal power battery has made significant progress, a new system can be designed to gradually replace the original system.

A vehicle adopts a quick-change universal power battery. A vehicle body is provided with a quick-change connection port corresponding to the quick-change connection port of the battery body. The vehicle includes vehicles with a driving force and vehicles without a driving force, such as trailers and semi-trailers.

The vehicle with a driving force can work as a master vehicle to tow other vehicle, the towed vehicle (the towed vehicle can be equipped with or without a driving force) works as a slave vehicle. In some embodiments, the master vehicle is powered by a quick-change universal power battery arranged on the slave vehicle.

Figure 29:
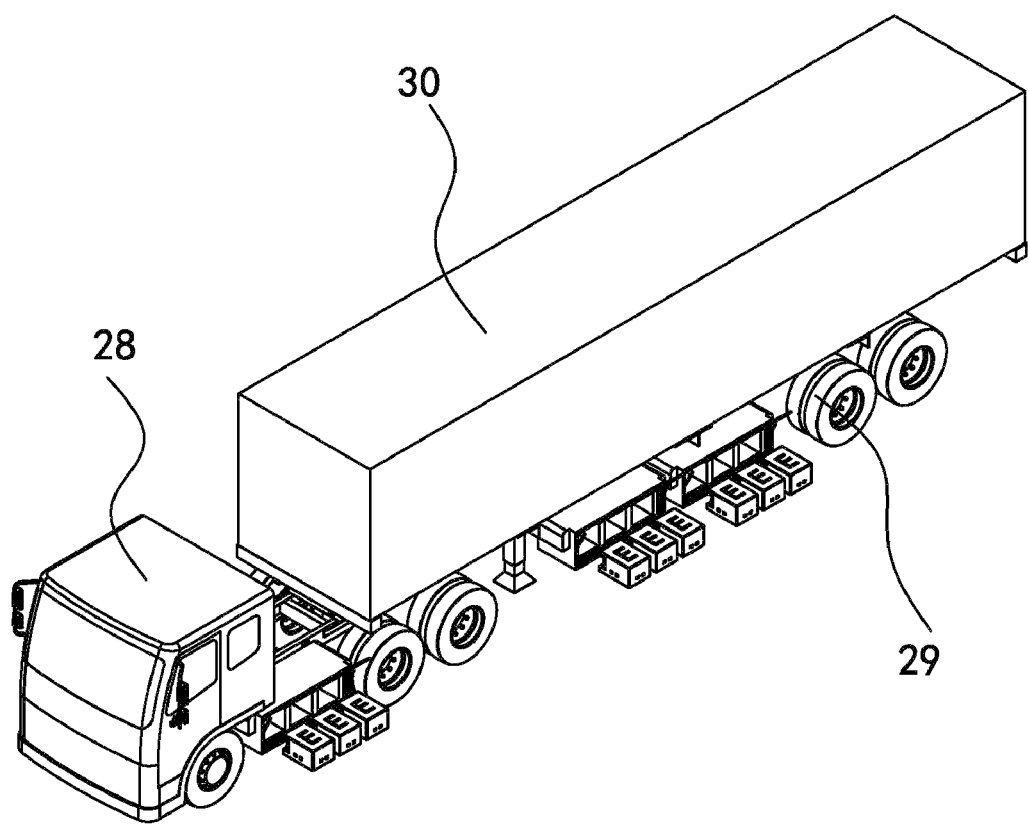
FIG. 29 schematically depicts a structure of a container truck in accordance with an embodiment of the present disclosure.

FIG. 29 shows a first embodiment that the master vehicle is powered by a quick-change universal power battery arranged on the slave vehicle, and a structure of a container truck is depicted in FIG. 29. The container truck includes a semi-trailer tractor 28, a semi-trailer 29 and a container 30. The semi-trailer tractor 28 works as the master vehicle, and is the same as that in FIG. 48*d*. The semi-trailer 29 works as the slave vehicle, and is the same as that in FIG. 48*e*. The master vehicle and the slave vehicle are respectively equipped with a quick-change universal power battery pack. Since the master vehicle is equipped with a power battery, it can be used independently. The slave car is equipped with a power battery, which is connected to a quick-change connection port on the master vehicle through a cable and a connector to supply power to the master vehicle, greatly increasing the driving distance per charge of the vehicle. The master vehicle can be connected to different slave vehicles (semi-trailers) with the quick-change universal power battery. In practical applications, the whole industry can unify relevant standards so that various semi-trailer tractors can be matched with various semi-trailers.

In a second embodiment (not shown) that the master vehicle is powered by a quick-change universal power battery arranged on the slave vehicle, the master vehicle drives a power-battery trailer, and the power-battery trailer has no driving force. A main body of the power-battery trailer is composed of a power battery, and the power-battery trailer is provided with a vehicle frame (that can be combined with a battery support or a battery shell) and a wheel. The power-battery trailer works as the slave vehicle, and is connected to a quick-change connection port on the master vehicle through a cable and a connector to supply power to the master vehicle, greatly increasing the driving distance per charge of the vehicle. The power battery trailer is equipped with an independent liquid temperature-control loop and provides a variety of optional voltages. The power-battery trailer itself is also a special quick-change universal power battery (not included in the quick-change universal power battery system mentioned above), and can have multiple models. In an embodiment, the master vehicle is provided with a quick-change universal power battery. In another embodiment, the master vehicle is only provided with a non-universal power battery. In another embodiment, the master vehicle is free of a power battery.

According to what mentioned above, the master vehicle with a driving force can connect to the slave vehicle, and the slave vehicle is replaceable. The master vehicle is powered by the quick-change universal power battery arranged on the slave vehicle. The master vehicle drives the slave vehicle. In this way, the driving distance per charge of the new energy vehicle is greatly increased. The new energy vehicle can also be powered by the power-battery trailer to increase the driving distance per charge.

With respect to new energy vehicles using a power battery, a vehicle control system is configured to control power output (power supply), vehicle driving and power-battery charging, and manages the power battery in conjunction with a power battery management system.

Figure 30:
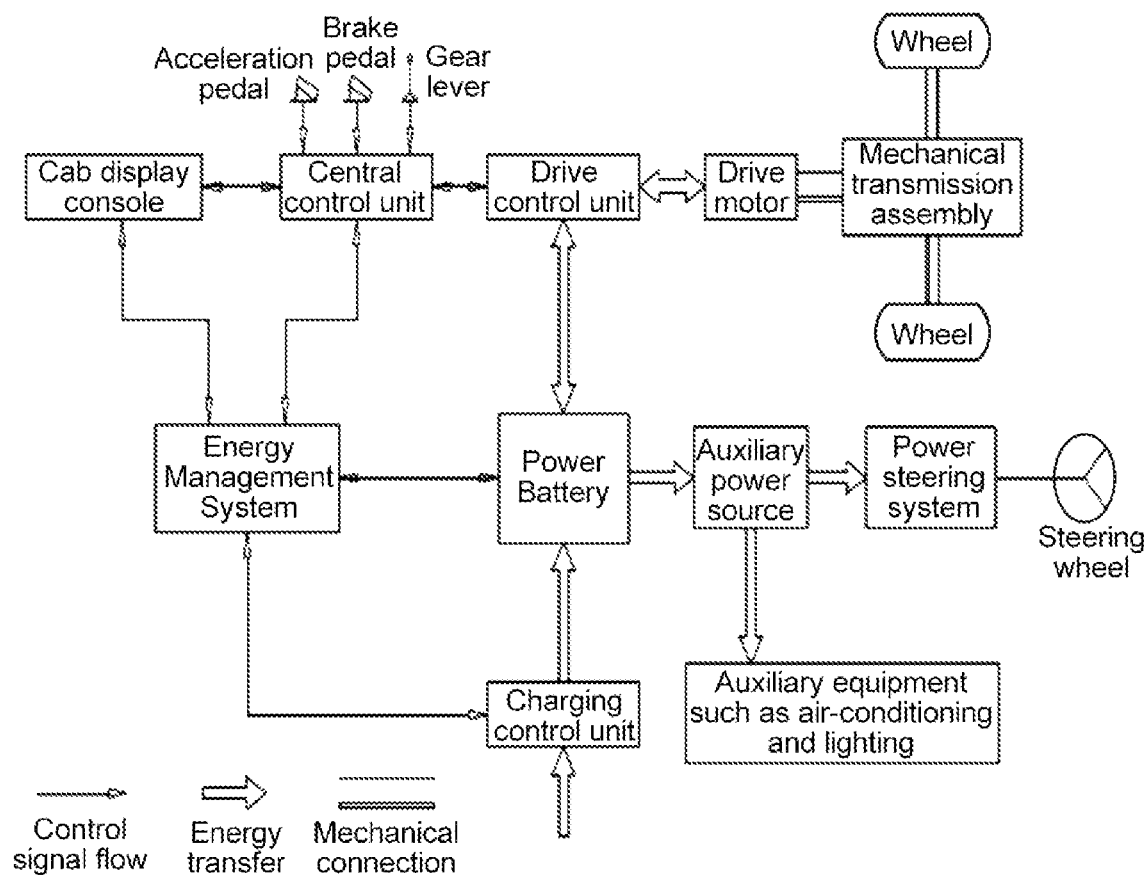
FIG. 30 schematically depicts a structure of a vehicle control system of a pure electric vehicle.

FIG. 30 is a first embodiment of the vehicle control system of a pure electric vehicle. The vehicle control system includes a central control unit. The central control unit is configured to receive signals from an accelerator pedal, a brake pedal and a gear lever. The central control unit also has a two-way control signal flow with a cab display console, an energy management system and a drive control unit. The cab display console and the energy management system also have a two-way control signal flow. The energy management system also has a two-way control signal flow with a power battery and a charging control unit. The power battery and the drive control unit have two-way energy transmission. The charging control unit controls a charging of the power battery. The drive control unit is connected to a drive motor, and the drive motor is connected to a mechanical transmission device. Both sides of the mechanical transmission device are provided with a wheel, respectively. The power battery is also connected to an auxiliary power source, and the auxiliary power source is connected to a power steering system. The power steering system is connected to a steering wheel. The auxiliary power source is also connected to an air conditioner and a lighting auxiliary device.

Figure 31:
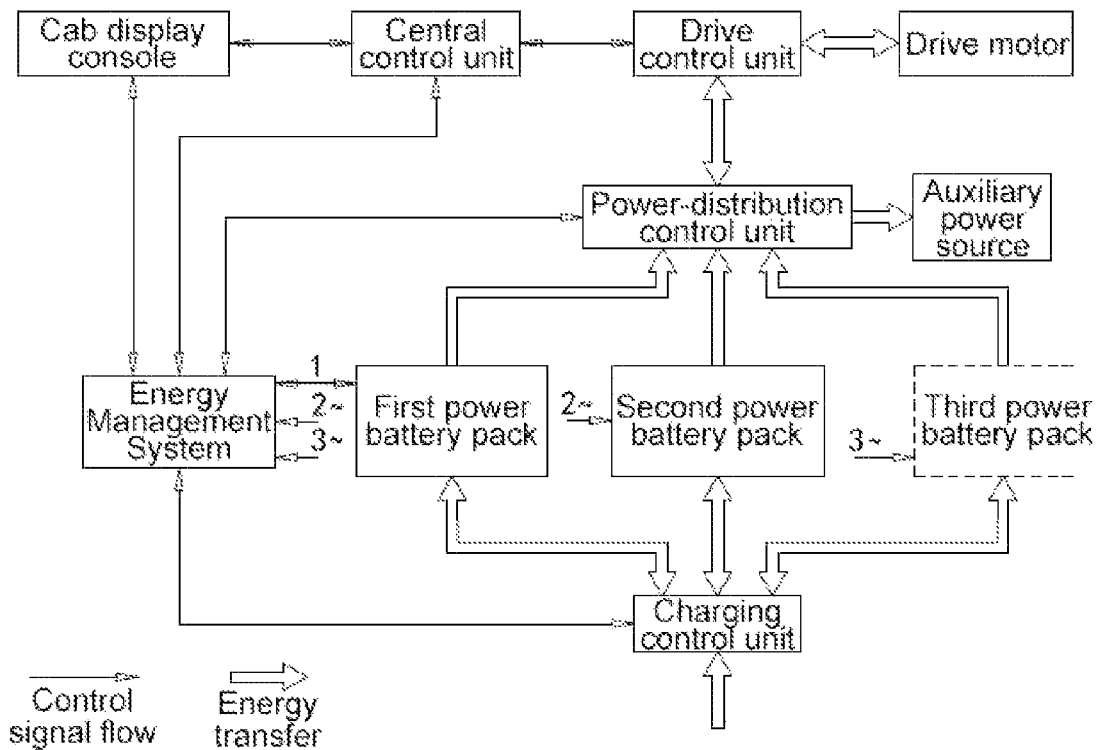
FIG. 31 schematically depicts a partial structure of the vehicle control system of the pure electric vehicle.

FIG. 31 is a second embodiment of the vehicle control system of a pure electric vehicle, and a partial structure of the vehicle control system is shown in the drawing. Compared to the first embodiment, the power battery of the vehicle control system in the first embodiment is replaced by multiple independent power battery packs in the vehicle control system provided herein. (In FIG. 30, the power battery is one power battery pack).

The first and second embodiments are the vehicle control systems of pure electric vehicles. Other types of new energy vehicles have similar principles in terms of power supply, drive control and charging control of the power battery.

With respect to new energy vehicles equipped with quick-change universal power batteries, and other power batteries including non-universal power batteries can be arranged on other positions of the vehicle to increase the overall driving distance per charge. Therefore, there are multiple power battery packs on the vehicle. Generally, it is difficult to match the timing of the quick-change universal power battery running out of vehicles and whether there are charging stations in the surrounding area. If the vehicle is equipped with multiple power battery packs, when one power battery pack is used up, another power battery pack can be used to power the vehicle. The battery replacement can be carried out until the vehicle drives to the replacement station. Both the master vehicle and the slave vehicle are equipped with the power battery pack, and when used in combination, the power battery on both vehicles can be used. The abovementioned vehicles all have multiple power battery packs at the same time. When a new energy vehicle has a large number of quick-change universal power batteries that are not suitable for being combined into one power battery pack, those power batteries can be divided into multiple power battery packs for use, and the vehicle also has multiple power battery packs at the same time.

A power-distribution control unit is configured to control a combined power supply of two or more independent power battery packs.

With respect to a new energy vehicle with multiple power battery packs, it can be be powered by different power battery packs through switch the power battery packs. However, the load capacity information of one power battery pack is relatively small, especially when the storage capacity of the power battery pack is relatively small, which affects the power performance of the vehicle. (In this case, the discharge rate of the power battery is large. The discharge rate of the power battery affects the performance of the power battery. generally, when the discharge rate is large, the effective power output of the power battery decreases, and frequent high-rate discharge will cause obvious damage to the power battery.) In another circumstance, the vehicle temporarily powered by multiple power battery packs connected in parallel when it meets the requirements. However, different power battery packs have different states, so the power battery packs are not suitable for parallel connection in most cases. (When the power battery packs are different states, if an anti-circular current component, such as a diode, is arranged on an output of the power battery pack, those power battery packs can be connected in parallel; however, the power battery packs often fail to provide an effective common output.) The power-distribution control unit can control a combined power supply of two or more independent power battery packs, and the overall load capacity information of the combined power supply is greater than that of a single-pack power supply. In addition, the discharge rate of the power battery decreases during the combined power supply, which can effectively solve or alleviate the above problem.

The combined power supply of multiple power battery packs can be switched with the single-pack power supply, or be switched with different combined power supply. When the vehicle needs a small power, for example, during a low-speed driving, the vehicle is powered by the single-pack power supply, and when the vehicle needs a high power, for example, during a high-speed driving or climbing, the vehicle is powered by the combined power supply of multiple power battery packs. The supply proportions of each power battery pack are controlled during the combined power supply. According to the usage of the vehicle, the priority power battery pack is determined to supply power, and when the priority power battery pack is used up, the battery replacement or charging is performed. In addition, the number of the power battery packs for the combined power supply can be changed that the combined power supply of a small number of power battery packs can be switched with the combined power supply of a large number of power battery packs. Through the switching mentioned above, the vehicle can reasonably arrange the power consumption plan of each power battery pack according to the charging and battery-replacement conditions, so as to control a consumption sequence of each power battery pack and meet the power supply needs of the vehicle at the same time.

The above-mentioned power battery packs can be arranged all on the master vehicle or all on the slave vehicle driven by the master vehicle. In addition, the power battery packs can also be arranged on the master vehicle and the slave vehicle, respectively.

The combined power supply mainly refers to a main power supply for driving the vehicle. An auxiliary power supply on the vehicle can be taken from the combined power supply or before the combined power supply (from a single group), which is not distinguished and described herein.

Figure 32A:
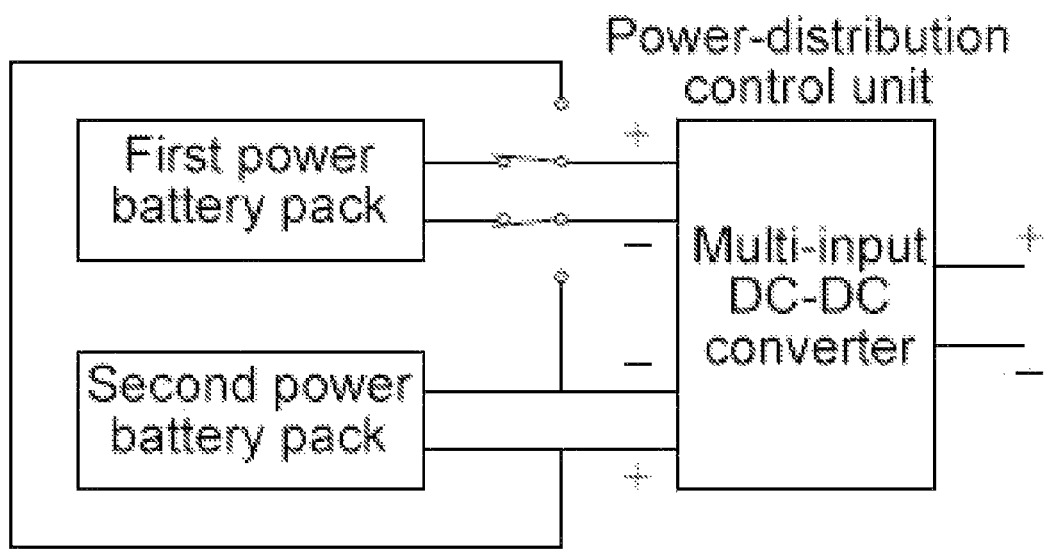
FIGS. 32A-C schematically depict a combined power supply of a plurality of power batteries in accordance with an embodiment of the present disclosure.
Figure 32B:
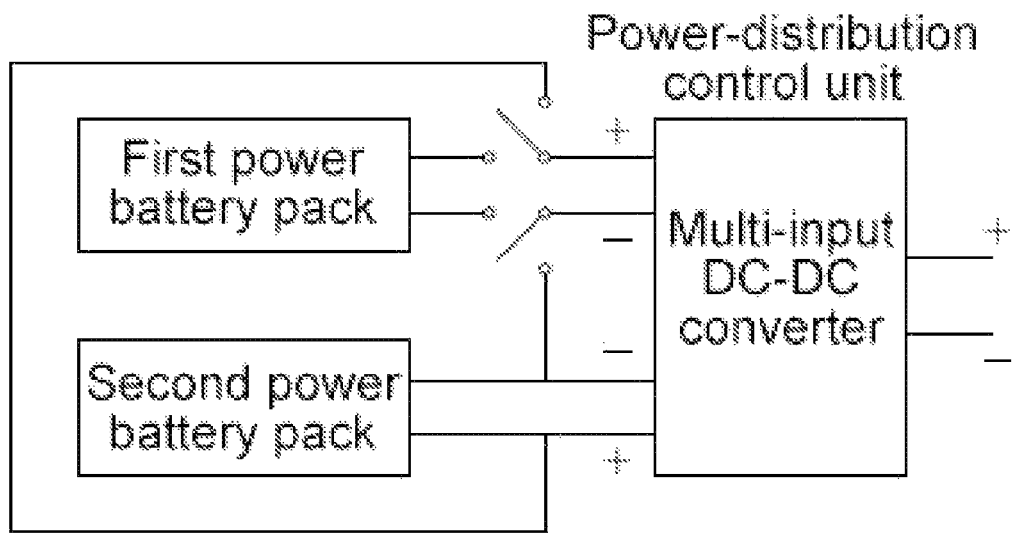
Figure 32C:
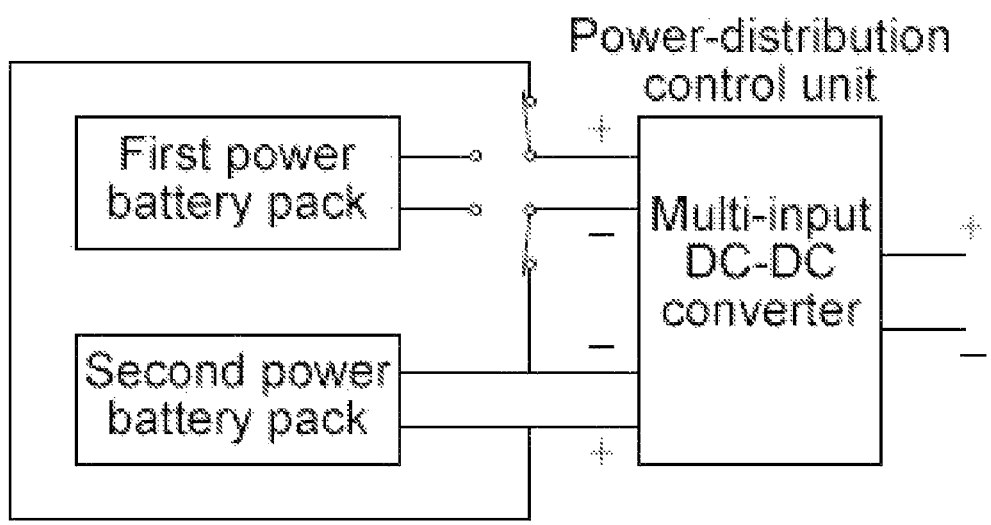

In a first embodiment of the combined power supply, a power-distribution control unit includes a multi-input DC-DC converter or a multi-input DC-AC converter. Two power battery packs or more than two power battery packs implement the combined power supply through the multi-input DC-DC converter or the multi-input DC-AC converter. As shown in FIGS. 32a-32c, the power-distribution control unit includes a dual-input DC-DC converter. A second power battery pack is connected to a first input end of the dual-input DC-DC converter, and a second input end of the dual-input DC-DC converter is connected to a single-pole double-throw switch. When the single-pole double-throw switch is a first state as shown in FIG. 32a, the first power battery pack is connected to the second input end of the dual-input DC-DC converter. When the single-pole double-throw switch is a second state as shown in FIG. 32b, the second input end of the dual-input DC-DC converter has no input. When the single-pole double-throw switch is a third state as shown in FIG. 32c, the second power battery pack is further connected to the second input end of the dual-input DC-DC converter. The single-pole double-throw switch can be a contact point of a relay or a contactor under control.

The first state shown in FIG. 32a can realize a combined power supply of the first power battery pack and the second power battery pack. The second state shown in FIG. 32b and the third state shown in FIG. 32c is a single-pack power supply of the second power battery pack. In the third state shown in FIG. 32c, the first input end and the second input end of the dual-input DC-DC converter are both powered by the second power battery pack. In the second state shown in FIG. 32b, the first input end of the dual-input DC-DC converter is powered by the second power battery pack, and the second input end of the dual-input DC-DC converter has no input. According to the characteristics of the dual-input DC-DC converter, only one of those state can be used.

The above embodiments show that the power-distribution control unit includes a multi-input DC-DC converter or a multi-input DC-AC converter, and the multi-input DC-DC converter or the multi-input DC-AC converter is connected to two or more power battery packs. The two or more power battery packs can realize a combined power supply through the multi-input DC-DC converter or the multi-input DC-AC converter.

After the circuit of this embodiment is changed, it can also transform a state that the second power battery is disconnected, and the first power battery pack is connected to an input end of the DC-DC converter (connected to one input end or both input ends at the same time) to achieve a single-pack power supply of the first power battery pack. The power-distribution control unit can control a single-pack power supply of the first power battery pack or the second power battery pack and a combined power supply of the first power battery pack and the second power battery pack, and switch the power-supply mode as needed.

If the first power battery pack is required to use power first, a switch between the single-pack power supply of the first power battery pack and the combined power supply is performed. If the second power battery pack is required to use power first, a switch between the single-pack power supply of the second power battery pack and the combined power supply is performed, so as to control the power consumption sequence of each power battery pack.

With respect to the combined power supply provided herein, if a driving motor of the vehicle is an AC motor, a multi-input DC-AC converter can be used, that is, the inverter used is a multi-input inverter. Therefore, the combined power supply on the vehicle requires fewer components. For example, the DC-AC converter (inverter) can use a series inverter, and the input end can be connected to multiple power battery packs to achieve a combined power supply, and a single-pack power supply can also be achieved through circuit conversion, which refers to the switching modes of the abovementioned multi-input DC-AC converter.

The number of input ends of the multi-input DC-DC converter or the multi-input DC-AC converter is determined according to the number of power battery packs, which can effectively realize a combined power supply of multiple power battery packs.

Figure 33:
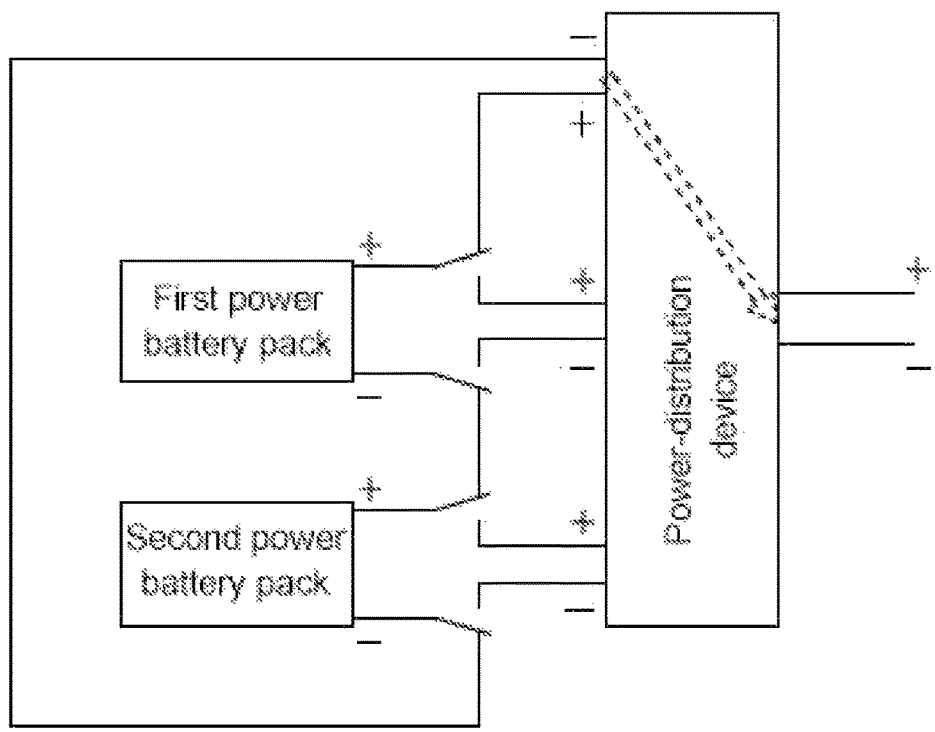
FIG. 33 schematically depicts the combined power supply of the plurality of power batteries in accordance with an embodiment of the present disclosure.
Figure 34:
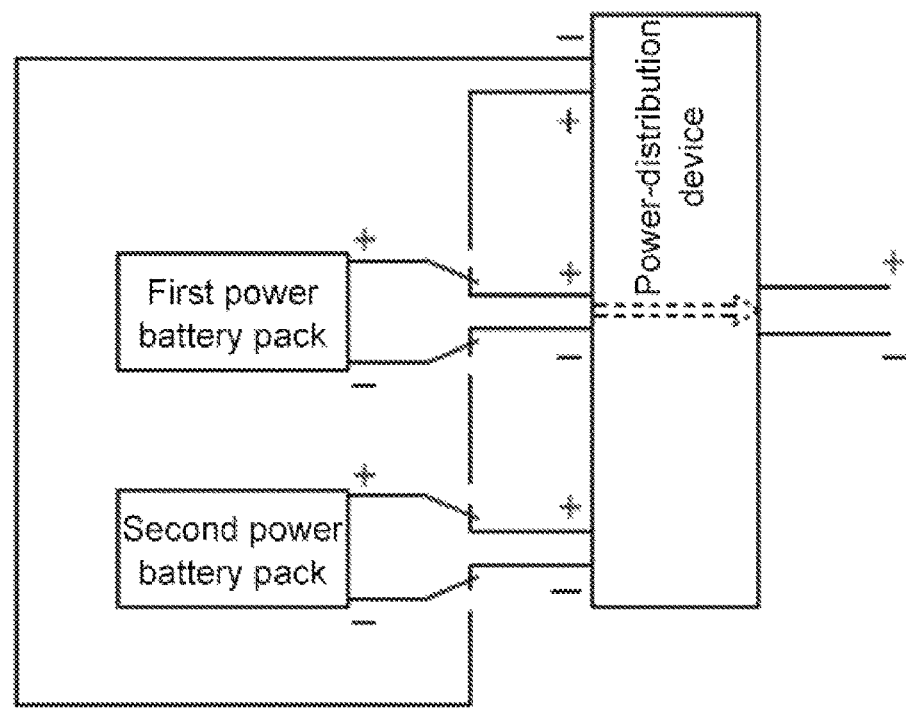
FIG. 34 schematically depicts the combined power supply of the plurality of power batteries in accordance with an embodiment of the present disclosure.
Figure 35:
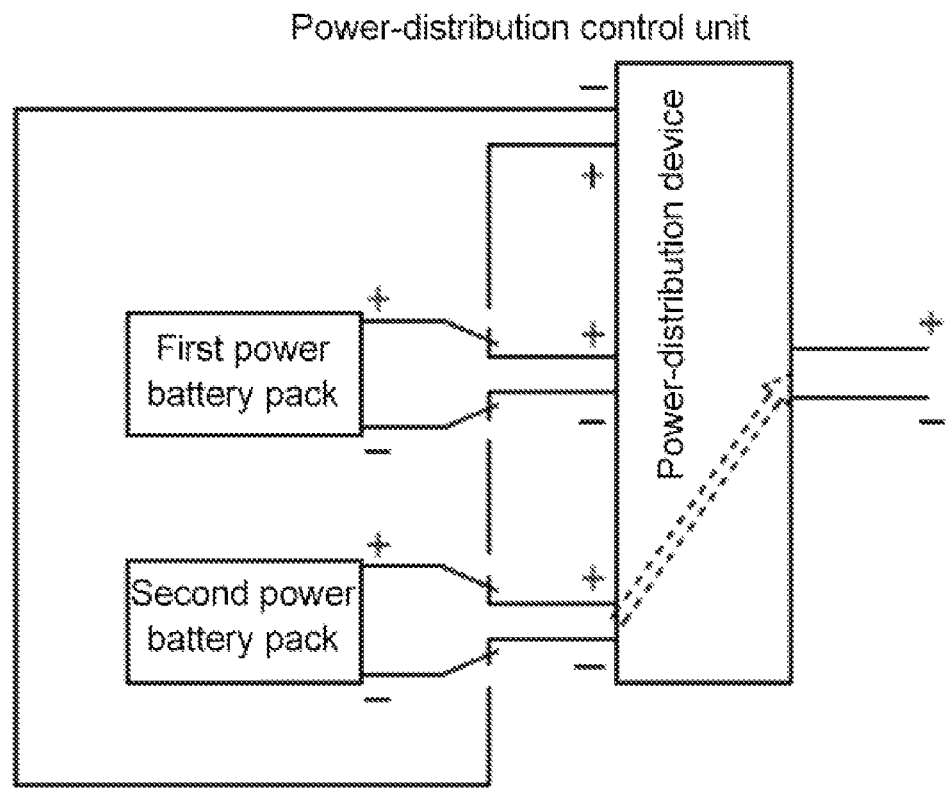
FIG. 35 schematically depicts the combined power supply of the plurality of power batteries in accordance with an embodiment of the present disclosure.

In a second embodiment of the combined power supply, a power-distribution control unit can implement the combined power supply through switching two or more than power battery packs into a series state. As shown in FIGS. 33-25, the power-distribution control unit includes a power-distribution device. As shown in FIG. 33, a first power battery pack and a second power battery pack are connected in series through a relay, and then are connected to the power-distribution device. The first power battery pack and the second power battery pack are connected to an output end through an internal connection of the power-distribution device to realize a combined power supply of the first power battery pack and the second power battery pack. As shown in FIG. 34, a first power battery pack is connected to the power-distribution device through a relay and is connected to an input end through an internal connection of the power-distribution device. The second power battery pack is in a disconnected state, and the first power battery pack provides power alone. As shown in FIG. 34, a second power battery pack is connected to the power-distribution device through a relay and is connected to an input end through an internal connection of the power-distribution device. The first power battery pack is in a disconnected state, and the second power battery pack provides power alone. It can be switched to be powered by the first power battery pack, the second power battery pack or the combined power supply of the first power battery pack and the second power battery pack as needed.

The above embodiments show that the power-distribution control unit can implement the combined power supply through switching two or more than power battery packs into a series state. Through switching the combined power supply and the single-pack power supply, the power consumption sequence of each pack can be controlled.

When the voltage of first power battery pack and the second power battery pack are equal, the voltage of first power battery pack and the second power battery pack in series will double, that is, the above-mentioned switching output has two voltages, and the voltage difference is large. If the following supply voltage range cannot be a wide voltage, a DC-DC converter can be arranged in the power-distribution device, and one of the voltages is converted by the DC-DC converter to be equivalent to the other voltage to output. In this way, the output voltages of the three states mentioned above are equivalent. If the first power battery pack and the second power battery pack respectively pass through the same DC-DC converter before an output, an output of the first power battery pack and the second power battery pack connected in series does not need to go through the DC-DC converter. Since an output power of the single pack is small, a power of the DC-DC converter is small, and the volume, weight and cost of the DC-DC converter are small, which is conducive to the use of combined power supply of power battery packs in the vehicle.

Figure 36:
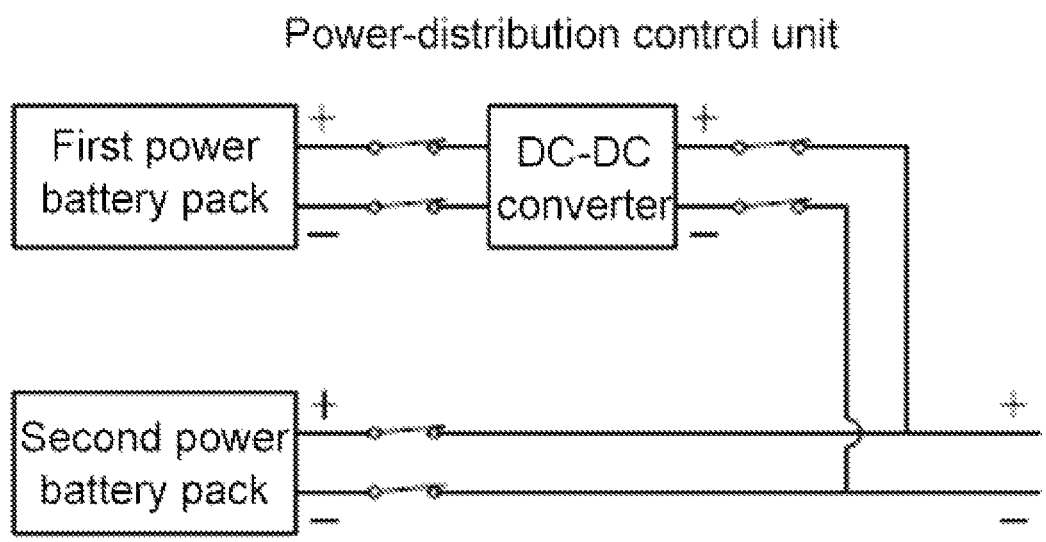
FIG. 36 schematically depicts the combined power supply of the plurality of power batteries in accordance with an embodiment of the present disclosure.
Figure 37:
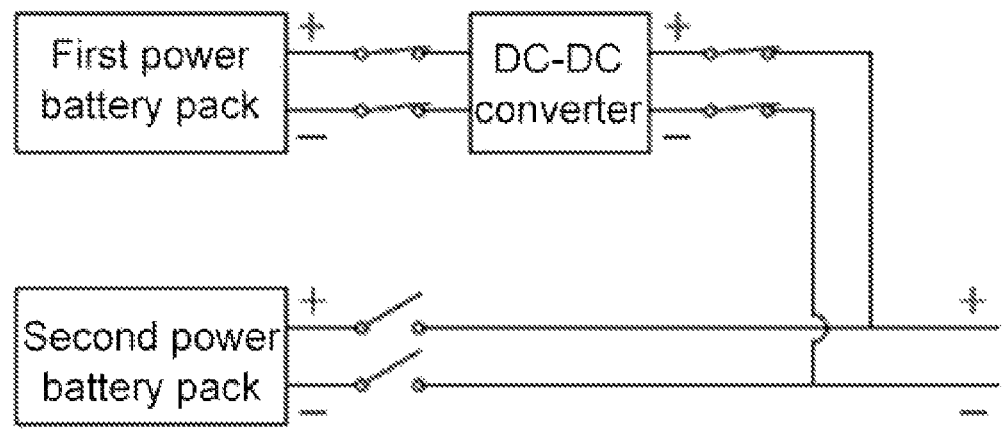
FIG. 37 schematically depicts the combined power supply of the plurality of power batteries in accordance with an embodiment of the present disclosure.
Figure 38:
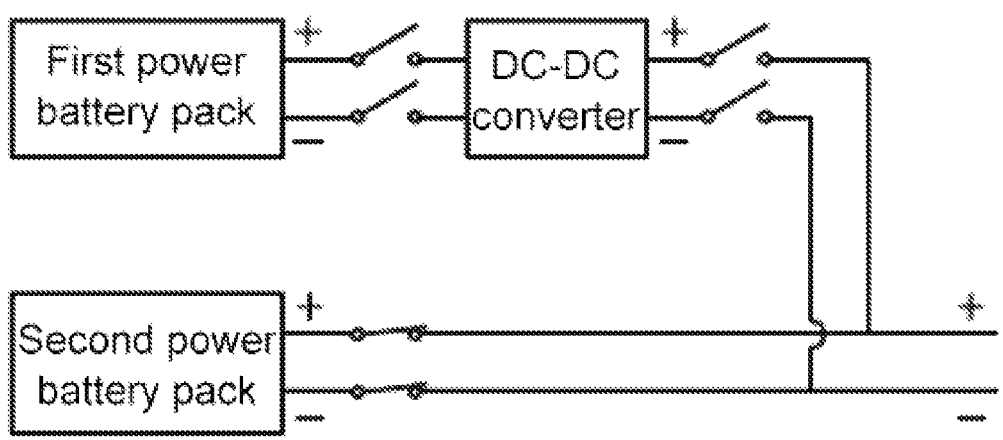
FIG. 38 schematically depicts the combined power supply of the plurality of power batteries in accordance with an embodiment of the present disclosure.

In a third embodiment of the combined power supply, a power-distribution control unit can output a single-pack power pack of a first power battery pack or a combined power supply of a plurality of power battery packs through a DC-DC converter and connect the single-pack power pack of the first power battery pack or the combined power supply of the plurality of power battery packs in parallel with a single-pack power pack of a second power battery pack to implement a combined power supply. As shown in FIGS. 36-38, the power-distribution control unit includes a DC-DC converter. As shown in FIG. 36, a first power battery pack is connected to an input end of the DC-DC converter through a relay and output through the DC-DC converter, and a second power battery pack is connected to an output end of the DC-DC converter through the relay to realize a combined power supply of the first power battery pack and the second power battery pack. As shown in FIG. 37, a first power battery pack is connected to the DC-DC converter, and an output terminal of the DC-DC converter is disconnected from a second power battery pack. The first power battery pack outputs power separately. As shown in FIG. 38, the DC-DC converter is disconnected from a first power battery pack and a second power battery pack, and the second power battery pack outputs power separately. Using the method of this embodiment, it can be switched to be powered by the first power battery pack, the second power battery pack or the combined power supply of the first power battery pack and the second power battery pack as needed. This embodiment can realize a combined power supply of two power battery packs with different voltages.

If the above-mentioned single-pack power supply of the first power battery pack is replaced by a combined power supply of two power battery packs, a combined power supply of three power battery packs can also be realized. For example, the combined power supply of two power battery packs is provided by two power battery packs connected in series.

When a voltage output by the single-pack power pack of the first power battery pack or the combined power supply of the plurality of power battery packs is higher than a voltage of the single-pack power pack of the second power battery pack, the second power battery pack can be charged.

The above embodiments show that the power-distribution control unit can output a single-pack power pack of a first power battery pack or a combined power supply of a plurality of power battery packs through a DC-DC converter and connect the single-pack power pack of the first power battery pack or the combined power supply of the plurality of power battery packs in parallel with a single-pack power pack of a second power battery pack to implement a combined power supply. Through switching the combined power supply and the single-pack power supply, the power consumption sequence of each pack can be controlled.

With this combined power supply mode, after an output current of the DC-DC converter is set, an available power supply time of the first power battery pack or the combined power supply of the plurality of power battery packs can be predicted more accurately, so as to better implement the charging and battery replacement plan of the vehicle during a trip.

The above-mentioned three combined power supply modes have various changes, and they can also be used in combination. It is not limited to the above method, and other different combined power supply methods can also be used.

With respect to the vehicles having multiple drive axles or use a hub motor, in some cases, multiple motors are driven at the same time during driving. Conventionally, the multiple motors are powered by one power battery pack. When there are a plurality of power battery packs on the vehicle, the power-distribution control unit can control the combined power supply of single-pack power supplies of different power battery packs or/and a combined power supply of multiple power battery packs to supply power to different drive axles or drive motors of different wheels through different power supply paths.

Figure 39:
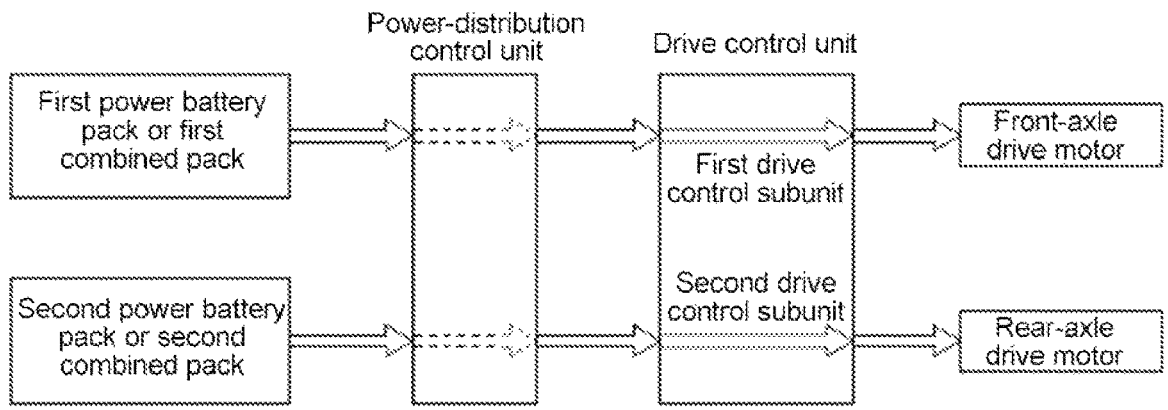
FIG. 39 schematically depicts power management of a power battery pack in accordance with an embodiment of the present disclosure.
Figure 40:
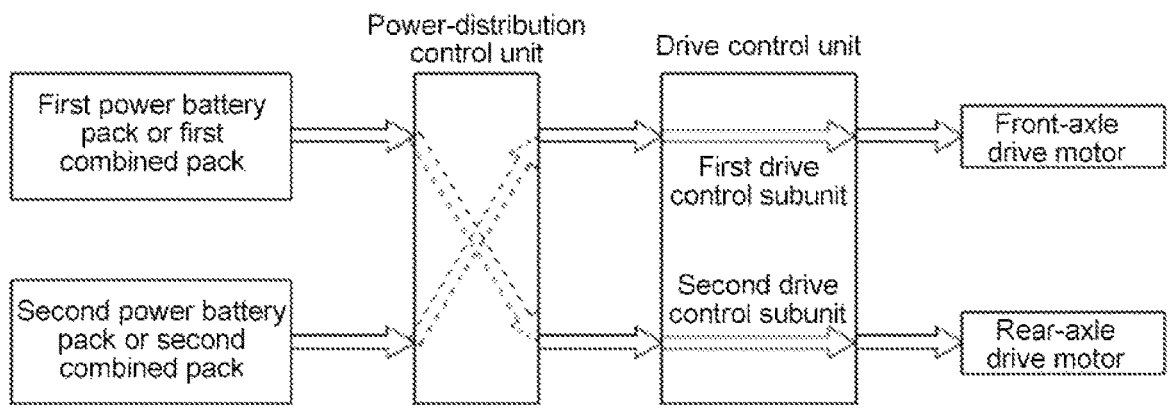
FIG. 40 schematically depicts the power management of the power battery pack in accordance with an embodiment of the present disclosure.
Figure 41:
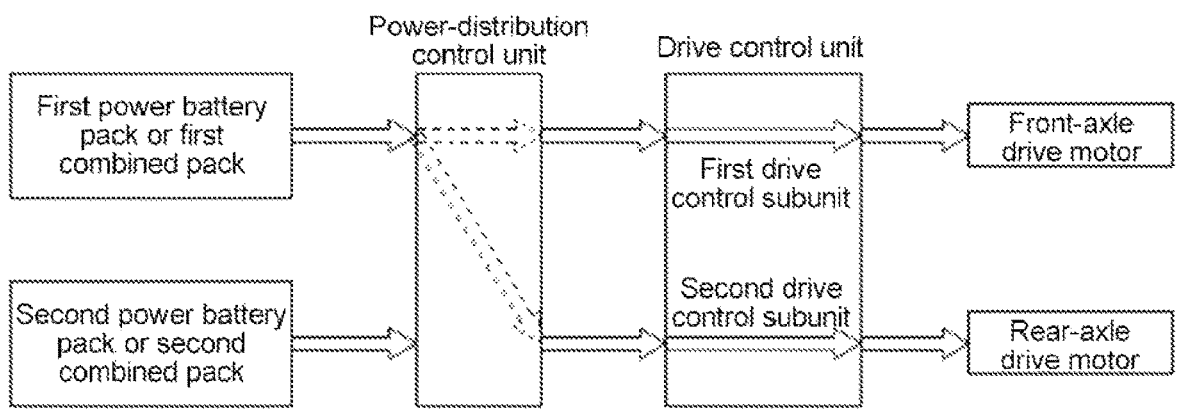
FIG. 41 schematically depicts the power management of the power battery pack in accordance with an embodiment of the present disclosure.
Figure 42:
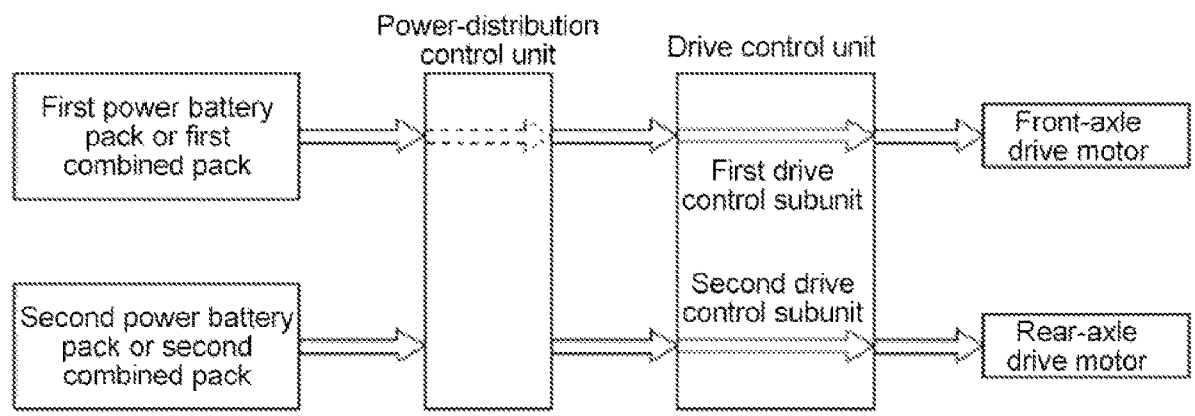
FIG. 42 schematically depicts the power management of the power battery pack in accordance with an embodiment of the present disclosure.

An embodiment is shown in FIGS. 39-42, a first power battery pack and a second power battery pack can manage an input electric energy through a power-distribution control unit, and transmit the electric energy to a front-axle drive motor and a rear axle drive motor of a vehicle through a drive control unit. As shown in FIG. 39, when the power-distribution control unit is in a first state, the first power battery pack is connected to a first input end of the power-distribution control unit, and the second power battery pack is connected to a second input end of the power-distribution control unit. The drive control unit sends an electric energy output from a first output end connected to the first input end of the power-distribution control unit to the front-axle drive motor, and the drive control unit sends an electric energy output from a second output end connected to the second input end of the power-distribution control unit to the rear-axle drive motor at the same time. As shown in FIG. 40, when the power-distribution control unit is in a second state, a first power battery pack is connected to a first input end of the power-distribution control unit, and a second power battery pack is connected to a second input end of power-distribution control unit. The drive control unit sends an electric energy output from a second output end connected to the first input end of the power-distribution control unit to the rear-axle drive motor, and the drive control unit sends an electric energy output from a first output end connected to the second input end of the power-distribution control unit to the front-axle drive motor at the same time. As shown in FIG. 41, when the power-distribution control unit is in a third state, the first power battery pack is connected to a first input end of the power-distribution control unit, and the second power battery pack is connected to a second input end of the power-distribution control unit. The drive control unit sends an electric energy output from a first output end connected to the first input end of the power-distribution control unit to the front-axle drive motor, and the drive control unit sends an electric energy output from a second output end connected to the first input end of the power-distribution control unit to the rear-axle drive motor at the same time. The second input end of the power-distribution control unit is not connected to the first output end and the second output end at this time. As shown in FIG. 42, when the power-distribution control unit is in a fourth state, the first power battery pack is connected to a first input end of the power-distribution control unit, and the second power battery pack is connected to a second input end of the power-distribution control unit. The drive control unit sends an electric energy output from a first output end connected to the first input end of the power-distribution control unit to the front-axle drive motor. The second input end of the power-distribution control unit is not connected to the first output end and a second output end at this time.

In the first state shown in FIG. 39, the first power battery pack and the second power battery pack respectively supply power for the front-axle drive motor and the rear-axle drive motor. In the third state shown in FIG. 41, the first power battery pack provides power for the front-axle drive motor and the rear-axle drive motor at the same time (similar to the traditional method). In the third state shown in FIG. 42, only the first power battery pack supplies power to the front-axle drive motor. The vehicle can switch the first state, the third state and the fourth state according to the load situation, so as to ensure the load driven by the vehicle and protect the battery from excessively discharging under the condition of priority power supply of the first power battery pack.

The second state shown in FIG. 40 is an exchange of the power supply path in the first state shown in FIG. 39, that is, the first power battery pack and the second power battery pack supply power to the rear-axle drive motor and the front-axle drive motor, respectively. If the power-distribution control unit uses the other two power-distribution paths: the second power battery pack provides power for the front-axle drive motor and the rear-axle drive motor at the same time, or only the second power battery pack supplies power to the front-axle drive motor. The second power battery pack becomes the priority power supply pack.

The above embodiments show that the power-distribution control unit can control the combined power supply of single-pack power supplies of different power battery packs or/and a combined power supply of multiple power battery packs to supply power to components or component combinations through different power supply paths. The components or component combinations are different drive axles or drive motors of different wheels.

Through controlling the combined power supply of single-pack power supplies of different power battery packs or/and a combined power supply of multiple power battery packs to supply power to different drive axles or drive motors of different wheels through different power supply paths, the number of DC-DC converters that need to be used for combined power supply can be reduced. At the same time, it can also solve the problems of insufficient load capacity and large battery discharge rate of the single-pack power supply (or the combined power supply when the number of power battery packs is small). The priority power supply of the power battery pack can be realized by switching.

With respect to the charging control unit, a charging source can charge two or more independent power battery packs at the same time through the charging control unit. The charging source can be a single power source or a combination of multiple power sources.

With respect to the new energy vehicles using the quick-change universal power battery, some of which may be equipped with a plurality of power battery packs, or both the driving master and the slave vehicle have a power battery pack. When multiple power battery packs need to be charged, if conditions permit, multiple chargers can be used to charge different power battery packs or a single power battery. When there is only one charger, a single power battery pack can be charged first, and then another power battery pack can be charged by switching.

The late charging period of the commonly used power battery has a slow charging speed, small charging power and requires long time. When charging power battery packs one after another, the late charging periods of those power battery packs cannot be overlapped, causing a waste of the charger power and increasing an overall time-consuming. When the charger (such as an external charging pile) has a large charging power and only charges a single power battery pack, the charger power is not effectively used, and the overall charging time is also long. The charging control unit controls the charging source to charge two or more independent power battery packs through the same charger at the same time, which can effectively solve the above-mentioned problems, and it can be implemented in different ways.

Figure 43:
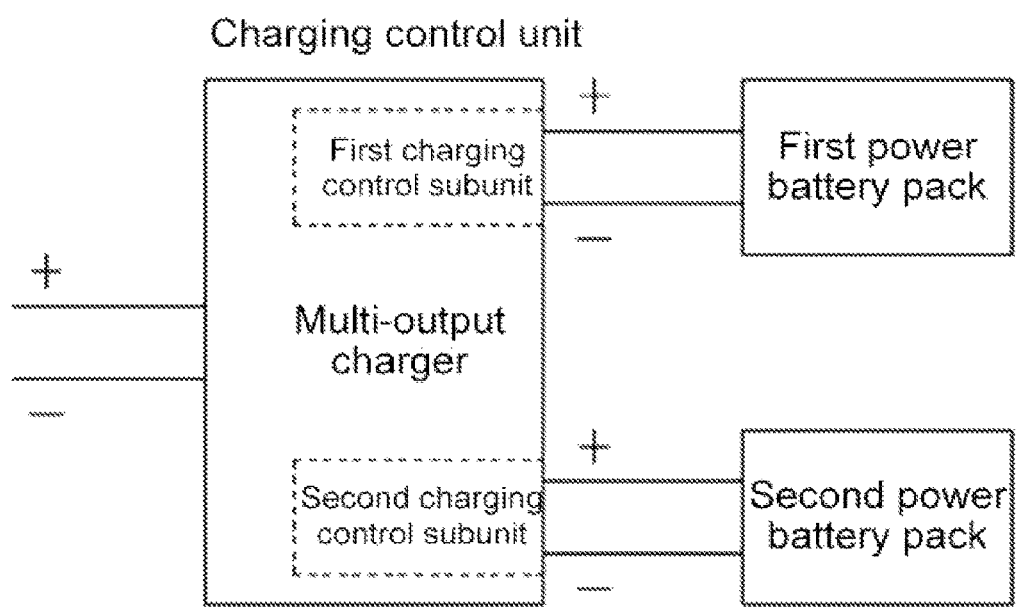
FIG. 43 schematically depicts a combined power supply of the power battery pack in accordance with an embodiment of the present disclosure.

In a first embodiment of a combined power charging, a charging control unit controls a charging source to charge power batteries of different power battery packs through a multi-output charger. As shown in FIG. 43, a charging control unit includes a multi-output charger, a first output end of the multi-output charger is connected to a first power battery pack, and a second output end is connected to a second power battery pack. The multi-output charger includes a first sub-charging control unit and a second sub-charging control unit. The first sub-charging control unit controls an output of the first output end, that is, controls a charging of the first power battery pack. The second sub-charging control unit controls an output of the second output end, that is, controls a charging of the second power battery pack, such that the charging control unit realize a combined power charging of multiple power battery packs.

The above-mentioned embodiment shows the charging control unit can control a charging source to charge power batteries of different power battery packs through a multi-output charger.

When the above-mentioned multi-output charger charges multiple power battery packs, a fast charging of the multiple power battery packs is completed first through power distributing (or current distributing, simultaneous charging) or time distributing (alternating charging). In this stage, the charging power is within acceptable range of each power battery pack and is not wasted. The overall charging time is not increased. The existing technology can be used and will not be described herein. In a slow charging stage, multiple power battery packs are charged at the same time, which saves charging time due to the overlapping time period.

The above-mentioned multi-output charger can also charge only one power battery pack according to actual needs, and cut off the charging of other power battery packs.

The charging source can be a single power source, or multiple power sources (such as a power source with an external power source and a solar power source at the same time), and the multiple power sources can be combined to perform charging, such as integrating the multiple power sources through a multi-input power converter. The multi-input power converter can also be a multi-input and multi-output charger.

Figure 44:
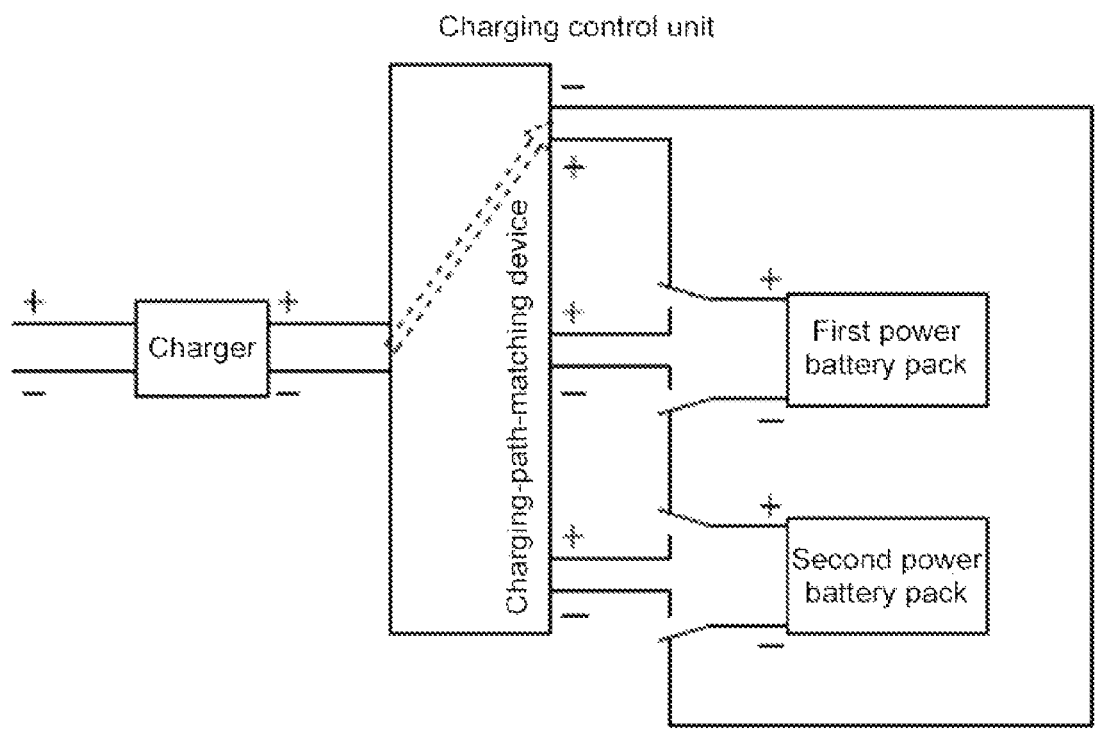
FIG. 44 schematically depicts the combined power supply of the power battery pack in accordance with an embodiment of the present disclosure.
Figure 45:
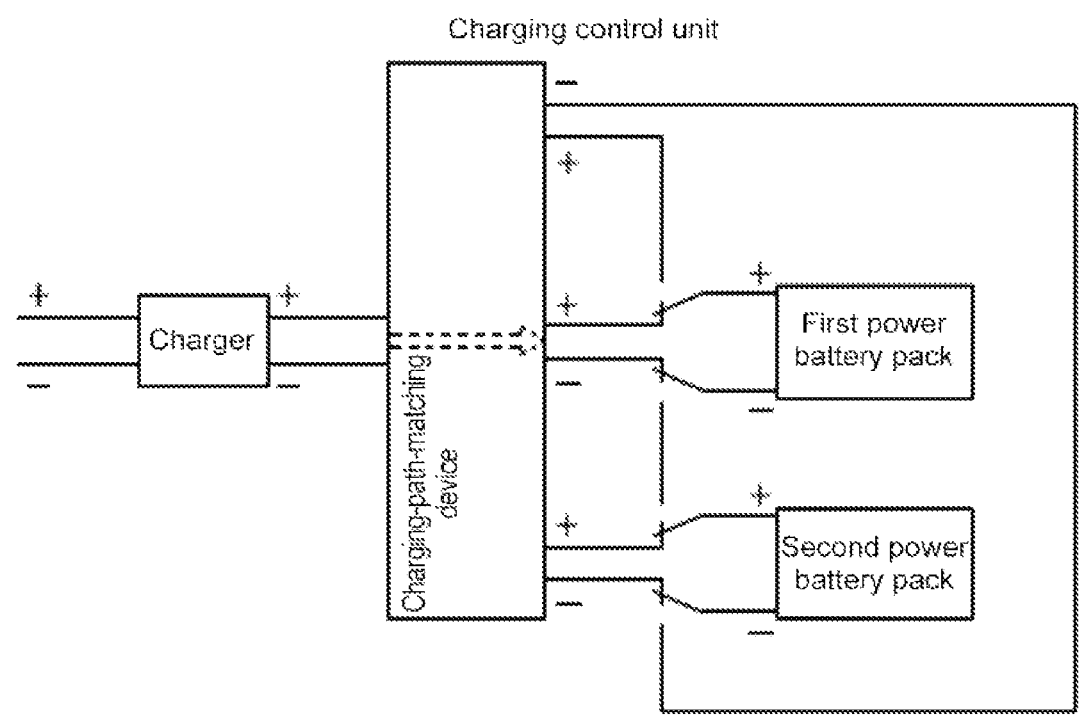
FIG. 45 schematically depicts the combined power supply of the power battery pack in accordance with an embodiment of the present disclosure.
Figure 46:
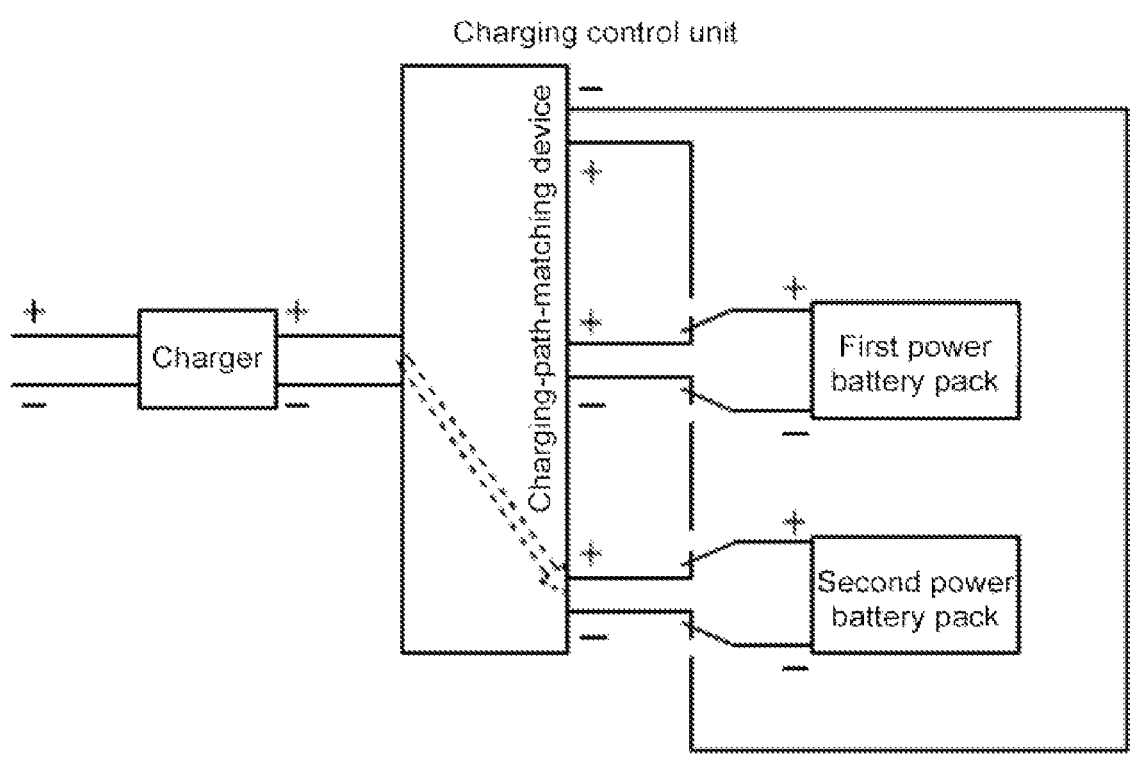
FIG. 46 schematically depicts the combined power supply of the power battery pack in accordance with an embodiment of the present disclosure.

In a first embodiment of a combined power charging, a charging control unit temporarily switches different power battery packs to a serial state and performs a combined power charging through a charging source. As shown in FIGS. 44-46, a charging control unit includes a charging-path-matching device, and the charging-path-matching device is connected to a charger. The charging-path-matching device is respectively connected to a first power battery pack and a second power battery pack through a relay. In FIG. 44, the first power battery pack and the second power battery pack are connected in series, and the charger simultaneously charges the first power battery pack and the second power battery pack through the charging-path-matching device. In FIG. 45, the second power battery pack is in a disconnected state, and the charger individually charges the first power battery pack through the charging-path-matching device. In FIG. 46, the first power battery pack is in a disconnected state, and the charger individually charges the second power battery pack through the charging-path-matching device.

When a charging power of the external charging pile exceeds a maximum acceptable charging power of a single power battery pack, and the maximum charging voltage is higher than a voltage of two power battery packs connected in series, the two power battery packs connected in series can be charged at the same time. When the fast charging phase of a power battery pack is over, the combined power can be ended. After the series connection is released, the charging state is reconfigured and switched to charge another single power battery pack.

The above-mentioned embodiment shows the charging control unit can temporarily switch two or more power battery packs to a serial state and performs a combined power charging through a charging source. The above method utilizes the advantages of a high-power charger to simultaneously charge multiple power battery packs, which can effectively accelerate the overall charging speed of multiple power battery packs.

A communication protocol between a power battery management system and a new energy vehicle is adopted between a quick-change power battery and a new energy vehicle. The communication protocol is configured to transmit a category and a type of a battery cell in the power battery and/or a parameter of the power battery to an energy management system of the new energy vehicle to control a charging process. The parameter of the power battery includes different charging requirements for different battery cells.

Figure 47:
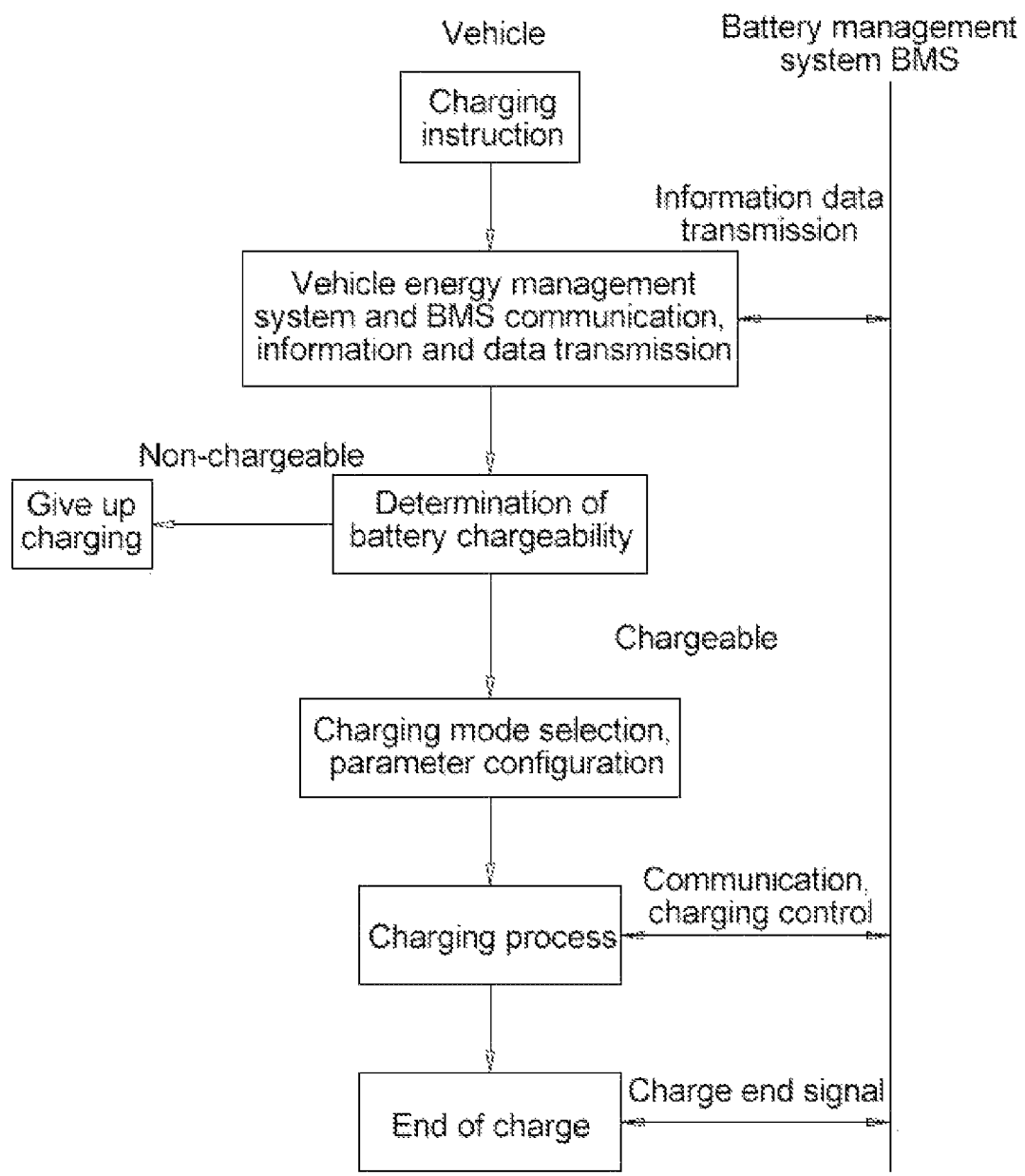
FIG. 47 is a charging flow chart of a vehicle in accordance with an embodiment of the present disclosure.

FIG. 47 is a charging flowchart of an embodiment, which includes the following steps.

1) A charging instruction is received.
2) The energy management system communicates with a battery management system (BMS) for information and data transmission.
3) The energy management system determines a rechargeability of a battery that if the battery is not rechargeable, give up charging; and if the battery can be recharged, select a charging method and configure parameters.
4) A charging control unit of a vehicle controls charging, and the energy management system maintains communication with the BMS and controls entire charging process.
5) The energy management system determines an end of the charging according information given by the BMS or/and information given by the charging control unit, and ends the charging.

The information communicated and transmitted in the above charging process includes the category and type of the battery cell in the power battery or the parameter information of different charging requirements for battery cells of different categories and types. In an embodiment, as shown in Table 1, with respect to a quick-change power battery pack, three kinds of power batteries of the same main model are equipped with battery cells of different categories or types at different times in power batteries of the same main model (battery cells of the power batteries in a power battery pack are the same). The above-mentioned process is used for charging. Power battery packs equipped with the three kind of power batteries have different charging cut-off voltage and accuracy.

Power Battery Pack I

The battery cell is a nickel-cobalt-manganese ternary lithium-ion battery with a nominal voltage of 384.8 V and a charging cut-off voltage of 436.8 V±0.5%.

Power Battery Pack II

The battery cell is a lithium iron phosphate battery with a nominal voltage of 384 V and a charging cut-off voltage of 438 V±0.5%.

Power Battery Pack III

The battery cell is a nickel-metal hydride battery with a nominal voltage of 384 V and a charging voltage of 450-510 V.

When charging a quick-change universal power battery pack, and the power battery pack consists of multiple quick-change universal power batteries, the energy management system communicates with the battery management system of each quick-change universal power battery, and performs the charging while meeting the requirements of each quick-change universal power battery. The charging parameters and requirements of the power battery pack are determined by the charging parameters and requirements of each quick-change universal power battery and the structure of the power battery pack. In the embodiment, the charging cut-off voltage is the sum of the charging cut-off voltages of two quick-change universal power batteries, and the accuracy is the same as that required for a single quick-change universal power battery.

The charging cut-off voltage and accuracy belong to the parameter information for different charging requirements for power battery cells with different categories and types. For the data mentioned above, the energy management system controls the charging process of the three kinds of power batteries, and the charging cut-off voltages and accuracies are respectively controlled within the corresponding requirements.

If the power pack is charged by an off-board charger and still managed by the energy management system of the vehicle, the vehicle will communicate with an external off-board charger at the same time to jointly control the charging process, which belongs to the prior art and will not be described herein.

The above embodiment shows that the energy management system has the following management and control capabilities.

A communication protocol between a power battery management system and a new energy vehicle is adopted between a quick-change power battery and the energy management system of the new energy vehicle. The communication protocol is configured to transmit a category and a type of a battery cell in the power battery and/or a parameter of the power battery to the energy management system of the new energy vehicle to control a charging process. The parameter of the power battery includes different charging requirements for battery cells of different categories and types. The power battery is charged by an on-board charger on the new energy vehicle or an off-board charger controlled by the energy management system, the energy management system is configured to determine whether the power battery is chargeable. If the power battery is chargeable, the on-board charger or the off-board charger charges the power battery according to different types of battery cells through the charging control unit. The communication protocol is configured to communicate the energy management system and the power battery management system of the new energy vehicle, and the energy management system and the power battery management system control the charging process through the communication protocol. A charging process of the off-board charger is controlled by the off-board charger and the communication protocol of the new energy vehicle.

When the charging parameters of the charger cannot meet the charging requirements of the power battery in a full charging stage and the power battery cannot be charged to completion, but the charging parameters meets the charging requirements of part of the stage, the power battery at the stage that meets the charging requirements can also be charged, and the charging ends after the stage is completed.

When the quick-change universal power battery pack is composed of different quick-change universal power batteries, it can be charged if the charging parameters of the charger meet the requirements. The charger whose charging parameters do not fully meet the requirements can charge the battery pack in stages or not charge the battery pack. The charger whose charging parameters completely do not meet the requirements give up charging the battery pack.

When the off-board charger is charging a single quick-change universal power battery, the off-board charger can also communicate through the communication protocol between the off-board charger and the battery management system and directly control the charging process, that is, the energy management system of the vehicle can choose to not manage the charging.

With respect to the traditional energy management systems in vehicles, they only manage the charging process of the power batteries that the power cells thereof belong to the same category or the same type and have basically the same charging requirements. Whereas the quick-change power batteries of the same main model can individually adopt battery cells of different categories and types, and thus the charging of the quick-change power battery should meet the requirements of different battery cells. If the quick-change universal power battery is directly charged without discrimination, and the charging does not meet the corresponding requirements, the quick-change universal power battery cannot be charged, or cannot be effectively charged, and the charging may cause damage to the quick-change universal power battery. The energy management system provided herein can effectively solve the above-mentioned problems.

The quick-change universal power battery and the energy management system of the vehicle adopt the communication protocol between the power battery management system and the new energy vehicle. The parameter information of the load capacity information of power battery is transmitted to the new energy management system through the communication protocol, and a control system of the new energy vehicle is configured to select a power supply mode according to the load capacity information of the power battery obtained by the energy management system.

In an embodiment, requirements of each power supply mode of a vehicle are shown in Table 2, and the power supply mode is selected according to the load capacity information of a quick-change universal power battery arranged in a power battery pack. Part of parameters of three kinds of quick-change universal batteries arranged in the power battery pack is shown in Table 1. The load capacity information of the power battery includes a maximum continuous discharge current of the power battery pack, a maximum pulse discharge current (long pulse, a longest time thereof is 3 minutes) of the power battery pack and a maximum pulse discharge current (short pulse, a longest time thereof is 10 seconds) of the power battery pack.

As shown in Table 1 and Table 2, when the power battery pack adopts the power battery pack I, that is, the nickel-cobalt-manganese ternary lithium-ion battery, the control system of the vehicle can select a first power-supply mode, a second power-supply mode and a third power-supply mode.

When the power battery pack adopts the power battery pack II, that is, the lithium iron phosphate battery, the control system of the vehicle can select the second power-supply mode and the third power-supply mode.

When the power battery pack adopts the power battery pack III, that is, the nickel-metal hydride battery, the control system of the vehicle can select the third power-supply mode.

The above-mentioned embodiment shows that the communication protocol between the power battery management system and the new energy vehicle can transmit the parameter information of the load capacity information of power battery to the new energy management system, and the control system of the new energy vehicle can select a power supply mode according to the load capacity information of the power battery obtained through the power battery management system.

When the power battery pack of a vehicle is composed of multiple power batteries, the load capacity information of the power battery pack is determined by a structure of the power battery pack and the load capacity information of the quick-change universal power battery. In the embodiment, two quick-change universal power batteries are connected in series, and the load capacity information of the power battery pack is the smaller one in the corresponding data of the two quick-change universal power batteries. Since the two quick-change universal batteries are the same, a current of the power battery pack is the same as a current of the two power batteries (a voltage of the power battery pack is a sum of voltages of the two power batteries, and a power of the power battery pack is a sum of powers of the two power batteries).

When a new energy vehicle select a combined power supply of multiple power battery packs, or power batteries in different packs or/and multiple packs of power batteries to power different drive axles or drive motors of different wheels through different power supply paths, the new energy vehicle car can determine the corresponding mode according to the load capacity and the combined mode of each power battery pack.

The quick-change universal power batteries of the same main model can individually use battery cells with different categories and types. The load capacity varies greatly. Due to technological changes, the load capacity information of the power battery may also be different. If the vehicle does not distinguish between the batteries, it may cause damage to the battery or uncoordinated power control. The energy management system provided herein can effectively solve the above problems. According to the load capacity information of the power battery to be replaced, the corresponding available power supply mode is adopted, such that the vehicle has good adaptability different power batteries. It will not cause additional damage to the power battery.

The vehicle can also preset a high-power power supply mode on the premise that other components are already capable, and its load capacity requirements for the battery are higher than the load capacity information of the currently available quick-change universal power battery of the main model adopted by the vehicle. When new batteries are launched and the load capacity meets the requirements, this power supply mode can be selected to achieve the high power performance preset by the vehicle.

The communication protocol can also be used for the communication between other power batteries and vehicles, and realize the charging control of the power batteries with different battery cells through communication and select the power supply mode according to the load capacity information of the power battery. When other power batteries are replaced within the service life of the vehicle, and the battery for replacing is different from the previous one, it has practical significance.

A power-battery replacement station, which is equipped with no more than eight main models of power battery for a new energy vehicle, and is further equipped with a replacement apparatus (including hand-held tools) of the main models of the power battery. The power-battery replacement station is configured to replace the power battery of various new energy vehicles.

The above-mentioned embodiments are illustrative, and not intended to limit this disclosure. Other embodiments made by those skilled in the art without departing from the spirit of this disclosure should fall within the scope of the present disclosure defined by the appended claims.

TABLE 1

Parameters of three quick-change universal power battery packs with different battery cell

| Structure of power battery pack | Two quick-change universal power batteries of the same main model are connected in series, and a voltage of each power battery is about 192 V (within a voltage range) | | |
|---|---|---|---|
| Number of power battery pack | I | II | III |
| Category of battery cell | Lithium ion battery | | Nickel-metal hydride battery |
| Type of battery cell | Nickel cobalt manganese ternary lithium ion | Lithium iron phosphate | Nickel-metal hydride |
| Nominal voltage | 384.8 V | 384 V | 384 V |
| Charging cut-off voltage | 436.8 V ± 0.5% | 438 V ± 0.5% | 450-510 V |
| Standard charge current (25 ± 2° C.) | 90 A | 60 A | 35 A |
| Standard discharge current | 150 A | 100 A | 50 A |
| Maximum continuous discharge current | 280 A | 200 A | 110 A |
| Maximum pulse discharge current the power battery pack (long pulse, a longest time thereof is 3 minutes) | 400 A | 300 A | 160 A |
| Maximum pulse discharge current (short pulse, a longest time thereof is 10 seconds) | 800 A | 600 A | 360 A |

TABLE 2

Charging requirements of different power-supply modes

| | First power-supply mode | Second power-supply mode | Third power-supply mode |
|---|---|---|---|
| Characteristics of each power-supply mode | Driven by dual motors on the front and rear axles Drive control: high-power mode | Driven by dual motors on the front and rear axles Drive control: low-power mode | Driven by the front axle motor drive only Drive control: low power mode |
| Requirements of each power-supply mode Maximum continuous discharge current | No less than the data in the following table 240 A | No less than the data in the following table 140 A | No less than the data in the following table 80 A |
| Maximum pulse discharge current the power battery pack (long pulse, a longest time thereof is 3 minutes) | 340 A | 200 A | 115 A |
| Maximum pulse discharge current (short pulse, a longest time thereof is 10 seconds) | 680 A | 400 A | 230 A |

What is claimed is:

1. A quick-change power battery for a new energy vehicle, comprising:
   a battery body;
   wherein the battery body is provided with a quick-change connection port for quick disassembly and assembly; the quick-change connection port comprises a main electrical connection port; the battery body is connected to the new energy vehicle in use; the battery body is further provided with one or more of a recessed structure, an independent liquid temperature-control loop and a multi-connection port structure; the recessed structure comprises a recessed area provided on the battery body after the quick-change connection port is installed; when the battery body is configured to be laterally arranged on the new energy vehicle, the recessed area is arranged at a side of the battery body; when the battery body is configured to be downward arranged on the new energy vehicle, the recessed area is arranged on a lower end of the battery body; when the battery body is configured to be upward arranged on the new energy vehicle, the recessed area is arranged on an upper end of the battery body; the recessed area is configured to accommodate a connecting part provided as a protrusion on the new energy vehicle; the connecting part provided as the protrusion is configured to comprise a partial or a whole structure configured for fastening an electrical connector in a corresponding quick-change connection port on the new energy vehicle; the independent liquid temperature-control loop comprises a direct cooling loop, a liquid cooling loop or a combination thereof; the direct cooling loop, the liquid cooling loop or the combination thereof is arranged on the battery body; an external heat exchange component in the independent liquid temperature-control loop is arranged on a surface of the battery body; the multi-connection port structure comprises the quick-change connection port on the battery body; at least two surfaces of the battery body are provided with the quick-change connection port; and the battery body is configured to be installed in a battery compartment along different dimension directions of the battery body.

2. The quick-change power battery of claim 1, wherein the battery body is configured to output different voltages through an internal change.

3. The quick-change power battery of claim 2, wherein a plurality of equivalent battery packs are provided in the battery body; the internal change is realized by changing the number of equivalent battery packs connected in series to allow the battery body to output different voltages; a voltage output from the battery body increases as the number of equivalent battery packs connected in series increases, and decreases as the number of equivalent battery packs connected in series decreases; each of the plurality of equivalent battery packs is composed of a single battery cell suitable for parallel connection or a plurality of battery cells connected in series or parallel; and the plurality of battery cells are suitable for parallel connection and have the same electric performance.

4. The quick-change power battery of claim 1, wherein an area of a maximum surface or a maximum projected area of the battery body is less than 0.06 $m^2$; a thickness of the battery body is less than 140 mm; and a weight of the battery body is less than 10 kg.

5. The quick-change power battery of claim 1, wherein the battery body adopts a communication protocol between a power battery management system and the new energy vehicle; the communication protocol is configured to transmit a category and a type of a battery cell in the power battery and/or a parameter of the quick-change power battery to an energy management system of the new energy vehicle to control a charging process; and the parameter of the quick-change power battery comprises charging requirements for battery cells of different categories and types.

6. The quick-change power battery of claim 1, wherein the battery body adopts a communication protocol between a power battery management system and the new energy vehicle; the communication protocol is configured to transmit a load capacity information of the quick-change power battery to an energy management system of the new energy vehicle; and a control system of the new energy vehicle is configured to select a power supply mode according to the load capacity information of the quick-change power battery obtained by the energy management system.

7. A quick-change power battery system comprising the quick-change power battery of claim 1, wherein battery bodies having the same size and arranged in the same battery compartment or component for connection and accommodation of the quick-change power battery belong to the same main model; and there are no more than eight types of main models of power batteries for various new energy vehicles to select and replace.

8. The quick-change power battery system of claim 7, wherein different categories and types of battery cells are arranged in individual power batteries of the same main model for replacement.

9. A vehicle using the quick-change power battery of claim 1, comprising:
a vehicle body;
wherein the vehicle body is provided with a quick-change connection port corresponding to the battery body.

10. The vehicle of claim 9, wherein the vehicle body is a master vehicle equipped with a driving mechanism; a slave vehicle is connected to the master vehicle; the slave vehicle is provided with the quick-change power battery to power the master body; the slave vehicle is replaceable; and the slave vehicle is driven by the master vehicle.

11. The vehicle of claim 9, further comprising:
a power-distribution control unit;
wherein the power-distribution control unit is configured to control a combined power supply of two or more independent power battery packs, and is also configured to control a power consumption sequence of individual independent power battery packs through a switch between the combined power supply and a single-pack power supply or a switch between different power supply combinations; and each of the two or more independent power battery packs is composed of a plurality of the quick-change power batteries.

12. The vehicle of claim 11, wherein the power-distribution control unit comprises a multi-input DC-DC converter or a multi-input DC-AC converter; the two or more power battery packs are connected to the multi-input DC-DC converter or the multi-input DC-AC converter; and the two or more power battery packs are configured to implement the combined power supply through the multi-input DC-DC converter or the multi-input DC-AC converter.

13. The vehicle of claim 11, wherein the power-distribution control unit is configured to implement the combined power supply through switching the two or more power battery packs into series connection.

14. The vehicle of claim 11, wherein the power-distribution control unit is configured to output a single-pack power supply of a first power battery pack or a combined power supply of a plurality of power battery packs through a DC-DC converter and connect the first power battery pack or the plurality of power battery packs with a second battery pack in parallel to implement combined power supply.

15. The vehicle of claim 9, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

16. The vehicle of claim 9, further comprising:
a charging control unit;
wherein the charging control unit is configured to charge two or more independent power battery packs using a charging source; and each of the two or more independent power battery packs is composed of a plurality of power batteries.

17. The vehicle of claim 16, wherein the charging control unit is configured to control the charging source to charge different power battery packs through multiple paths with a multi-output charger.

18. The vehicle of claim 16, wherein the charging control unit is configured to temporarily switch the two or more power battery packs into series connection and charge the two or more power battery packs using the charging source.

19. The vehicle of claim 9, further comprising:
an energy management system;
wherein the energy management system adopts a communication protocol between a power battery management system and a new energy vehicle; the communication protocol is configured to obtain a category and a type of a battery cell in the power battery and/or a parameter of the power battery; the parameter of the power battery comprises charging requirements for different categories and types of the battery cell; the power battery is charged by an on-board charger on the new energy vehicle or charged by an off-board charger under management of the energy management system; the energy management system is configured to determine whether the power battery is chargeable; if the power battery is chargeable, the on-board charger or the off-board charger charges the power battery according to charging requirements of different categories and types of battery cells through a charging control unit; the energy management system and the power battery management system adopts the communication protocol for communication and control of a charging process; and the off-board charger communicates with the new energy vehicle to together control the charging process.

20. The vehicle of claim 9, further comprising:
an energy management system;
wherein the energy management system adopts a communication protocol between a power battery management system and the new energy vehicle; the communication protocol is configured to acquire a load capacity information of the power battery; and a control system of a new energy vehicle is configured to select a power supply mode according to the load capacity information of the power battery obtained by the energy battery management system.

21. A replacement station of the quick-change power battery of claim 1, wherein the replacement station is equipped with no more than eight main models of power batteries for the new energy vehicle; the replacement station is further equipped with a replacement apparatus of the no more than eight main models of power batteries; and the replacement station is configured for replacement of a power battery of various new energy vehicles.

22. A quick-change power battery system comprising the quick-change power battery of claim 2, wherein battery bodies having the same size and arranged in the same battery compartment or component for connection and accommodation of the quick-change power battery belong to the same main model; and there are no more than eight types of main models of power batteries for various new energy vehicles to select and replace.

23. A quick-change power battery system comprising the quick-change power battery of claim 3, wherein battery bodies having the same size and arranged in the same battery compartment or component for connection and accommodation of the quick-change power battery belong to the same main model; and there are no more than eight types of main models of power batteries for various new energy vehicles to select and replace.

24. A quick-change power battery system comprising the quick-change power battery of claim 4, wherein battery bodies having the same size and arranged in the same battery compartment or component for connection and accommodation of the quick-change power battery belong to the same main model; and there are no more than eight types of main models of power batteries for various new energy vehicles to select and replace.

25. A quick-change power battery system comprising the quick-change power battery of claim 5, wherein battery bodies having the same size and arranged in the same battery compartment or component for connection and accommodation of the quick-change power battery belong to the same main model; and there are no more than eight types of main models of power batteries for various new energy vehicles to select and replace.

26. A quick-change power battery system comprising the quick-change power battery of claim 6, wherein battery bodies having the same size and arranged in the same battery compartment or component for connection and accommodation of the quick-change power battery belong to the same main model; and there are no more than eight types of main models of power batteries for various new energy vehicles to select and replace.

27. The quick-change power battery system of claim 22, wherein different categories and types of battery cells are arranged in individual power batteries of the same main model for replacement.

28. The quick-change power battery system of claim 23, wherein different categories and types of battery cells are arranged in individual power batteries of the same main model for replacement.

29. The quick-change power battery system of claim 24, wherein different categories and types of battery cells are arranged in individual power batteries of the same main model for replacement.

30. The quick-change power battery system of claim 25, wherein different categories and types of battery cells are arranged in individual power batteries of the same main model for replacement.

31. The quick-change power battery system of claim 26, wherein different categories and types of battery cells are arranged in individual power batteries of the same main model for replacement.

32. The vehicle of claim 10, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

33. The vehicle of claim 11, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

34. The vehicle of claim 12, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

35. The vehicle of claim 13, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

36. The vehicle of claim 14, wherein the power-distribution control unit is configured to control combined power supply of different power battery packs and/or a plurality of power battery packs to power a component or a component combination through different paths; the component or the component combination is a drive axle or a drive motor of individual wheels; and each of the power battery packs is composed of a plurality of quick-change power batteries.

* * * * *